US007653507B2

(12) United States Patent
Yamada et al.

(10) Patent No.: US 7,653,507 B2
(45) Date of Patent: Jan. 26, 2010

(54) ACCELERATION MEASURING DEVICE

(75) Inventors: Rikita Yamada, Tokyo (JP); Koichi Hikida, Tokyo (JP); Hiroyuki Sasaki, Tokyo (JP); Masaya Yamashita, Tokyo (JP)

(73) Assignee: Asahi Kasei Emd Corporation, Tokyo (JP)

( * ) Notice: Subject to any disclaimer, the term of this patent is extended or adjusted under 35 U.S.C. 154(b) by 0 days.

(21) Appl. No.: 11/659,971

(22) PCT Filed: Aug. 12, 2005

(86) PCT No.: PCT/JP2005/014817
§ 371 (c)(1),
(2), (4) Date: Feb. 12, 2007

(87) PCT Pub. No.: WO2006/016671
PCT Pub. Date: Feb. 16, 2006

(65) Prior Publication Data
US 2008/0033679 A1    Feb. 7, 2008

(30) Foreign Application Priority Data
Aug. 12, 2004    (JP)    ............................ 2004-235606
Mar. 1, 2005    (JP)    ............................ 2005-056597

(51) Int. Cl.
*G01P 15/00*    (2006.01)
(52) U.S. Cl. ......................... 702/141; 702/104; 702/127
(58) Field of Classification Search ............. 702/94–96, 702/104, 107, 141, 142, 145, 147, 149, 150, 702/167, 99; 33/1 M; 73/1.37–1.39; 514/514.01, 514/514.2, 514.15, 514.16, 514.35
See application file for complete search history.

(56) References Cited

U.S. PATENT DOCUMENTS 6,337,688 B1 *    1/2002    Berstis ........................ 345/473
(Continued)

FOREIGN PATENT DOCUMENTS

JP    06-156184    6/1994
(Continued)

OTHER PUBLICATIONS

Alan Lai et al. "Semi-automatic calibration technique using six inertial frames of reference," Proceedings of SPIE, vol. 5274, pp. 531-542, 2004.

(Continued)

*Primary Examiner*—Eliseo Ramos Feliciano
*Assistant Examiner*—Mi'schita' Henson
(74) *Attorney, Agent, or Firm*—Finnegan, Henderson, Farabow, Garrett & Dunner, LLP

(57) ABSTRACT

The present invention relates to an acceleration measuring device capable of acquiring the offset for correcting the output of a triaxial acceleration sensor. The invention is provided with an acceleration sensor for detecting the acceleration in a triaxial direction, a data acquisition portion for acquiring the triaxial output data, a data selecting portion for judging whether repeatedly acquired triaxial output data are appropriate to make a selection, a data accumulating portion for accumulating the thus selected triaxial output data, a reference point estimating portion estimating coordinate values of the reference point determined in the three-dimensional cartesian space by referring to the distribution of a predetermined number of accumulated triaxial output data in a three-dimensional cartesian space when each axial component is given as a coordinate value, and an offset correction/calculation portion for correcting the offset of the triaxial output data of the acceleration sensor.

17 Claims, 38 Drawing Sheets

U.S. PATENT DOCUMENTS

2001/0019089 A1* 9/2001 Happ .................. 244/122 AG

FOREIGN PATENT DOCUMENTS

| | | |
|---|---|---|
| JP | 06-331647 | 12/1994 |
| JP | 07-242112 | 9/1995 |
| JP | 09-043269 | 2/1997 |
| JP | 2000-356647 | 12/2000 |
| JP | 2003-101033 | 4/2003 |
| JP | 2004-093552 | 3/2004 |

OTHER PUBLICATIONS

J.C. Lötters et al. "Procedure for in-use calibration triaxial accelerometers in medical applications," Sensors and Actuators A 68, pp. 221-228, 1998.

* cited by examiner

ACCELERATION MEASURING DEVICE

CROSS-REFERENCE TO RELATED APPLICATIONS

This application is a national phase application of International Application No. PCT/JP2005/104817, filed Aug. 12, 2005, and claims the priority of Japanese Application Nos. 2004-235606, filed Aug. 12, 2004, and 2005-056597, filed Mar. 1, 2005, the content of all of which is incorporated herein by reference.

TECHNICAL FIELD

The present invention relates to an acceleration measuring device which corrects the output of a biaxial or a triaxial acceleration sensor and, more particularly, relates to an acceleration measuring device capable of acquiring the offset or both of the offset and the sensitivity necessary for correcting the output of the biaxial or the triaxial acceleration sensor by repeatedly acquiring output data of the biaxial or the triaxial acceleration sensor without consciousness of pointing the attitude of the acceleration measuring device in a specific direction.

BACKGROUND ART

In recent years, a piezoresistance-type triaxial acceleration sensor for semiconductor devices using a MEMS technology (Micro Electro Mechanical Systems) has been developed as a light-weight and small-sized triaxial acceleration sensor which can be assembled into a portable instrument (refer to Patent Document 1, for example).

FIG. 36 is a perspective view showing a brief constitution of a conventional piezoresistance-type triaxial acceleration sensor, in which the reference numeral 201 denotes a silicon substrate, 201a denotes a supporting portion, 201b denotes a weight portion, and 201c denotes a displacement portion. The silicon substrate 201 is constituted by etching with the displacement portion 201c, the supporting portion 201a for supporting the displacement portion 201c and the weight portion 201b for deforming the displacement portion 201c.

Further, piezoresistances R1 to R12 are formed on the displacement portion 201c. Upon application of acceleration to the silicon substrate 201, the weight portion 201b acts to deform the displacement portion 201c, depending on a direction and a magnitude of the acceleration. Then, stress is applied to the piezoresistances R1 to R12 to change resistance values.

FIG. 37A to FIG. 37C are circuit diagrams showing the wire connecting constitution of piezoresistances used in a conventional piezoresistance-type triaxial acceleration sensor. A wheatstone-bridge circuit constituted with piezoresistances R1 to R12 is individually provided by axial directions which detect the acceleration. Output voltage values Vx, Vy and Vz are proportional respectively to x-, y-, z-axis direction acceleration components.

Actual values of Vx, Vy and Vz of the circuit diagrams in FIG. 37A to FIG. 37C are expressed by the following.

$$V_x = \beta_x A_x + V_{ox} \quad (1)$$

$$V_y = \beta_y A_y + V_{oy} \quad (2)$$

$$V_z = \beta_z A_z + V_{oz} \quad (3)$$

where, Ax, Ay, Az denote x, y, z axis direction acceleration components, $B_x$, $B_y$, $B_z$ denote sensitivities to Ax, Ay, Az, and $V_{ox}$, $V_{oy}$, $V_{oz}$ denote offsets present in Vx, Vy, Vz.

In general, sensitivity or offset varies to some extent, and in particular, there is often a case where the variation of offsets is not neglible. Further, in a piezoresistance-type acceleration sensor, the sensitivity and the offset are characterized by marked temperature characteristics. Additionally, the temperature characteristics of the offset often vary to a great extent.

In order to solve the above-described disadvantages, the following means is provided in a conventional acceleration measuring device (refer to Patent Document 2, for example). That is, as a factory default, the sensitivity and the offset are measured in a plurality of different temperature atmospheres, for example, at 0° C., 25° C. and 60° C. and storage means such as EEPROM is mounted on an acceleration measuring device to store measuring data.

Further, when an acceleration measuring device is used, an output correction circuit is mounted on the acceleration measuring device to make correction by calculating the variation of sensitivities and offsets contained in acceleration sensor output voltage and temperature characteristics on the basis of current temperature data and previously stored measurement data.

However, this type of a conventional acceleration measuring device is disadvantageous in the following points.

1) Measurement in a plurality of different temperature atmospheres and measurement of sensitivities will result in a great increase in process number, measurement time and cost of facilities.

2) Calculation of the sensitivity of an output correction circuit and temperature characteristics of offset makes the circuit constitution more complicated to eventually result in an increased production cost.

3) In order to calculate the sensitivity and the temperature characteristics of offset at an improved accuracy, it is necessary to increase measurement temperature points and further complicate a temperature-characteristics calculating portion in an output correction circuit. This is actually difficult in realization.

Further, in a conventional acceleration measuring device, the following solution means is further employed (refer to Patent Document 3, for example). For example, as illustrated in FIG. 38A to FIG. 38F, each time an acceleration measuring device is used, the attitude of an acceleration measuring device 203 is set by six different manners so that the acceleration detecting axial direction of the triaxial acceleration sensor 202 is parallel with the direction of gravitational acceleration g, to measure the output voltage of a triaxial acceleration sensor 202 six times, thereby acquiring the following output voltage data.

$V_{x1}$: $V_x$ measurement value in a attitude shown in FIG. 38A
$V_{x2}$: $V_x$ measurement value in a attitude shown in FIG. 38B
$V_{y1}$: $V_y$ measurement value in a attitude shown in FIG. 38C
$V_{y2}$: $V_y$ measurement value in a attitude shown in FIG. 38D
$V_{z1}$: $V_z$ measurement value in a attitude shown in FIG. 38E
$V_{z2}$: $V_z$ measurement value in a attitude shown in FIG. 38F Sensitivity and offset data necessary for the output correction of a triaxial acceleration sensor are calculated by the following formulae.

$$\beta_x = \frac{V_{x1} - V_{x2}}{2g} \quad (4)$$

$$\beta_y = \frac{V_{y1} - V_{y2}}{2g} \quad (5)$$

-continued $$\beta_z = \frac{V_{z1} - V_{z2}}{2g} \quad (6)$$

$$V_{ox} = \frac{V_{x1} + V_{x2}}{2} \quad (7)$$

$$V_{oy} = \frac{V_{y1} + V_{y2}}{2} \quad (8)$$

$$V_{oz} = \frac{V_{z1} + V_{z2}}{2} \quad (9)$$

However, this type of a conventional acceleration measuring device is disadvantageous in the following points.

1) It is necessary to adjust the attitude of an acceleration measuring device several times to a predetermined direction each time it is used, which gives a great inconvenience to a user.

2) Further, it is difficult for a user to attain an accurate adjustment of the direction, with the acceleration measuring device supported by hand. The sensitivity and the offset calculated by the above formulae may have a greater error.

The present invention has been developed in view of the above-described disadvantages, an object of which is to provide an acceleration measuring device capable of acquiring the offset or both of the sensitivity and the offset necessary for correcting the output of a biaxial or a triaxial acceleration sensor by repeatedly acquiring output data of the biaxial or the triaxial acceleration sensor without consciousness of pointing the attitude of the acceleration measuring device in a specific direction.

[Patent Document 1] Japanese Patent Application Laid-open No. 2003-101033

[Patent Document 2] Japanese Patent Application Laid-open No. 6-331647

[Patent Document 3] Japanese Patent Application Laid-open No. 2004-93552

[Non-Patent Document 1] W. H. Press, S. A. Teukolsky, W. T. Vetterling and B. P. Flannery, Numerical Recipies in C, Second Edition, Cambridge University Press, USA, 1992, pp. 394-455

[Non-Patent Document 2] W. H. Press, S. A. Teukolsky, W. T. Vetterling and B. P. Flannery, Numerical Recipies in C, Second Edition, Cambridge University Press, USA, 1992, pp. 32-104

DISCLOSURE OF THE INVENTION

The present invention has been developed for attaining the above-described object, and is provided with an acceleration measuring device comprising an acceleration sensor for detecting acceleration in a biaxial or a triaxial direction, an output data acquisition means for acquiring biaxial or triaxial output data of the acceleration sensor; an output data selecting means for regarding the output data acquired by the output data acquisition means as a reference output data, calculating a difference with respect to the reference output data each time the output data are acquired by the output data acquisition means, and checking the difference value and its state of continuity, thereby judging whether the acceleration sensor is kept stationary or in uniform motion to select the output data; an output data accumulating means for accumulating the output data selected by the output data selecting means; a reference point estimating means in which the distribution of a predetermined number of output data accumulated by the output data accumulating means in a two-dimensional or a three-dimensional cartesian space when each axial component is given as a coordinate value is referenced to estimate coordinate values of a reference point determine on the cartesian space; and an offset correcting means for correcting the offset of output data of the acceleration sensor on the basis of the coordinate values of the reference point estimated by the reference point estimating means (corresponding to Embodiment 1 shown in FIG. 1).

Further, the output data selecting means uses just-before acquired output data as a reference output data to calculate a difference with respect to the reference output data each time the output data are acquired by the output data acquisition means, thereby judging that the output data concerned are appropriate when the difference becomes within a predetermined value continuously for a predetermined number of times or more.

Further, the output data selecting means regards the predetermined output data acquired by the output data acquisition means as a reference output data, calculates a difference with respect to the reference output data each time the output data are acquired by the output data acquisition means, thereby judging that the output data are appropriate where a period until a difference between the reference output data and current output data exceeds a predetermined value is greater than a predetermined threshold value.

Further, the output data selecting means adds the number of times or time information when the difference is continuously within a predetermined value to the output data selected by the output data selecting means (corresponding to Embodiment 6 shown in FIG. 29 to FIG. 32). Further, the output data accumulating means discards either the output data selected by the output data selecting means or the output data that have already been accumulated by the output data accumulating means based on the number of times or the time information added by the output data selecting means.

Further, the output data selecting means estimates a circle or a spherical surface on the basis of the distribution of a predetermined number of output data acquired by the output data acquisition means in a two-dimensional or a three-dimensional cartesian space when each axial component is given as a coordinate value, thereby judging that the output data which is within a predetermined distance of the circle or the spherical surface is appropriate to make a selection.

Further, the output data selecting means estimates the circle or the spherical surface by regarding a radius of the circle or the spherical surface as a predetermined value.

Further, the present invention is provided with a data change judging means for judging whether the output data selected by the output data selecting means undergoes a change by a predetermined value or to an extent exceeding it as compared with the output data which have already been accumulated by the output data accumulating means, wherein the output data accumulating means discards either the output data selected by the output data selecting means or the output data which have already been accumulated by the output data accumulating means on the basis of the judgment result of the data change judging means.

Further, the output data accumulating means determines in advance a linear axis which is linearly related with a measurement axis of the acceleration sensor, and selectively accumulates output data in which a component of the measurement axis of the acceleration sensor or a component of the linear axis is maximum or minimum among the output data selected by the output data selecting means and the output data accumulated by the output data accumulating means (corresponding to Embodiment 7 shown in FIG. 33 and FIG. 34). Further, the output data accumulating means is to accumulate output data in which a component of the measurement axis or that of the linear axis is maximum or minimum and one or more pieces of other output data. Further, the reference point estimating means judges in advance whether the spherical surface or the ellipsoid is determined with reference to the number of triaxial output data accumulated by the output data accumulating means or the distribution of the data in the three-dimensional cartesian space or both of them, thereby selecting either of them to make an estimation (corresponding to Embodiment 8 shown in FIG. 35). Further, the present invention is provided with a temperature detecting means for detecting temperatures of the acceleration sensor and a temperature-specific correction data storage means for storing coordinate values of the reference point or a length of each principal axis and central coordinate values of the ellipse or the ellipsoid according to each of the predetermined temperature classifications, wherein the output data accumulating means accumulates output data selected by the output data selecting means according to each of the predetermined temperature classifications on the basis of temperature values detected by the temperature detecting means, the reference point estimating means estimates coordinate values of the reference point or a length of each principal axis and central coordinate values of the ellipse or the ellipsoid according to each of the predetermined temperature classifications with reference to a predetermined number of output data of the temperature classification concerned accumulated by the output data accumulating means, and the temperature-specific correction data storage means stores coordinate values of the reference point or a length of each principal axis and central coordinate values of the ellipse or the ellipsoid according to each of the predetermined temperature classifications.

Further, the output data accumulating means corrects the output data selected by the output data selecting means on the basis of a relationship between temperature values detected by the temperature detecting means and the corresponding predetermined temperature classification, thereafter, storing them according to each of the predetermined temperature classifications.

Further, the present invention is provided with a temperature detecting means for detecting temperatures of the acceleration sensor and a temperature-specific correction data storage means for storing coordinate values of the reference point or a length of each principal axis and central coordinate values of the ellipse or the ellipsoid according to each of the predetermined temperature classifications, wherein the output data accumulating means accumulates at the same time temperature values detected by the temperature detecting means when storing the output data selected by the output data selecting means, the reference point estimating means selects a predetermined number of data in which a corresponding temperature value is included in the temperature classification concerned from the output data accumulated by the output data accumulating means according to each of the predetermined temperature classifications, thereby estimating coordinate values of the reference point or a length of each principal axis and a central coordinate value of the ellipse or the ellipsoid, and the temperature-specific correction data storage means stores coordinate values of the reference point or a length of each principal axis and central coordinate values of the ellipse or the ellipsoid according to each of the predetermined temperature classifications.

Further, the offset correcting means corrects the offset or the sensitivity and the offset of output data of the acceleration sensor on the basis of temperature values detected by the temperature detecting means, and coordinate values of the reference point, or a length of each principal axis and central coordinate values of the ellipse or the ellipsoid stored by the temperature-specific correction data storage means according to each of the predetermined temperature classifications.

Further, the reference point estimating means calculates variation with respect to individual coordinate axes with regard to the distribution of a predetermined number of triaxial output data accumulated by the output data accumulating means in the three-dimensional cartesian space, and when a minimum value of the variation with respect to the individual coordinate axes is equal to or less than a predetermined value, it estimates coordinate values of a reference point or a length of each principal axis and central coordinate values of the ellipse determined in a two-dimensional cartesian plane by referring to the distribution of remaining biaxial output data to the exclusion of output data of coordinate axes in which the variation is minimum from a predetermined number of triaxial output data accumulated by the output data accumulating means in the two-dimensional cartesian plane when each axial component is given as a coordinate value, and the offset correcting means corrects the offset or the sensitivity and the offset of biaxial output data of the acceleration sensor on the basis of the coordinate values of the reference point or the length of each principal axis and the central coordinate values of the ellipse.

Further, the reference point estimating means calculates variation of coordinate values of a predetermined number of latest reference points or that of central coordinate values of an ellipse or an ellipsoid estimated by the reference point estimating means and discards the coordinate values of the reference points or the central coordinate values of the ellipse or the ellipsoid when the variation is greater than a predetermined value.

Further, where a distance from the reference point estimated in the two-dimensional or the three-dimensional cartesian space to each of predetermined number of individual output data or a length of each principal axis of an ellipse or an ellipsoid is out of a predetermined range, the reference point estimating means discards the coordinate values of the reference point or the length of each principal axis and the central coordinate values of the ellipse or the ellipsoid.

According to the present invention, provided is an acceleration measurement device that is capable of acquiring the offset or both of the sensitivity and the offset necessary for correcting the output of a biaxial or a triaxial acceleration sensor by repeatedly acquiring output data of the biaxial or the triaxial acceleration sensor without regard for pointing the attitude of the acceleration measurement device to a specific direction when the acceleration measurement device is in use.

Further when an acceleration measurement device is in use, output data of a biaxial or a triaxial acceleration sensor are acquired in a state that the device is placed in one known attitude, for example, it is set in a battery charger, thereby making it possible to acquire the offset necessary for correcting the output of the biaxial or the triaxial acceleration sensor.

Still further it is not necessary to measure or store the sensitivity and the offset in a plurality of different temperature atmospheres as a factory default. It is not necessary either to calculate temperature characteristics of the sensitivity and the offset in an output correction unit. It is not necessary either to point the attitude of the acceleration measurement device to a plurality of specific directions for each use.

It is noted that the present invention can be made into a penta-axial or a hexa-axial sensor in combination with a azimuth sensor having a triaxial earth magnetism detecting means, which is also able to provide the same effect.

BEST MODE FOR CARRYING OUT THE INVENTION

Figure 1:
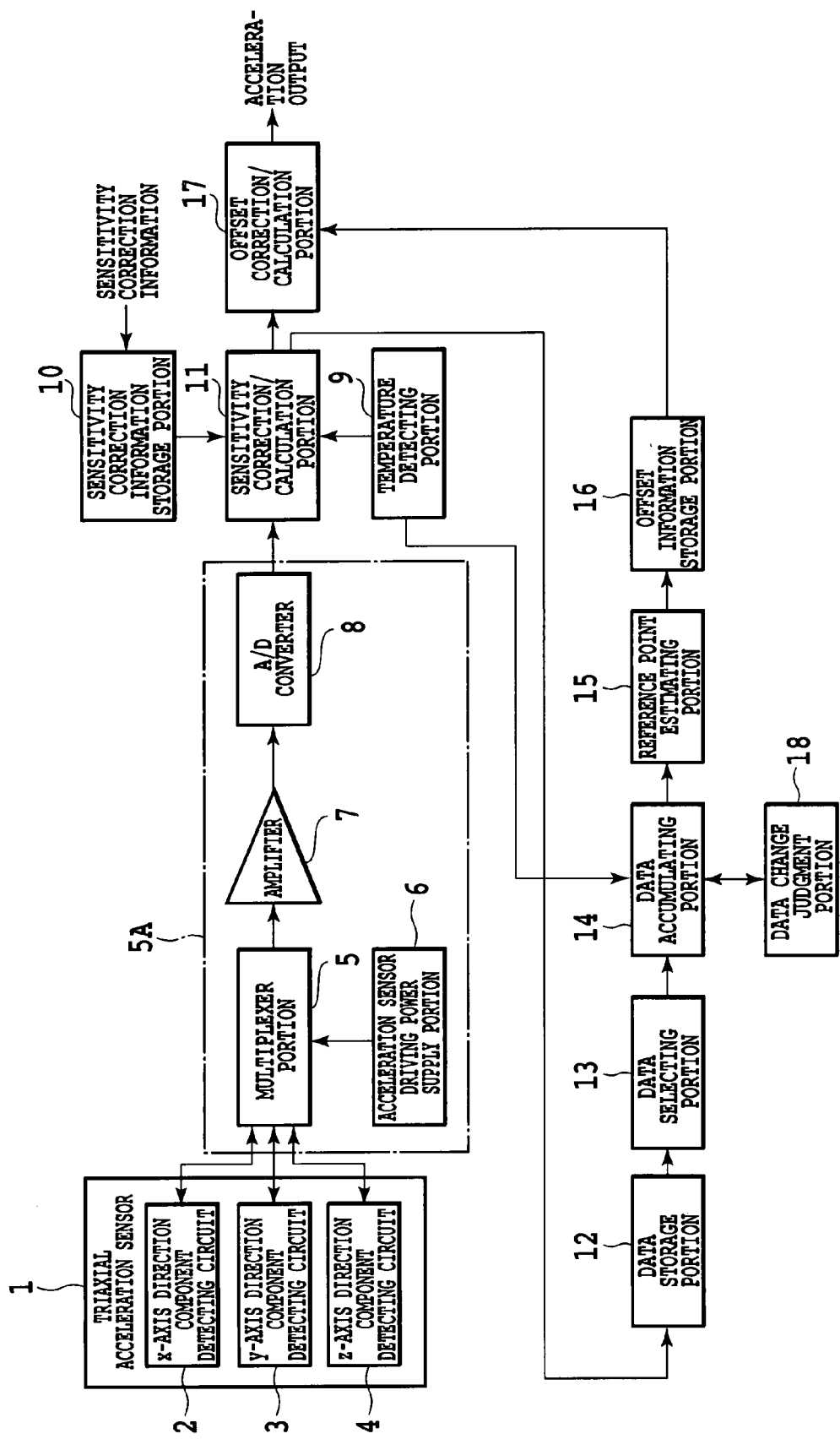
FIG. 1 is a block diagram illustrating Embodiment 1 of an acceleration measurement device of the present invention.

Hereinafter, a description will be given of embodiments of the present invention by referring to the drawings. Embodiment 1 shown in FIG. 1 shows a basic constitution of an acceleration measuring device of the present invention, selecting appropriate data from data acquired from a triaxial acceleration sensor, estimating coordinate values of a reference point determined in a three-dimensional cartesian space to correct the offset.

Figure 11:
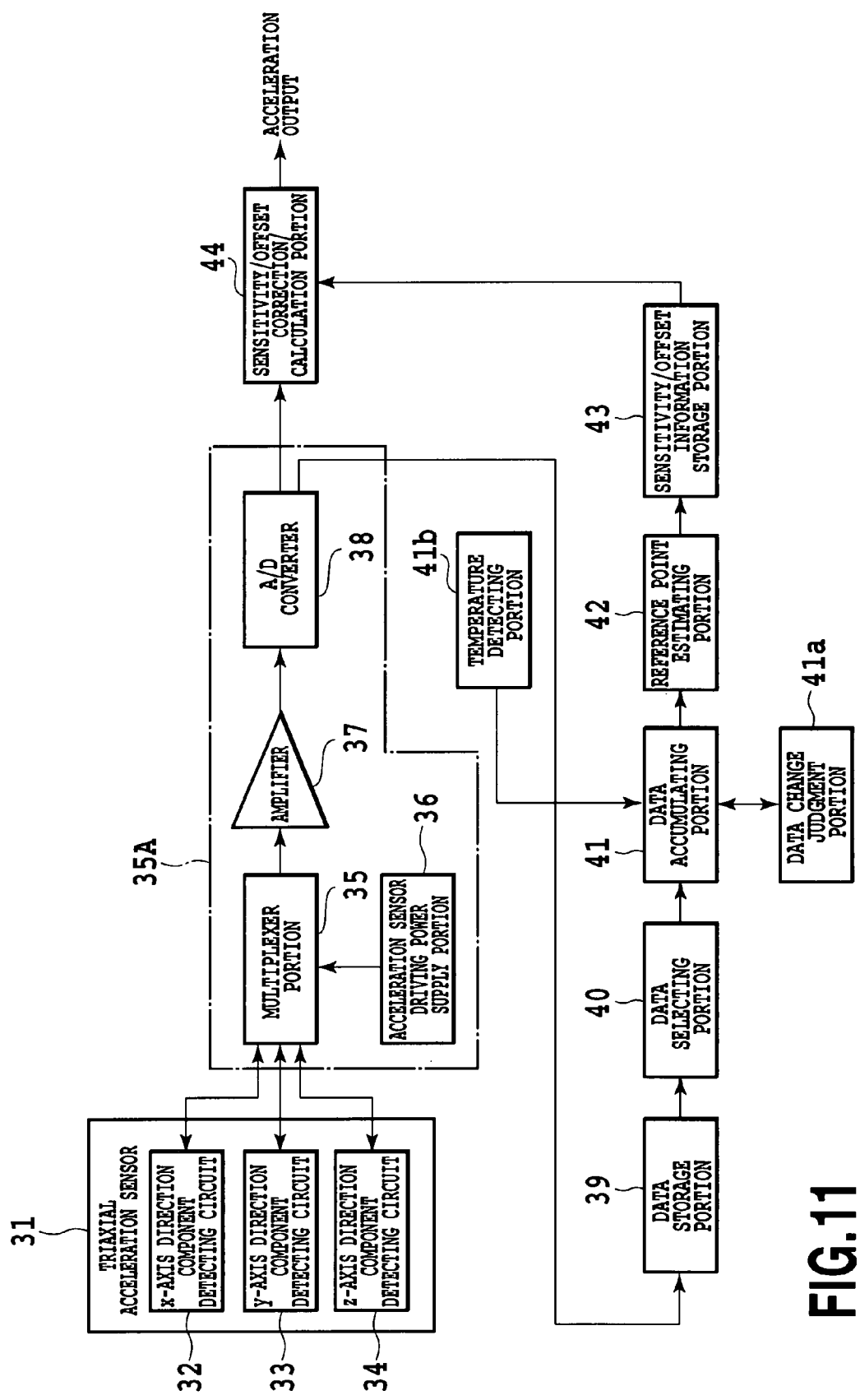
FIG. 11 is a block diagram illustrating Embodiment 2 of the acceleration measuring device of the present invention.

In contrast, Embodiment 2 shown in FIG. 11 determines an ellipsoid in the three-dimensional cartesian space as an estimation of the reference point, estimating a length of the main axis and a central coordinate value to correct the sensitivity and the offset.

Figure 17:
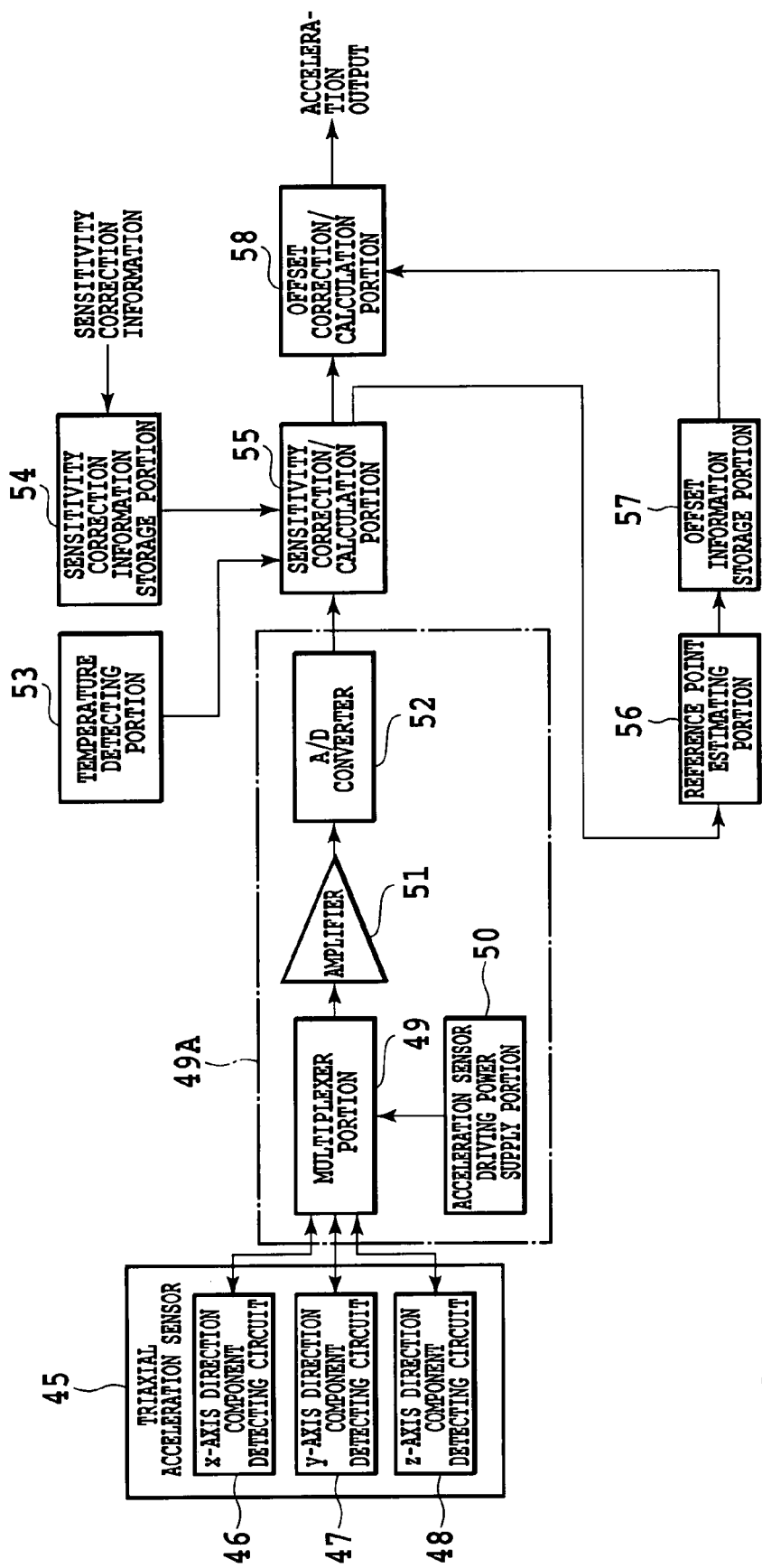
FIG. 17 is a block diagram illustrating Embodiment 3 of the acceleration measuring device in the present invention.

Further, Embodiment 3 shown in FIG. 17 estimates a coordinate value of the reference point determined in the three-dimensional cartesian space by referring to a value of each axial component of gravitational acceleration in which an estimation of the reference point is expected for detection by the triaxial acceleration sensor.

Figure 20:
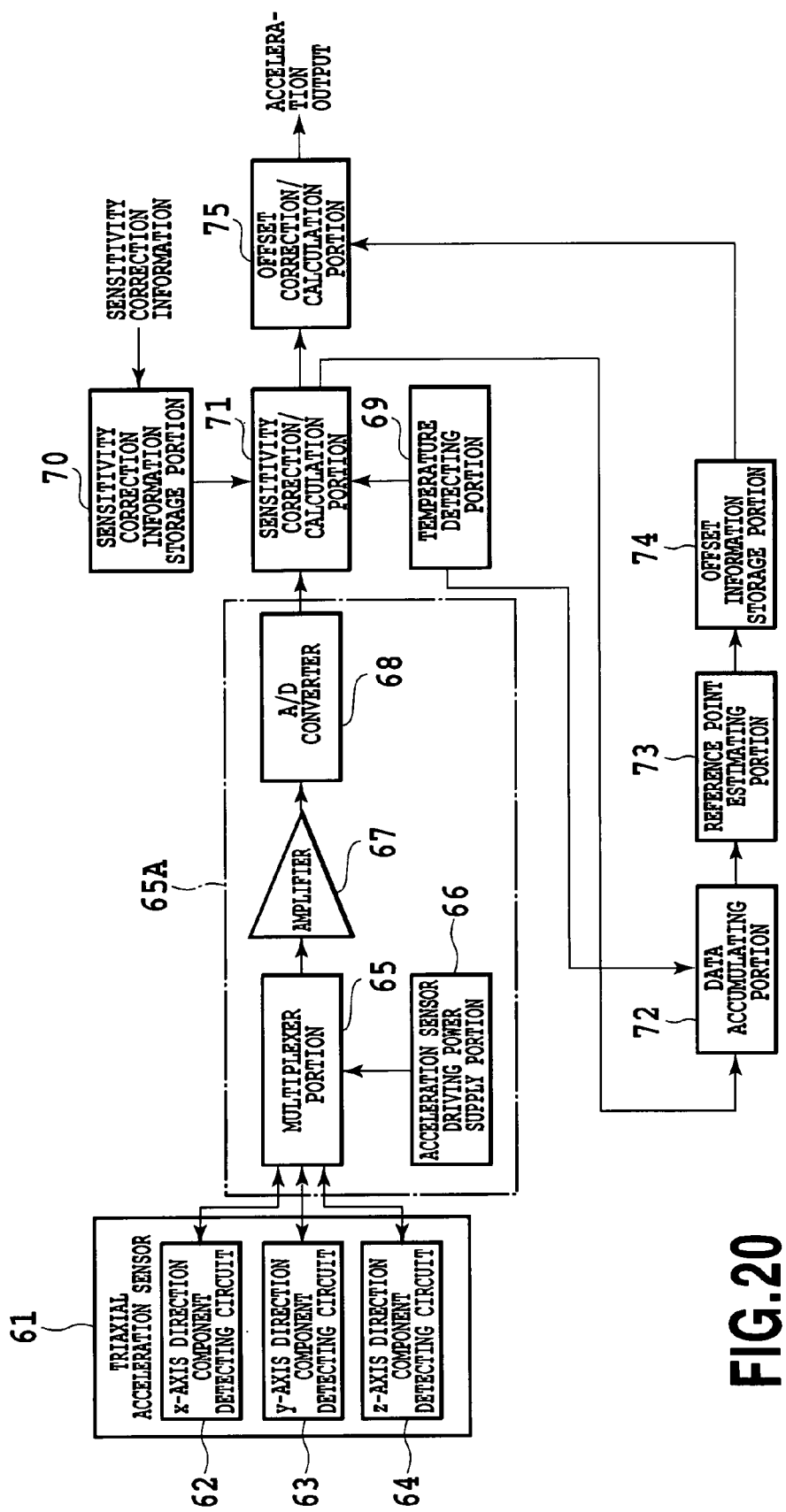
FIG. 20 is a block diagram illustrating Embodiment 4 of the acceleration measuring device in the present invention.

Further, Embodiment 4 shown in FIG. 20 estimates a reference point by a statistical method in which a coordinate value of the reference point determined in a three-dimensional cartesian space is given so that variation of distances from a predetermined number of individual triaxial output data to the reference point can be minimized.

Figure 23:
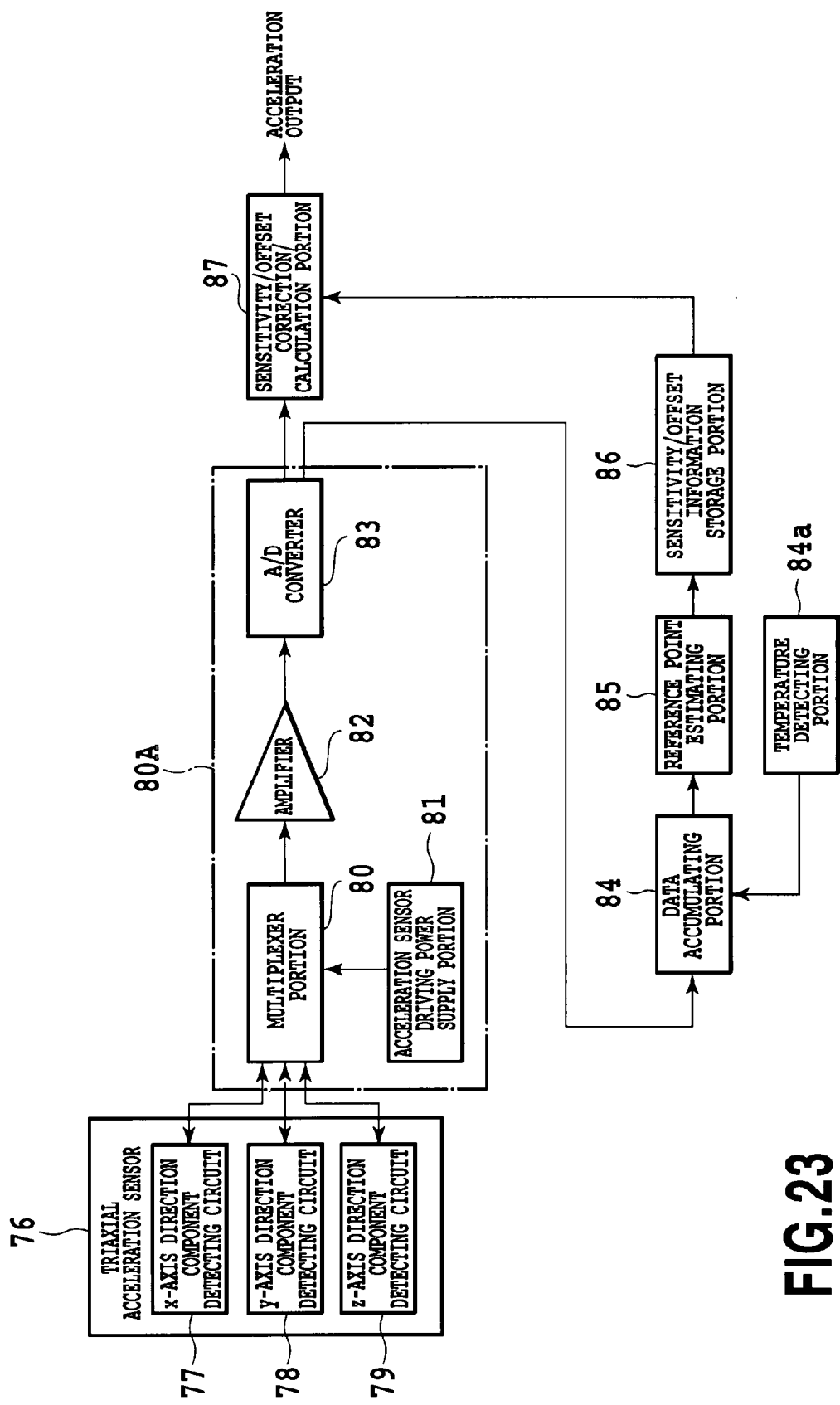
FIG. 23 is a block diagram illustrating Embodiment 5 of the acceleration measuring device in the present invention.

Further, Embodiment 5 shown in FIG. 23 is to estimate a reference point by a statistical method in which a length of each principal axis and a central coordinate value of an ellipsoid determined in a three-dimensional cartesian space are estimated so that a predetermined number of individual triaxial output data can be brought closest to the ellipsoid.

Further, Embodiment 6 given from FIG. 29 to FIG. 32 indicates a case of a triaxial acceleration sensor where the acceleration sensor receives only gravitational acceleration, that is, in a stationary state, the distribution of output data (measurement data) of the acceleration sensor forms a spherical surface or an ellipsoid in a three-dimensional cartesian system, therefore, a judgment is made in a stationary state to determine a central value of the spherical surface or the ellipsoid, thereby estimating the offset.

Figure 33:
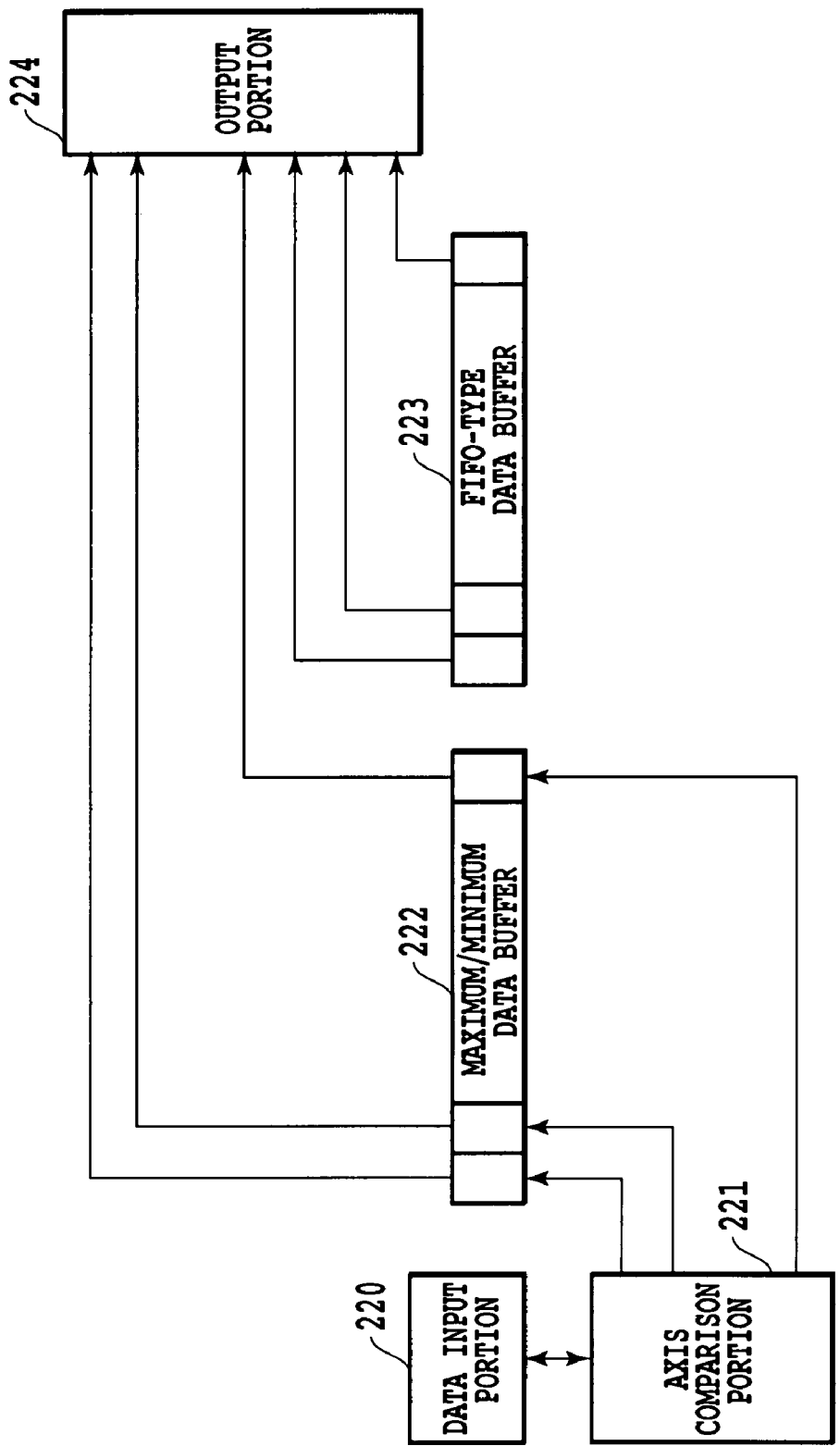
FIG. 33 is a specific block diagram of a data change judgment portion in Embodiment 7 of the present invention.
Figure 34:
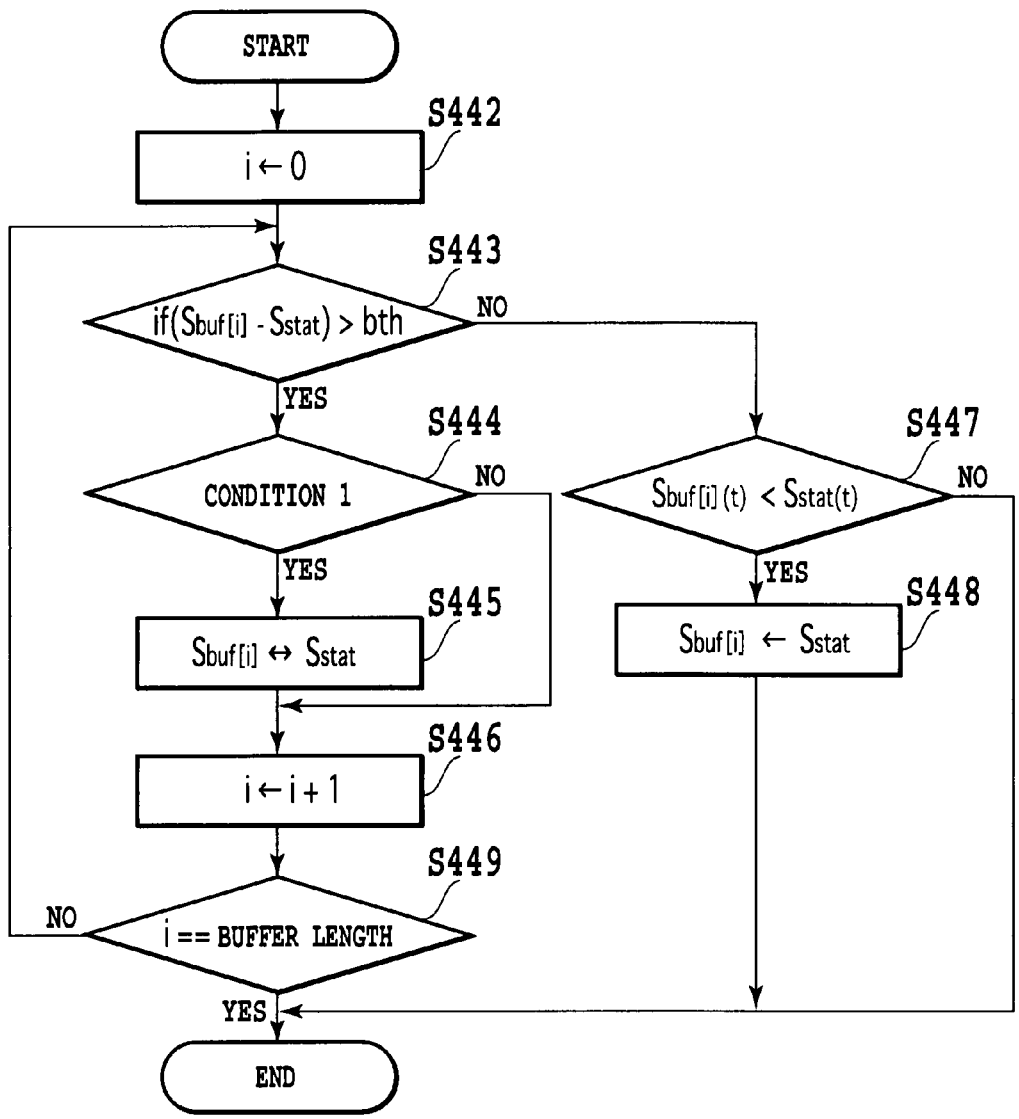
FIG. 34 is a flow chart illustrating procedures for exchanging measurement data inside the data buffer in Embodiment 7 of the present invention.

Further, Embodiment 7 shown in FIG. 33 and FIG. 34 indicates a case where a measurement axis of an acceleration sensor and an axis linearly related therewith are regulated to preferentially accumulate output data which can be maximum or minimum on the axis thereof, thereby acquiring a data group which makes an estimation error small on calculation applied to an ellipsoid.

Figure 35:
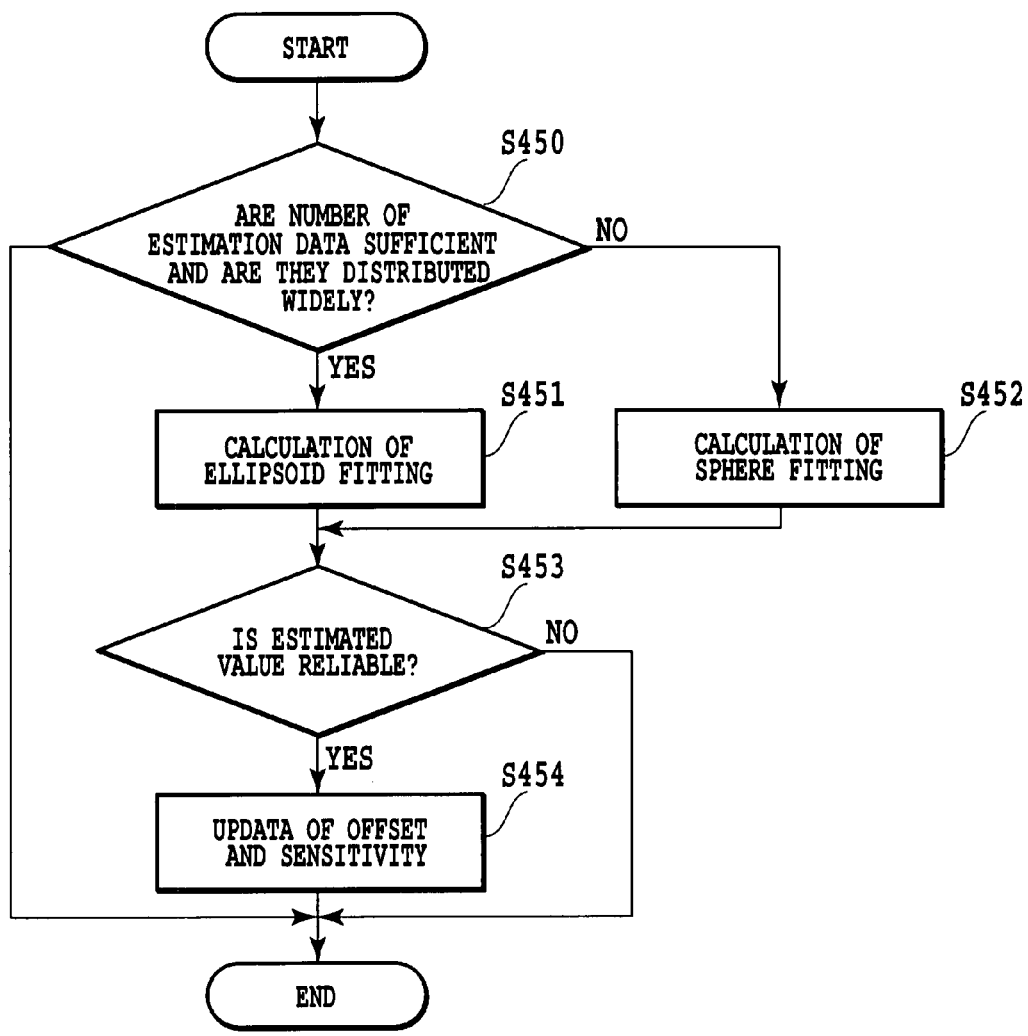
FIG. 35 is a flow chart illustrating a specific method for switching a sphere fitting with an ellipsoid fitting in Embodiment 8 of the present invention.
Figure 36:
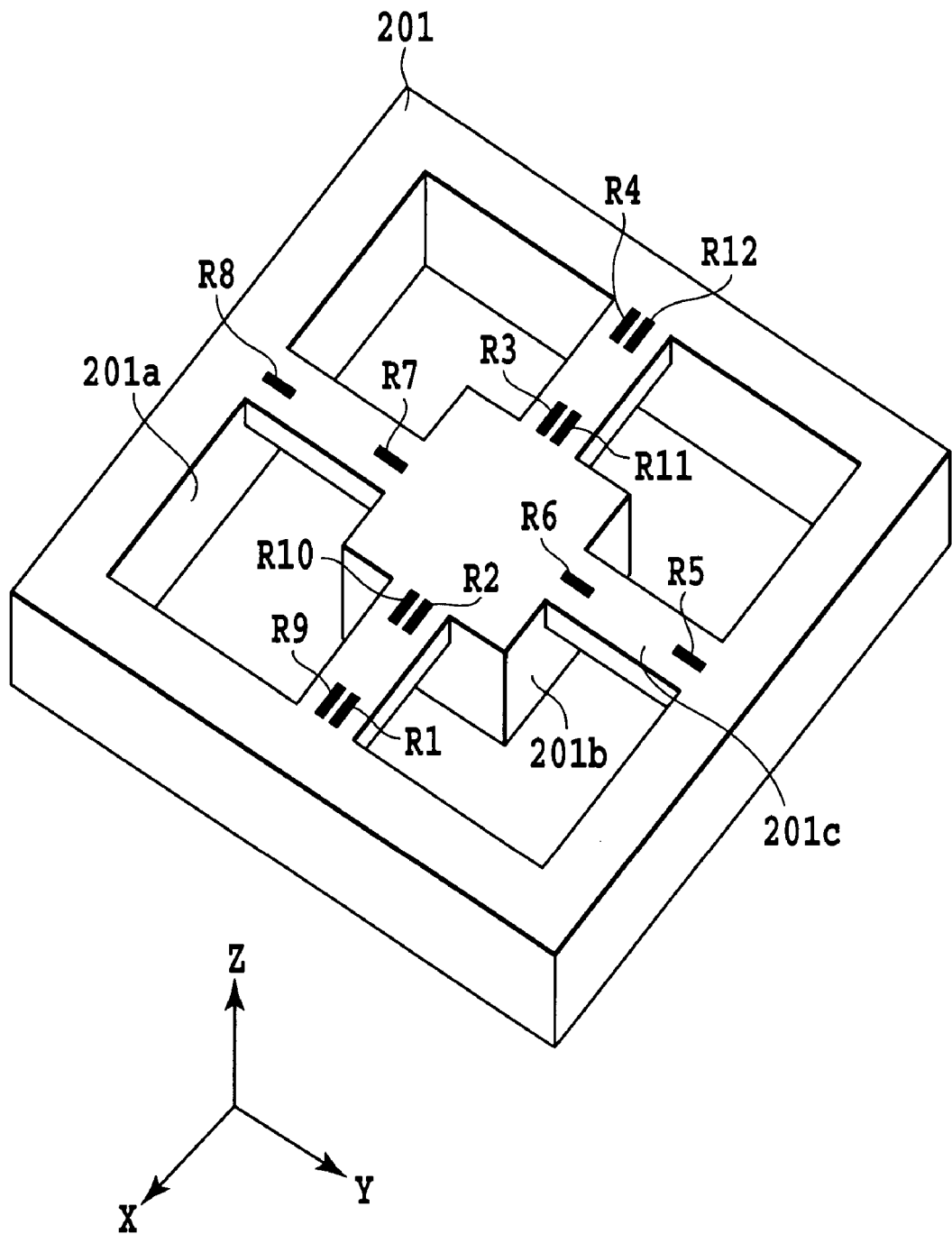
FIG. 36 is a perspective view showing a brief constitution of a conventional piezoresistance-type triaxial acceleration sensor.
Figure 37A:
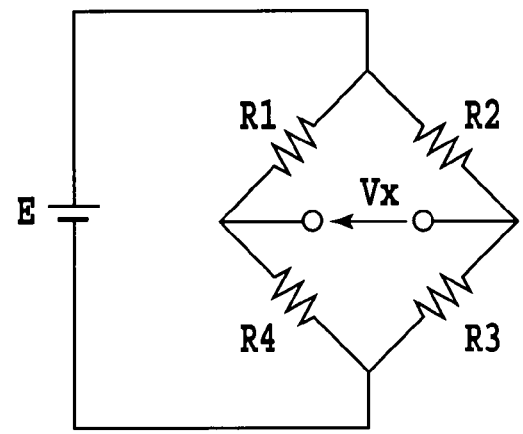
FIG. 37A is a circuit diagram (I) showing a wiring constitution of a piezoresistance in a conventional piezoresistance-type triaxial acceleration sensor.
Figure 37B:
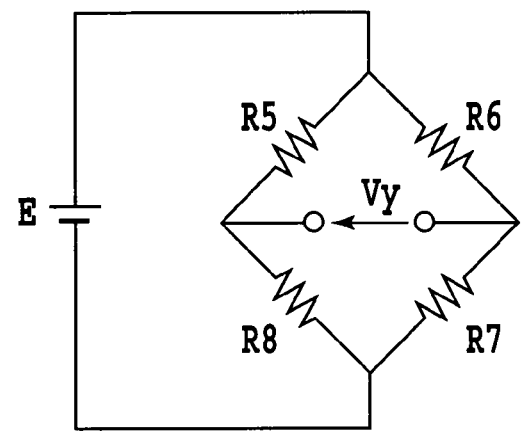
FIG. 37B is a circuit diagram (II) showing a wiring constitution of the piezoresistance in the conventional piezoresistance-type triaxial acceleration sensor.
Figure 37C:
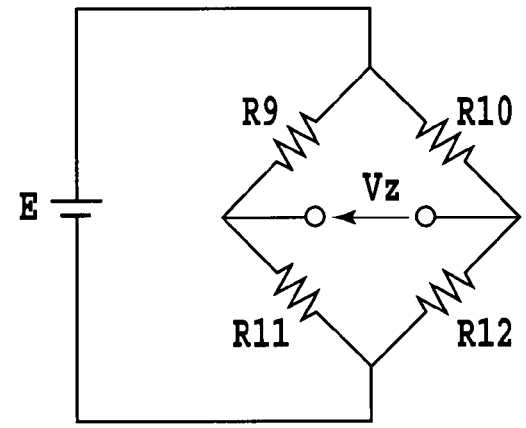
FIG. 37C is a circuit diagram (III) showing a wiring constitution of the piezoresistance in the conventional piezoresistance-type triaxial acceleration sensor.
Figure 38A:
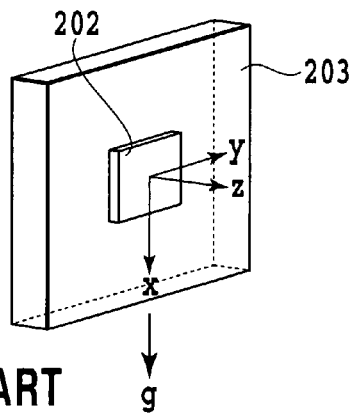
FIG. 38A is a drawing illustrating one method (I) for acquiring sensitivity/offset data for correcting the output in the acceleration measuring device.
Figure 38B:
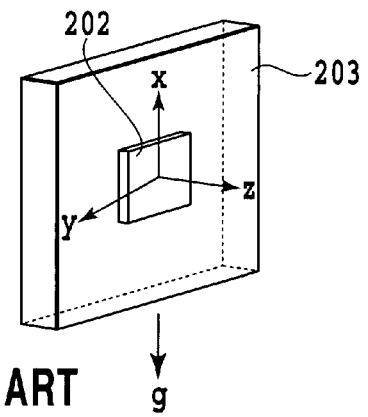
FIG. 38B is a drawing illustrating one method (II) for acquiring the sensitivity/offset data for correcting the output in the conventional acceleration measuring device.
Figure 38C:
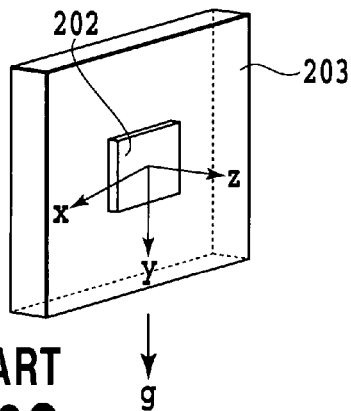
FIG. 38C is a drawing illustrating one method (III) for acquiring the sensitivity/offset data for correcting the output in the conventional acceleration measuring device.
Figure 38D:
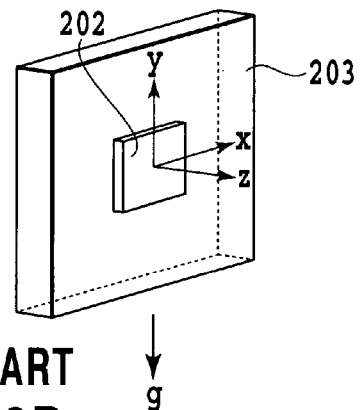
FIG. 38D is a drawing illustrating one method (IV) for acquiring the sensitivity/offset data for correcting the output in the conventional acceleration measuring device.
Figure 38E:
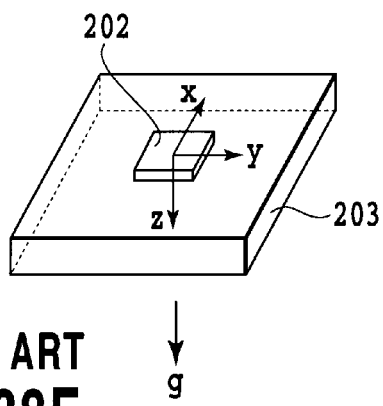
FIG. 38E is a drawing illustrating one method (V) for acquiring the sensitivity/offset data for correcting the output in the conventional acceleration measuring device.
Figure 38F:
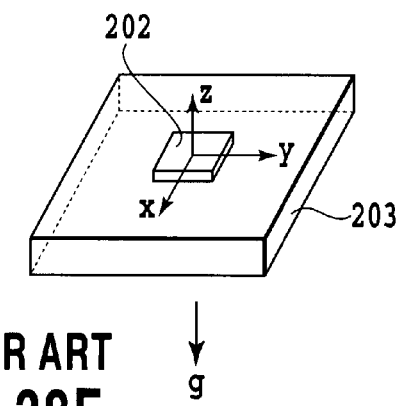
FIG. 38F is a drawing illustrating one method (VI) for acquiring the sensitivity/offset data for correcting the output in the conventional acceleration measuring device.

Further, Embodiment 8 shown in FIG. 35 indicates a case where the number of output data accumulated by the output data accumulating means or the distribution of the output data in the three-dimensional cartesian space is referenced to judge in advance whether a spherical surface or an ellipsoid is estimated, thereby selecting either of them to make an estimation.

EMBODIMENT 1

FIG. 1 is a block diagram illustrating Embodiment 1 of an acceleration measuring device of the present invention, which selects appropriate data from data acquired by a triaxial acceleration sensor, estimating coordinate values of a reference point determined in a three-dimensional cartesian space to correct the offset.

The reference numeral 1 given in the drawing denotes a triaxial acceleration sensor, 2 denotes an x-axis direction component detecting circuit of triaxial acceleration sensor, 3 denotes a y-axis direction component detecting circuit of triaxial acceleration sensor, 4 denotes a z-axis direction component detecting circuit of triaxial acceleration sensor, 5A denotes a data acquisition portion (output data acquisition means), 5 denotes a multiplexer portion, 6 denotes an acceleration sensor driving power supply portion, 7 denotes an amplifier, 8 denotes an A/D converter, 9 denotes a temperature detecting portion, 10 denotes a sensetivity correction information storage portion, 11 denotes a sensitivity correction/calculation portion, 12 denotes data storage portion, 13 denotes a data selecting portion (output data selecting means), 14 denotes a data accumulating portion (output data accumulating means), 15 denotes a reference point estimating portion (reference point estimating means), 16 denotes an offset information storage portion, 17 denotes an offset correction/calculation portion (offset correcting means), and 18 denotes a data change judgment portion (data change judging means).

The acceleration measuring device of the present Embodiment 1 is provided with an acceleration sensor 1 for detecting the acceleration in a triaxial direction, a data acquisition portion 5A for acquiring triaxial output data of the acceleration sensor 1, a data selecting portion 13 for judging whether triaxial output data repeatedly acquired by the data acquisition portion 5A is appropriate and making a selection, a data accumulating portion 14 for accumulating the triaxial output data selected by the data selecting portion 13, a reference point estimating portion 15 in which the distribution of a predetermined number of triaxial output data accumulated by the data accumulating portion 14 in a three-dimensional cartesian space when each axial component is given as a coordinate value is referenced to estimate a coordinate value of a reference point determined in the three-dimensional cartesian space, and an offset correction/calculation portion 17 for correcting the offset of the triaxial output data of the acceleration sensor 1 on the basis of the coordinate value of the reference point estimated by the reference point estimating portion 15. Further, the data acquisition portion 5A is constituted with a multiplexer portion 5, an acceleration sensor driving power supply portion 6, an amplifier 7 and an A/D converter 8.

The triaxial acceleration sensor 1 is provided with an x-axis direction detecting circuit 2 and a y-axis direction detecting circuit 3 and a z-axis direction detecting circuit 4. The x-axis direction detecting circuit 2, the y-axis direction detecting circuit 3 and the z-axis direction detecting circuit 4 detect respectively x-axis direction, y-axis direction and z-axis direction components of the acceleration. A multiplexer portion 5 is connected to the x-axis direction detecting circuit 2, the y-axis direction detecting circuit 3 and the z-axis direction detecting circuit 4 by time division of an acceleration sensor driving power supply portion 6 and an amplifier 7.

The acceleration sensor driving power supply portion 6 supplies electricity to the x-axis direction detecting circuit 2, the y-axis direction detecting circuit 3 and the z-axis direction detecting circuit 4 through the multiplexer portion 5 by the time division. The amplifier 7 amplifies output voltages of the x-axis direction detecting circuit 2, the y-axis direction detecting circuit 3 and the z-axis direction detecting circuit 4 through the multiplexer portion 5 by time division.

The A/D converter 8 effects A/D conversion of the output voltages of the x-axis direction detecting circuit 2, the y-axis direction detecting circuit 3 and the z-axis direction detecting circuit 4 which are amplified by the amplifier 7, thereby outputting them as triaxial output data. The temperature detecting portion 9 detects temperatures of the triaxial acceleration sensor 1. The sensetivity correction information storage portion 10 stores predetermined sensitivity correction information. The sensitivity correction/calculation portion 11 is to correct the sensitivity of triaxial output data output from the A/D converter 8 on the basis of temperature data acquired by the temperature detecting portion 9 and sensitivity correction information stored at the sensetivity correction information storage portion 10.

The data storage portion 12 is a FIFO-type data buffer which retains a predetermined number of triaxial output data sequentially output from the sensitivity correction/calculation portion 11. The data selecting portion 13 selects data appropriate for an estimation of a reference point coordinate made at the reference point estimating portion 15 from triaxial output data retained at the data storage portion 12.

The data accumulating portion 14 is a data buffer for accumulating a predetermined number of triaxial output data selected at the data selecting portion 13. The reference point estimating portion 15 estimates a coordinate of the reference point on the basis of a predetermined number of triaxial output data accumulated at the data accumulating portion 14, thereby outputting the reference point coordinate data.

The offset information storage portion 16 stores the reference point coordinate data output from the reference point estimating portion 15. The offset correction/calculation portion 17 corrects the offset of triaxial output data output from the sensitivity correction/calculation portion 11 on the basis of the reference point coordinate data stored at the offset information storage portion 16.

Next, a description will be given of a method for estimating a coordinate of the reference point at the reference point estimating portion 15.

Sensitivity-corrected triaxial output data Sx, Sy, Sz output from the sensitivity correction/calculation portion 11 are expressed by the following formulae.

$$S_x = aA_x + C_x \quad (10)$$

$$S_y = aA_y + C_y \quad (11)$$

$$S_z = aA_z + C_z \quad (12)$$

In the above formulae, a denotes corrected sensitivity, and Cx, Cy, Cz denote offset present in Sx, Sy and Sz. Where an acceleration measuring device is stationary or uniform motion, the acceleration applied to the triaxial acceleration sensor 1 is only gravitational acceleration g. Therefore, x-, y-, z-axis direction components of the gravitational acceleration g are given Gx, Gy, Gz to provide the following formulae.

$$A_x = G_x \quad (13)$$

$$A_y = G_y \quad (14)$$

$$A_z = G_z \quad (15)$$

$$S_x = aG_x + C_x \quad (16)$$

$$S_y = aG_y + C_y \quad (17)$$

$$S_z = aG_z + C_z \quad (18)$$

On the contrary, the following formula is obtained.

$$G_x^2 + G_y^2 + G_z^2 = g^2 \quad (19)$$

Then, the following formula is also obtained.

$$(S_x - C_x)^2 + (S_y - C_y)^2 + (S_z - C_z)^2 = a^2 g^2 \quad (20)$$

Figure 2:
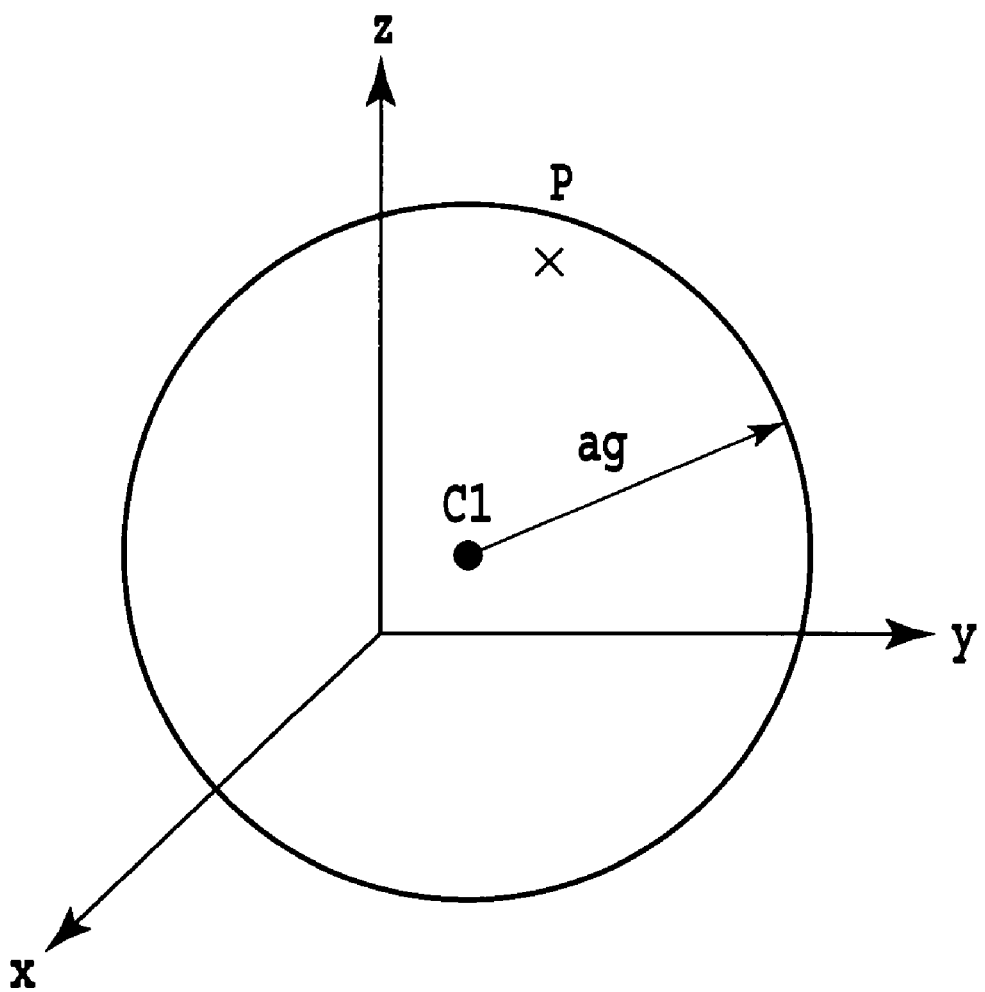
FIG. 2 is a conceptual diagram showing a reference point of Embodiment 1 of the present invention.

According to the above formula (20), as illustrated in FIG. 2, points P (Sx, Sy, Sz) having each axial component of triaxial output data as a coordinate value in a three-dimensional cartesian space (x, y, z) are to be always positioned at a certain distance "ag" from reference points C1 (Cx, Cy, Cz) having an offset value of each axial component of triaxial output data as a coordinate value.

Here, triaxial output data are acquired, which are output from the sensitivity correction/calculation portion 11 respectively in attitudes of N pieces of the triaxial acceleration sensor 1, data of each axial component are expressed respectively as follows:

$$S_{1x}, S_{2x}, \ldots, S_{Nx}$$

$$S_{1y}, S_{2y}, \ldots, S_{Ny}$$

$$S_{1z}, S_{2z}, \ldots, S_{Nz}$$

Next, triaxial output data acquired in the three-dimensional cartesian space (x, y, z) are expressed as points of N pieces which are $P_1(S_{1x}, S_{1y}, S_{1z})$, $P_2(S_{2x}, S_{2y}, S_{2z})$, ..., $P_N(S_{Nx}, S_{Ny}, S_{Nz})$.

Figure 3:
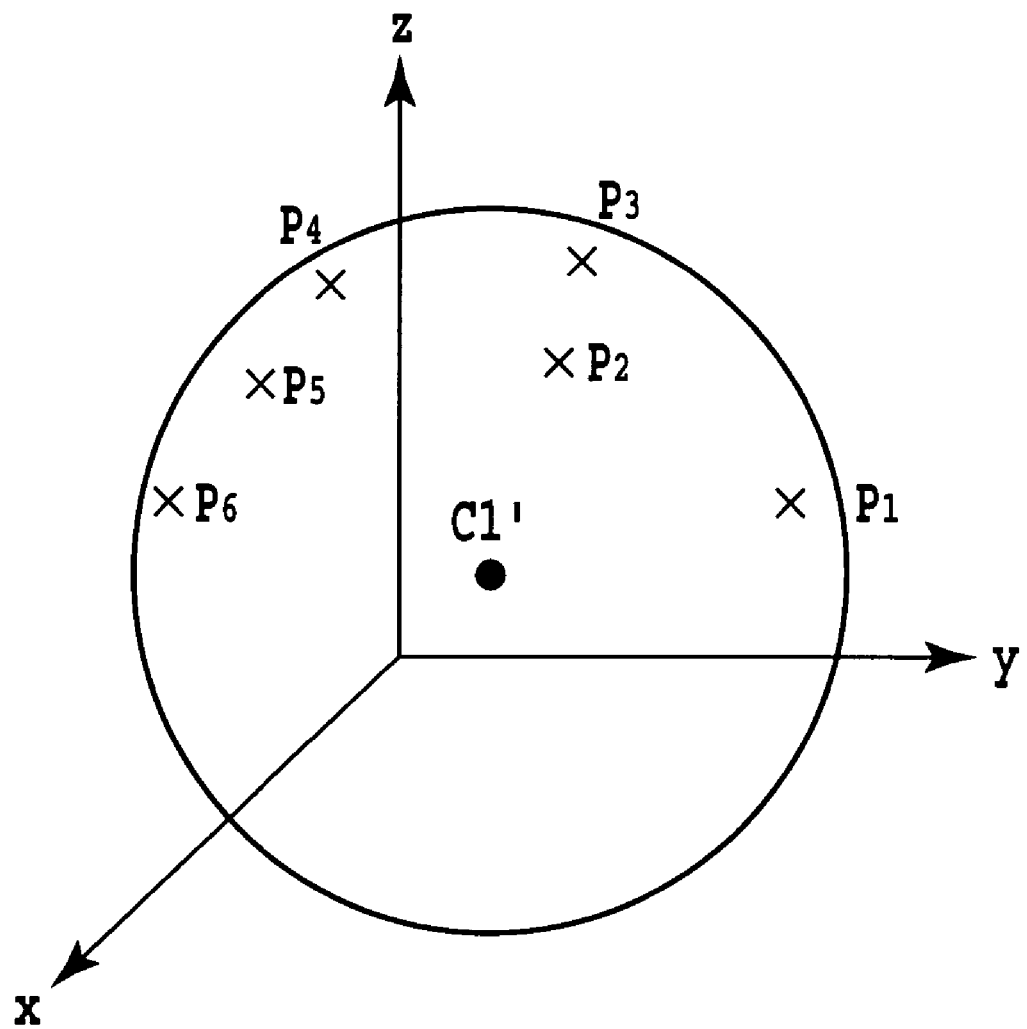
FIG. 3 is a conceptual diagram showing an estimation of the reference point in Embodiment 1 of the present invention.

Then, as illustrated in FIG. 3, when an estimation is made for points C1'(Cx', Cy', Cz') whose distance is kept constant from any of $P_1, P_2, \ldots, P_N$, the point C1' is expected to correspond to the reference point C1, thereby making it possible to estimate an offset value of each axial component, Cx, Cy, Cz by referring to the coordinate values Cx', Cy' and Cz' of the point C1'.

<Specific method (I) for estimating C1'(Cx', Cy', Cz')>

The reference point estimating portion 15 estimates a coordinate value of the reference point by a statistical method so as to minimize variation of distances from a predetermined number of individual triaxial output data to the reference point.

Various methods are available for estimating C1'(Cx', Cy', Cz') from $P_1, P_2, \ldots P_N$ and an estimation can be made at least at N=4.

However, since sensitivities of the piezoresistance-type triaxial acceleration sensor are available only in a number of about several hundreds μV/G/V, the output voltage is quite subtle and substantial noises are superimposed on acquired triaxial output data.

In the three-dimensional cartesian space (x, y, z), a distance "$d_i$" from the points $P_i(S_{ix}, S_{iy}, S_{iz})$ of i-th triaxial output data to C1'(Cx', Cy', Cz') is expressed as follows:

$$d_i = \sqrt{(S_{ix} - C'_x)^2 + (S_{iy} - C'_y)^2 + (S_{iz} - C'_z)^2} \quad (21)$$

Comparison of the above formula (21) with the above formula (20) should ideally result in a constant value of "$d_i = ag$" for all $P_1, P_2, \ldots P_N$.

However, since substantial noises are superimposed on the acquired triaxial output data, "$d_i = ag$" is not acquired.

Therefore, a statistical method is employed to estimate C1'(Cx', Cy', Cz') by increasing N to minimize variation of $d_i$, thereby making it possible to estimate them accurately even if substantial noises are superimposed.

$Z_1$ shown in the following formula is defined as a value indicating variation of "$d_i$".

$$Z_1 = \sum (d_i^2 - r^2)^2 \quad (22)$$
$$= \sum \{(S_{ix} - C'_x)^2 + (S_{iy} - C'_y)^2 + (S_{iz} - C'_z)^2 - r^2\}^2$$

In the above formula, "$r^2$" is a mean value of "$d_i^2$" and expressed by the following formula.

$$r^2 = \frac{1}{N}\sum\{(S_{ix} - C'_x)^2 + (S_{iy} - C'_y)^2 + (S_{iz} - C'_z)^2\} \quad (23)$$

Cx', Cy', Cz' may be decided so that the $Z_1$ can be minimized.

The above formula (23) may be optimized (refer to Non-Patent Document 1, for example) to directly calculate Cx', Cy', CZ'. In this method, however, calculation should be made repeatedly until the solution is converged, and the following method is advantageous in calculation time and others.

In the case where the above formula (23) is partially differentiated by using Cx', Cy', Cz' and all the partially differentiated values are zero, that is, $$\frac{\partial Z_1}{\partial C'_x} = 0 \quad (24)$$

$$\frac{\partial Z_1}{\partial C'_y} = 0 \quad (25)$$

$$\frac{\partial Z_1}{\partial C'_z} = 0 \quad (26)$$

are satisfied, S is regarded as being minimized.

When the above formulae (24) to (26) are developed, the following simultaneous linear equations are derived for Cx', Cy', Cz'. Therefore, a solving method of a well known simultaneous linear equation such as the Choleski method (refer to Non-Patent Document 2, for example) can be used to calculate Cx', Cy', Cz'.

$$\begin{bmatrix} \sum S_{ix}(S_{ix} - \bar{S}_x) & \sum S_{iy}(S_{ix} - \bar{S}_x) & \sum S_{iz}(S_{ix} - \bar{S}_x) \\ \sum S_{iy}(S_{ix} - \bar{S}_x) & \sum S_{iy}(S_{iy} - \bar{S}_y) & \sum S_{iz}(S_{iy} - \bar{S}_y) \\ \sum S_{iz}(S_{ix} - \bar{S}_x) & \sum S_{iz}(S_{iy} - \bar{S}_y) & \sum S_{iz}(S_{iz} - \bar{S}_z) \end{bmatrix} \begin{bmatrix} C'_x \\ C'_y \\ C'_z \end{bmatrix} = \quad (27)$$

$$\frac{1}{2}\begin{bmatrix} \sum(S_{ix} - \bar{S}_x)(S_{ix}^2 + S_{iy}^2 + S_{iz}^2) \\ \sum(S_{iy} - \bar{S}_y)(S_{ix}^2 + S_{iy}^2 + S_{iz}^2) \\ \sum(S_{iz} - \bar{S}_z)(S_{ix}^2 + S_{iy}^2 + S_{iz}^2) \end{bmatrix}$$

However, the following equations must be satisfied.

$$\bar{S}_x = \frac{1}{N}\sum S_{ix} \quad (28)$$

$$\bar{S}_y = \frac{1}{N}\sum S_{iy} \quad (29)$$

$$\bar{S}_z = \frac{1}{N}\sum S_{iz} \quad (30)$$

<Specific Method (II) for Estimating C1'(Cx', Cy', Cz')>

The reference point estimating portion 15 estimates a coordinate value of the reference point by a statistical method in such a manner that a distance from each of a predetermined number of individual triaxial output data to the reference point can be brought closest to a predetermined representative value.

As described previously, in the three-dimensional cartesian space (x, y, z), a distance from $P_1, P_2, \ldots P_N$ to C1' (Cx', Cy', Cz') should be ideally a constant value ag.

Then, in the above formula (22), "r" is displaced by a predetermined value of "ag" and $Z_2$ is defined by the following formula as a value indicating variation of "di" with respect to the "ag", thereby Cx', Cy', Cz' may be decided so as to minimize the value.

$$Z_2 = \sum(d_i^2 - a^2g^2) \quad (31)$$
$$= \sum\{(S_{ix} - C'_x)^2 + (S_{iy} - C'_y)^2 + (S_{iz} - C'_z)^2 - a^2g^2\}^2$$

Further, $Z_3$ defined by the following formula and Cx', Cy', Cz' may be decided so as to minimize the value.

$$Z_3 = \sum(d_i - ag)^2 \quad (32)$$
$$= \sum\{\sqrt{(S_{ix} - C'_x)^2 + (S_{iy} - C'_y)^2 + (S_{iz} - C'_z)^2} - ag\}^2$$

The above formulae (31) and (32) may be optimized (refer to Non-Patent Document 1, for example) to calculate Cx', Cy', Cz'.

This method is advantageous in securely preventing an estimation of wrong reference point coordinates due to noises, for example, when a corrected sensitivity "a" can be clearly defined.

Next, a description will be given of a method for selecting triaxial output data at the data selecting portion 13.

Where an acceleration measuring device is in operation while triaxial output data are being acquired, the triaxial acceleration sensor 1 is given kinetic acceleration other than gravitational acceleration "g". Specifically, $$A_x = G_x + K_x \quad (33)$$

$$A_y = G_y + K_y \quad (34)$$

$$A_z = G_z + K_z \quad (35)$$

In the above formulae, Kx, Ky, Kz denote x, y, z axis direction components of the kinetic acceleration.

In this instance, the above formula (20) is not valid. It is, therefore, impossible to estimate a reference point coordinate at the reference point estimating portion 15.

Then, where triaxial output data may be acquired while an acceleration measuring device is in operation, it is necessary to select triaxial output data which are estimated to be acquired when the acceleration measuring device is stationary or uniform motion from the thus acquired triaxial output data.

<Specific Method (I)>

The data selecting portion 13 calculates a difference with respect to triaxial output data acquired just before each time when the triaxial output data are acquired by the output data acquisition portion 5A and judges the triaxial output data appropriate when the difference is within a predetermined value continuously at the number of times no less than a predetermined number of times.

Where an acceleration measuring device is usually used as a mobile device or assembled into such a mobile device, it is less likely that a kinetic speed is made constant when the acceleration measuring device is in operation.

Therefore, if there is a period when acceleration given to the triaxial acceleration sensor 1 is made approximately constant, it may be possible to regard that the acceleration measuring device is stationary and the triaxial acceleration sensor 1 receives only the gravitational acceleration during the period.

Figure 4:
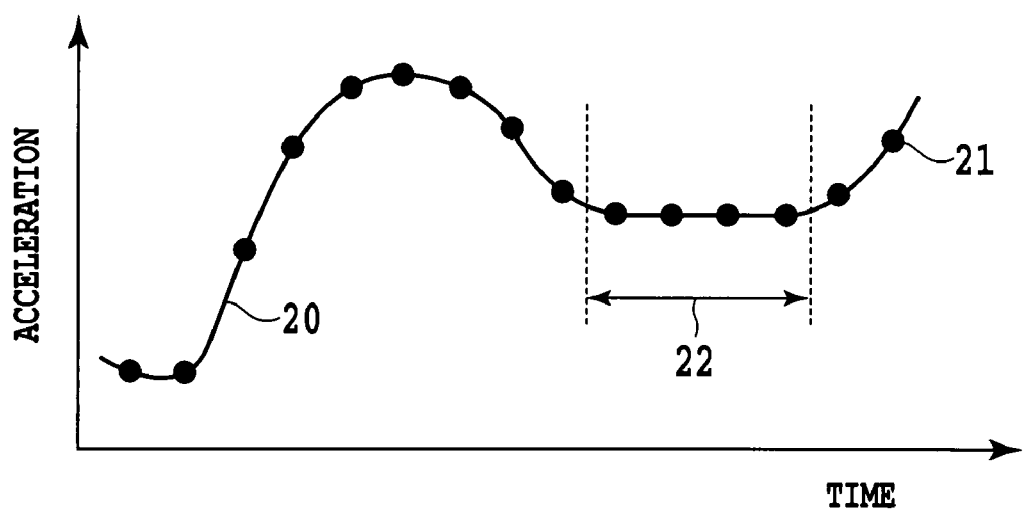
FIG. 4 is a conceptual diagram showing a specific method (I) for selecting triaxial output data in Embodiment 1 of the present invention.

FIG. 4 is a conceptual diagram showing a specific method (I) for selecting triaxial output data in Embodiment 1. It is expressed in a mono-dimensional manner here for a simple explanation.

A curve 20 indicates a time change of acceleration which the triaxial acceleration sensor 1 receives, and a black point 21 indicates a timing for acquiring the triaxial output data. Since the acceleration is approximately constant at an interval 22 and an acceleration measuring device can be regarded as being stationary, output data acquired at this interval may be selected.

Figure 5:
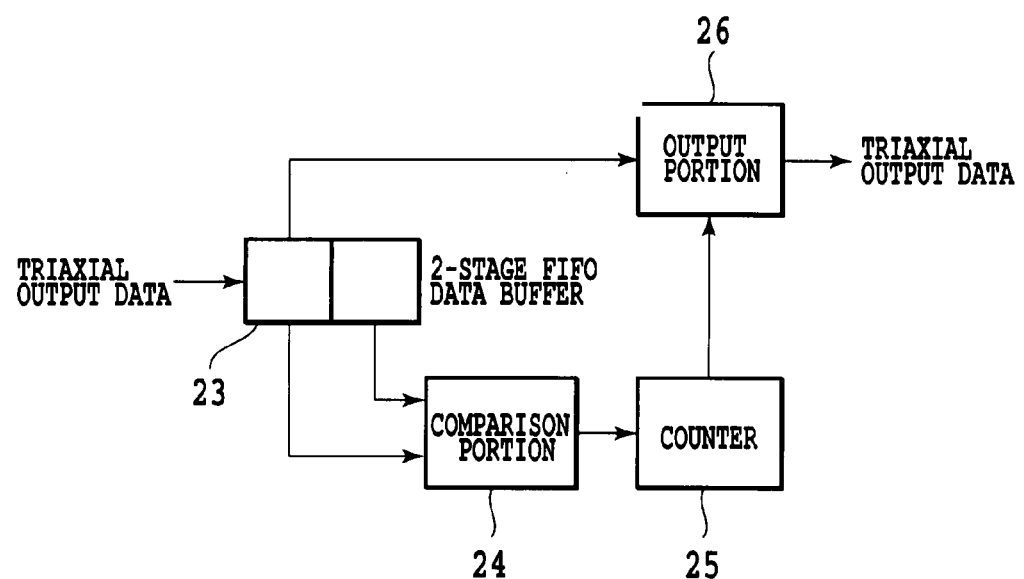
FIG. 5 is a block diagram showing a specific method (I) for selecting the triaxial output data in Embodiment 1 of the present invention.

FIG. 5 is a block diagram showing a specific method (I) for selecting triaxial output data in Embodiment 1, or illustrating in detail the data storage portion 12 and the data selecting portion 13. In the drawing, the reference numeral 23 denotes a two-stage FIFO-type data buffer, 24 denotes a comparison portion, 25 denotes a counter, and 26 denotes an output portion.

The two stage FIFO-type data buffer 23 corresponds to the data storage portion 12 and stores triaxial output data sequentially output from the sensitivity correction/calculation portion 11. The comparison portion 24 calculates a difference between triaxial output data stored at each stage of the two stage FIFO-type data buffer 23, clearing the counter 25 when the difference exceeds a predetermined value or increasing the counter 25 by one value when it is below the predetermined value.

When the counter 25 reaches a predetermined value, for example, 3 or more, the output portion 26 is driven to output triaxial output data accommodated at the first stage of the two-stage FIFO-type data buffer 23 as selected triaxial output data.

<Specific Method (II)>

The data selecting portion 13 estimates a spherical surface on the basis of the distribution of a predetermined number of triaxial output data repeatedly acquired by the data acquisition portion 5A in a three-dimensional cartesian space when each axial component is given as a coordinate value, judging that triaxial output data within a predetermined distance from the spherical surface is appropriate and selecting the data.

Where triaxial output data acquired during the application of kinetic acceleration to an acceleration measuring device are expressed as points P (Sx, Sy, Sz) in which each axial component of triaxial output data is given as a coordinate value in a three-dimensional cartesian space (x, y, z), as illustrated in FIG. 2, a distance from reference points C1 (Cx, Cy, Cz) is more likely to deviate from "ag" in line with an increase in kinetic acceleration.

An estimation of reference point coordinates at the reference point estimating portion 15 is greater in error when triaxial output data are included in which a distance from the reference points C1 (Cx, Cy, Cz) to the points P (Sx, Sy, Sz) greatly deviates from "ag".

Figure 6:
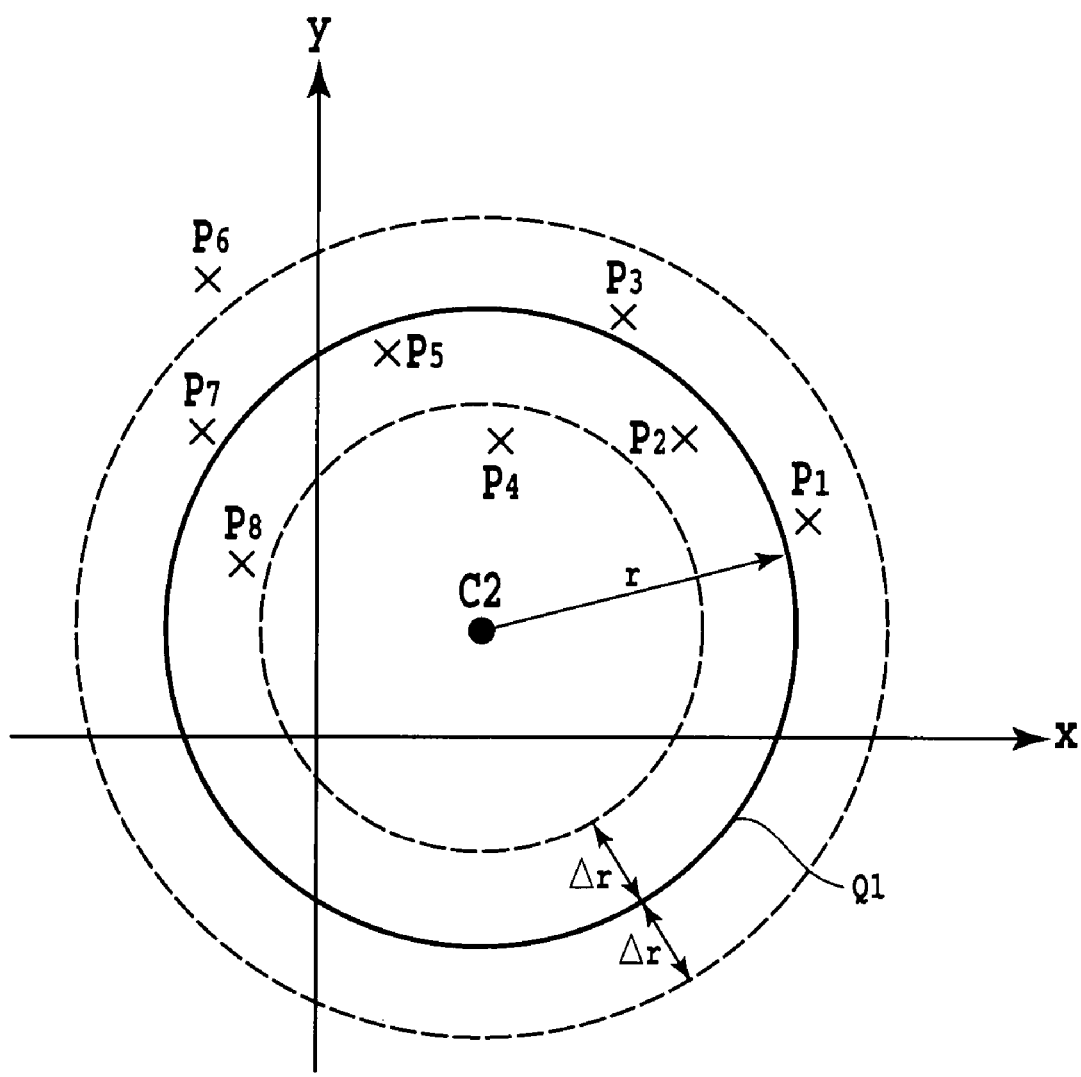
FIG. 6 is a conceptual diagram showing a specific method (II) for selecting the triaxial output data in Embodiment 1 of the present invention.

FIG. 6 is a conceptual diagram of the specific method 2 for selecting triaxial output data in Embodiment 1, illustrating a specific method for selecting the triaxial output data on the basis of the above-described tendency. It is expressed in a two-dimensional manner here for a simple explanation.

Where the latest predetermined number of pieces of triaxial output data retained at the data storage portion 12, for example, 8 are expressed by points $P_1(S_{1x}, S_{1y}, S_{1z})$, $P_2(S_{2x}, S_{2y}, S_{2z})$, ..., $P_8(S_{8x}, S_{8y}, S_{8z})$ in which in the three-dimensional cartesian space (x, y, z) at each axial component of individual triaxial output data is given as a coordinate value, an estimation is made for a spherical surface Q1 which satisfies the distribution of these points.

Triaxial output data corresponding to P1, P2, P3, P5, P7, P8 present within a predetermined distance Δr are output as selected triaxial output data from the spherical surface Q1.

The spherical surface Q1 can be specifically estimated, for example, by a method to be described later. Further, for example, where the corrected sensitivity "a" can be clearly specified, the spherical surface Q1 may be estimated by using the radius r of the spherical surface Q1 as a predetermined value.

Next, a description will be given of the data accumulating portion 14 and the data change judgment portion 18. The data change judgment portion 18 is provided for judging whether the triaxial output data selected by the data selecting portion 13 is changed to an extent equal to or greater than a predetermined value by comparison with the triaxial output data that have already been accumulated by the data accumulating portion 14. The data accumulating portion 14 does not accumulate the triaxial output data selected by the data selecting portion 13 but discards it on the basis of the judgment result made by the data change judgment portion 18.

Where triaxial acceleration data accumulated by the data accumulating portion 14 are expressed as points $P_1(S_{1x}, S_{1y}, S_{1z})$, $P_2(S_{2x}, S_{2y}, S_{2z})$, ..., $P_N(S_{Nx}, S_{Ny}, S_{Nz})$ in which each axial component of triaxial output data is given as a coordinate value in a three-dimensional cartesian space (x, y, z), there is a problem that a great error is made in estimating a reference point coordinate at the reference point estimating portion 15, if individual points are concentrated at a narrow area.

This problem is equivalent to the fact that only triaxial acceleration data acquired when the triaxial acceleration sensor 1 is in the same attitude are accumulated at the data accumulating portion 14.

In order to avoid the above-described problem, before triaxial output data selected at the data selecting portion 13 are accumulated at the data accumulating portion 14, the data are compared with the triaxial output data that have already been accumulated at the data accumulating portion 14, thereby, either of these data are not accumulated but may be discarded, if the data are not changed to an extent equal to or greater than a predetermined value.

This is equivalent to a fact that if a attitude of the triaxial acceleration sensor 1 on acquiring triaxial output data selected at the data selecting portion 13 is not changed to a greater extent than that of the triaxial acceleration sensor 1 on acquiring the triaxial output data that have already been accumulated at the data accumulating portion 14, either of these triaxial output data are not accumulated but discarded.

Figure 7:
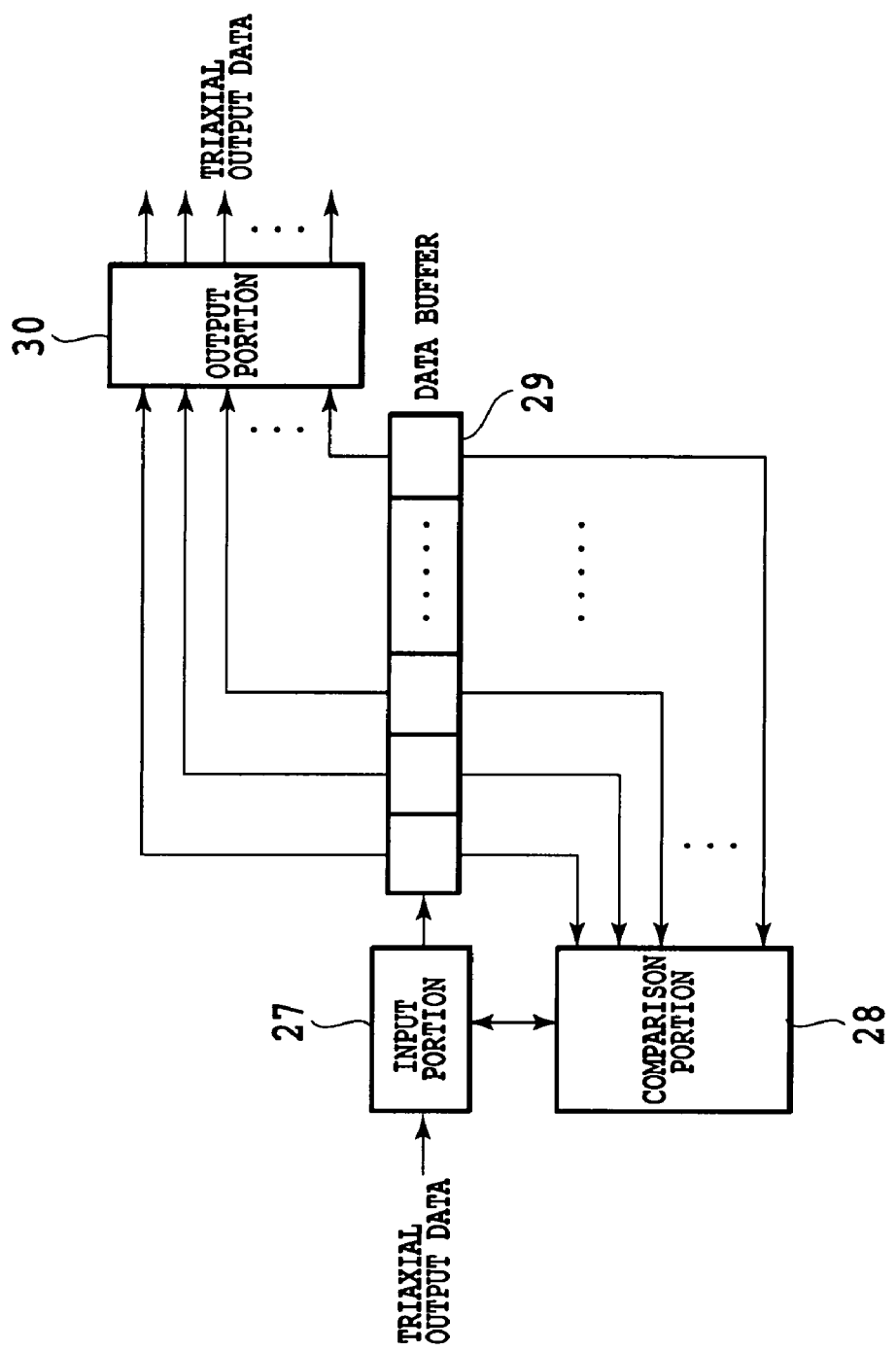
FIG. 7 is a specific block diagram showing a data change judgment portion in Embodiment 1 of the present invention.

FIG. 7 is a specific block diagram of the data change judgment portion in Embodiment 1, showing the data accumulating portion 14. In the drawing, the reference numeral 27 denotes an input portion, 28 denotes a comparison portion, 29 denotes a data buffer, and 30 denotes an output portion.

Triaxial output data selected at the data selecting portion 13 are once stored at the input portion 27 temporarily. The comparison portion 28 compares the triaxial output data temporarily stored at the input portion 27 with those accumulated at the data buffer 29, thereby judging whether a difference between these data is not less than a predetermined value. The triaxial output data accumulated at the data buffer 29 which are to be compared may be compared with only triaxial output data accumulated finally or individually compared with all triaxial output data, depending on the situation.

As a result of comparison of the triaxial output data at the comparison portion 28, it is found that the difference is not less than a predetermined value, the triaxial output data temporarily stored at the input portion 27 are accumulated at the data buffer 29, whereas if the difference is less than a predetermined value, the triaxial output data temporarily stored at the input portion 27 are discarded. Alternatively, the triaxial output data stored at the data buffer 29 which are to be compared may be deleted, and the triaxial output data temporarily stored at the input portion 27 may be accumulated at the data buffer 29. The output portion 30 outputs the triaxial output data accumulated at the data buffer 29 toward the reference point estimating portion 15.

Figure 8:
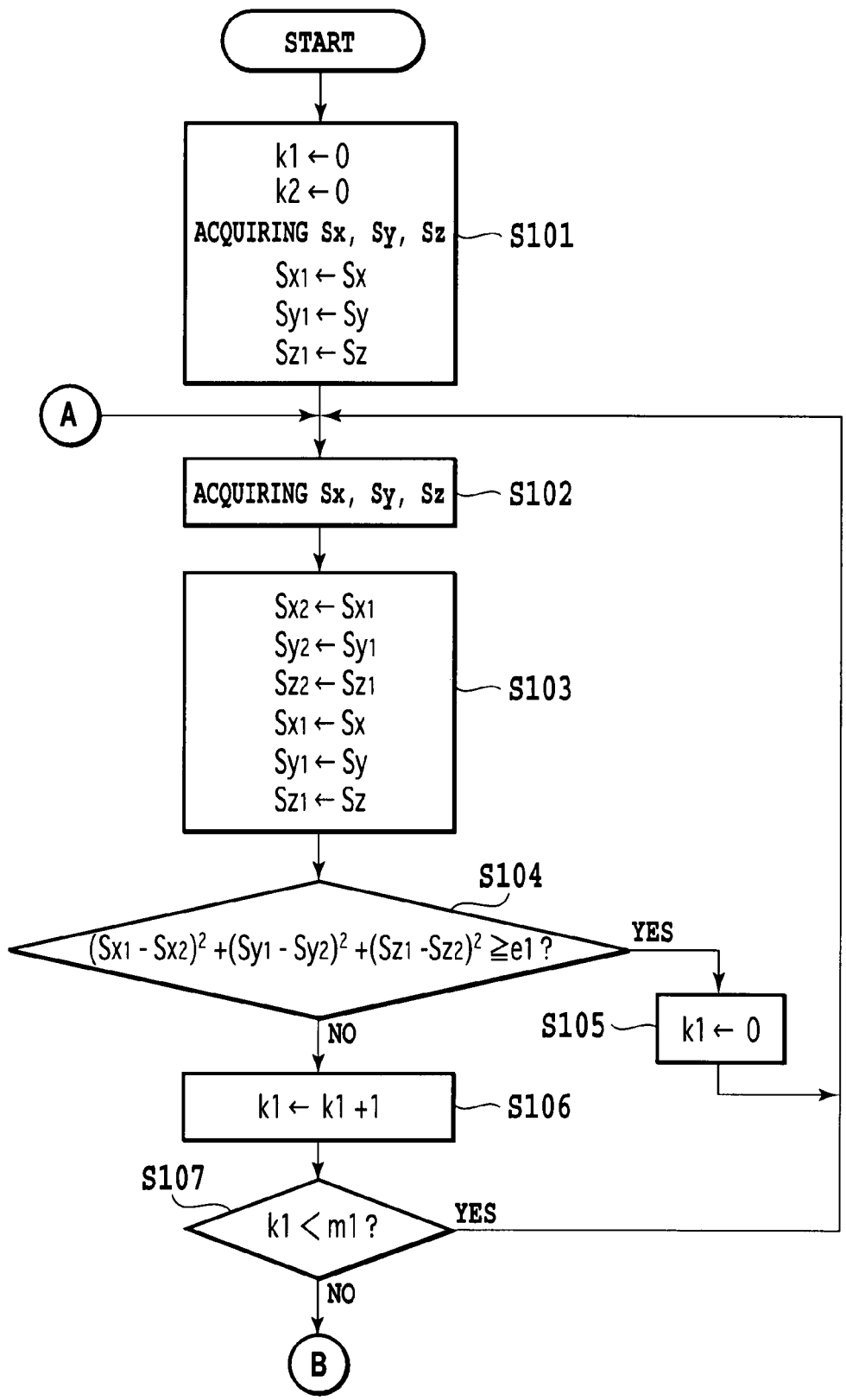
FIG. 8 is a flow chart (I) illustrating procedures for acquiring reference point coordinate data in Embodiment 1 of the present invention.
Figure 9:
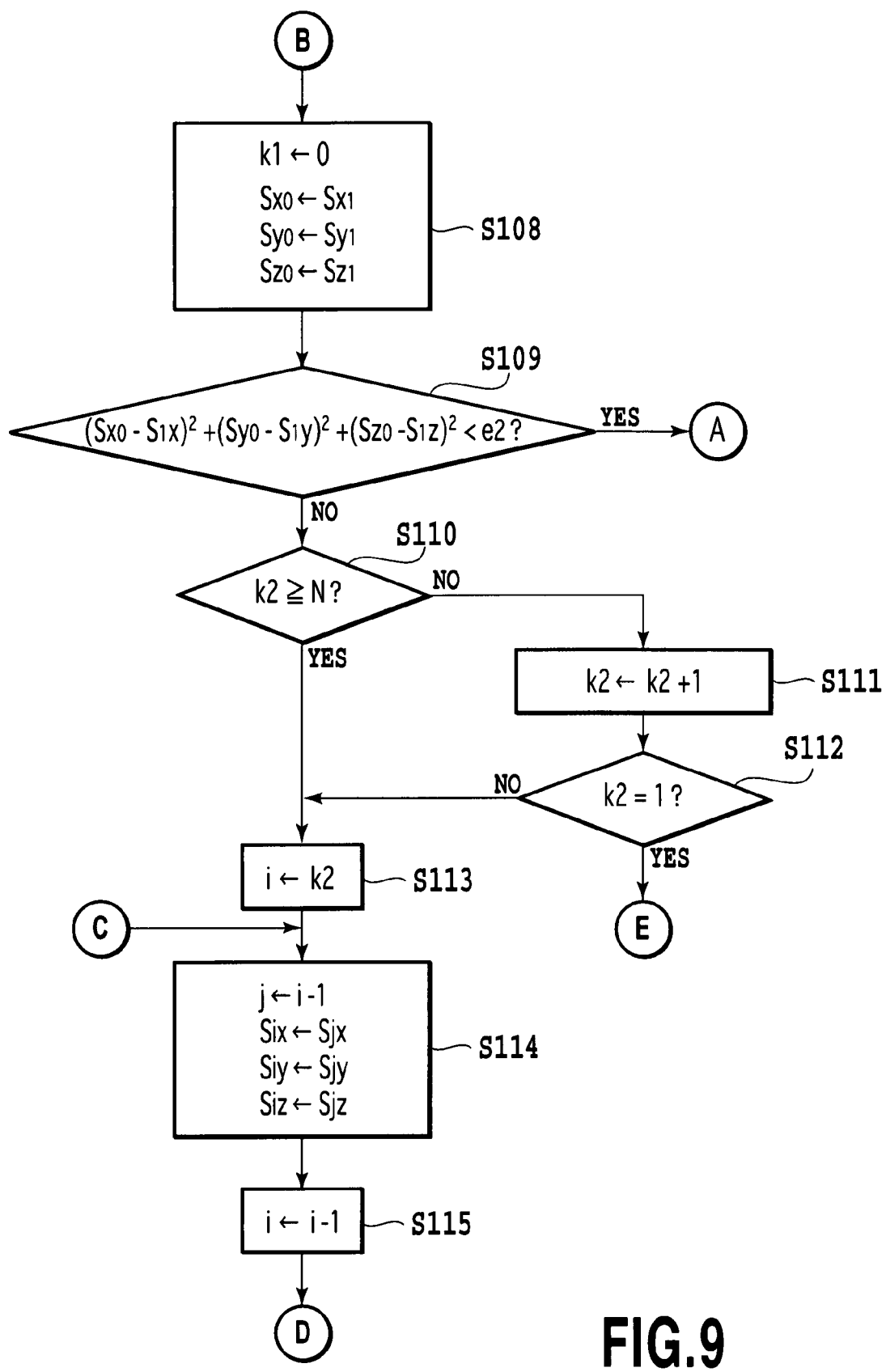
FIG. 9 is a flow chart (II) illustrating procedures for acquiring the reference point coordinate data in Embodiment 1 of the present invention.
Figure 10:
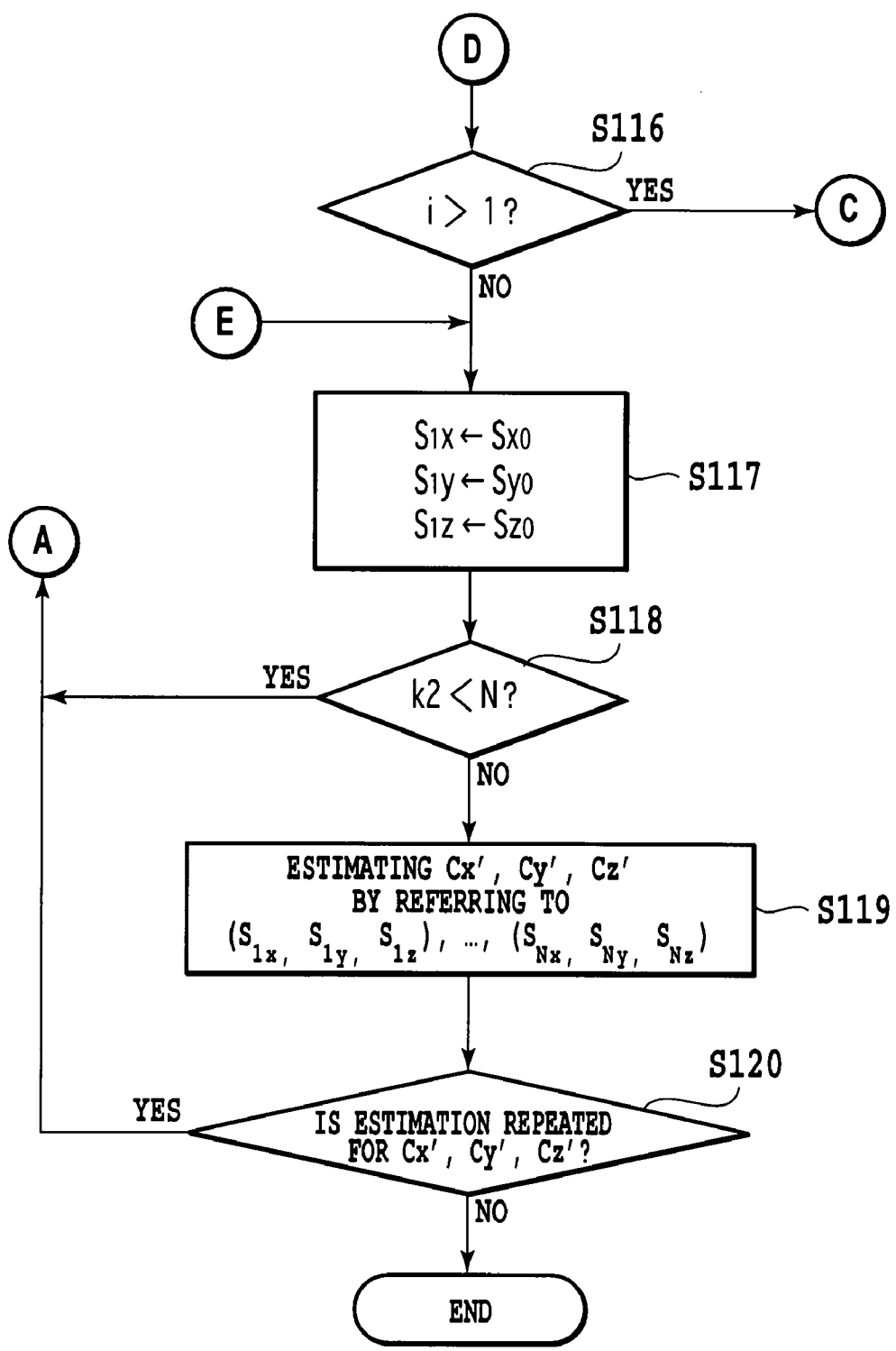
FIG. 10 is a flow chart (III) illustrating procedures for acquiring the reference point coordinate data in Embodiment 1 of the present invention.

FIG. 8 to FIG. 10 are flow charts illustrating procedures for acquiring the reference point coordinate data in Embodiment 1 of the present invention. In this instance, when at the data change judgment portion 18, the triaxial output data selected at the data selecting portion 13 are compared with the triaxial output data finally accumulated at the accumulating portion 14 to find that a difference between these data is less than a predetermined value, the former is to be discarded.

First, the following operation (S101) is carried out as an initial setting. A counter k1 of the data storage portion 12 (corresponding to a counter 25 shown in FIG. 5) is cleared. Then, a number k2, of triaxial output data accumulated at the data accumulating portion 14 is cleared. Then, triaxial output data, Sx, Sy, Sz, are acquired from the sensitivity correction/calculation portion 17 to store them at the first stage of $S_{x1}$, $S_{y1}$, $S_{z1}$ at the data storage portion 12.

Next, Sx, Sy, Sz are acquired from the sensitivity correction/calculation portion 17 (S102). The triaxial output data stored at $S_{x1}$, $S_{y1}$, $S_{z1}$ of the data storage portion 12 are sent to the second stage of $S_{x2}$, $S_{y2}$, $S_{z2}$ at the data storage portion 12 to store Sx, Sy, Sz at the $S_{x1}$, $S_{y1}$, $S_{z1}$ (S103).

Next, where a difference between the triaxial output data respectively stored at the first and the second stage inside the data storage portion 12 is not less than a predetermined value e1, k1 is cleared to return to the step S102 (S104, S105). Then, the k1 is increased by one value (S106), and where the value of k1 is less than a predetermined value m1, the operation is returned to S102 (S107).

Next, the k1 is cleared, and $S_{x1}$, $S_{y1}$, $S_{z1}$ are given as outputs $S_{xo}$, $S_{yo}$, $S_{zo}$ at the data selecting portion 13 (corresponding to sending to the output portion 26 in FIG. 5) (S108). Next, where a difference between the $S_{xo}$, $S_{yo}$, $S_{zo}$ and triaxial output data $S_{1x}$, $S_{1y}$, $S_{1z}$ stored at the first stage of the data accumulating portion 14 is less than a predetermined value e2, the operation is returned to S102 (S109). Where a value of k2 is not less than a predetermined value, N, the operation proceeds to S113 (S110). Where k2 is increased by one value (S111) and k2 is one, the operation proceeds to S117 (S112).

Next, an index i is set to be a value of k2 (S113). An index j is set to be i−1, and triaxial output data stored at j-th stage $S_{jx}$, $S_{jy}$, $S_{jz}$ of the data accumulating portion 14 are sent to i-staged $S_{ix}$, $S_{iy}$, $S_{iz}$(S114). When the index i is decreased by one value (S115) and the value of i exceeds one, the operation is returned to S114 (S116).

Next, the $S_{xo}$, $S_{yo}$, $S_{zo}$ are stored at the $S_{1x}$, $S_{1y}$, $S_{1z}$(S117). Where a value of k2 is less than N, the operation is returned to S102 (S118). Cx', Cy', Cz' are estimated by referring to ($S_{1x}$, $S_{1y}$, $S_{1z}$), . . . , ($S_{Nx}$, $S_{Ny}$, $S_{Nz}$) (S119). Where the Cx', Cy', Cz' are repeatedly estimated, the operation is returned to S102 (S120).

EMBODIMENT 2

FIG. 11 is a block diagram describing Embodiment 2 of an acceleration measuring device of the present invention. In this embodiment, an ellipsoid is determined in a three-dimensional cartesian space to estimate a length of the main axis and a central coordinate value as estimation of a reference point, thereby correcting the sensitivity and the offset.

In the drawing, the reference numeral 31 denotes a triaxial acceleration sensor, 32 denotes an x-axis direction component detecting circuit of triaxial acceleration sensor, 33 denotes a y-axis direction component detecting circuit of triaxial acceleration sensor, 34 denotes a z-axis direction component detecting circuit of triaxial acceleration sensor, 35A denotes a data acquisition portion, 35 denotes a multiplexer portion, 36 denotes an acceleration sensor driving power supply portion, 37 denotes an amplifier, 38 denotes an A/D converter, 39 denotes a data storage portion, 40 denotes a data selecting portion, 41 denotes a data accumulating portion, 41a denotes a data change judgment portion, 41b denotes a temperature detecting portion, 42 denotes a reference point estimating portion, 43 denotes a sensitivity/offset information storage portion, and 44 denotes a sensitivity/offset correction/calculation portion.

The acceleration measuring device of the present Embodiment 2 is provided with an acceleration sensor 31 for detecting the acceleration in a triaxial direction, a data acquisition portion 35A for acquiring triaxial output data of the acceleration sensor 31, a data selecting portion 40 for judging whether the triaxial output data repeatedly acquired by the data acquisition portion 35A are appropriate to make a selection, a data accumulating portion 41 for accumulating the triaxial output data selected by the data selecting portion 40, a reference point estimating portion 42 for determining an ellipsoid in the three-dimensional cartesian space by referencing the distribution of a predetermined number of triaxial output data accumulated by the data accumulating portion 41 in a three-dimensional cartesian space when each axial component is given as a coordinate value, thereby estimating a length of the main axis of the ellipsoid and a central coordinate value, and a sensitivity/offset correction/calculation portion 44 for correcting the sensitivity and the offset of triaxial output data of the acceleration sensor 31 on the basis of the length of each principal axis and the central coordinate value of the ellipsoid estimated by the reference point estimating portion 42. Further, the data acquisition portion 35A is constituted with the multiplexer portion 35, the acceleration sensor driving power supply portion 36, the amplifier 37 and the A/D converter 38.

The triaxial acceleration sensor 31, the x-axis direction detecting circuit 32, the y-axis direction detecting circuit 33, z-axis direction detecting circuit 34, the multiplexer portion 35, the acceleration sensor driving power supply portion 36, the amplifier 37 and the A/D converter 38 are the same as those described above in Embodiment 1.

The data storage portion 39 is a FIFO-type data buffer having a predetermined number of triaxial output data sequentially output from the A/D converter 38. The data selecting portion 40 and the data accumulating portion 41 are the same as those described above in Embodiment 1.

The reference point estimating portion 42 estimates a length of each principal axis of an ellipsoid and a central coordinate value on the basis of a predetermined number of triaxial output data accumulated at the data accumulating portion 41, thereby outputting data on the length of the main axis and the central coordinate of the ellipsoid. The sensitivity/offset information storage portion 43 stores the data on the length of the main axis and the central coordinate of the ellipsoid output from the reference point estimating portion 42.

The sensitivity/offset correction/calculation portion 44 corrects the sensitivity and the offset of triaxial output data output from the A/D converter 38 on the basis of data on the length of the main axis of the ellipsoid and central coordinate stored at the sensitivity/offset information storage portion 43.

Next, a description will be given of a method for estimating a length of each principal axis of the ellipsoid and a central coordinate value at the reference point estimating portion 42. Triaxial output data output from the A/D converter 38, Srx, Sry, Srz are expressed by the following formulae.

$$S_{rx} = a_x A_x + C_{rx} \quad (36)$$

$$S_{ry} = a_y A_y + C_{ry} \quad (37)$$

$$S_{rz} = a_z A_z + C_{rz} \quad (38)$$

Here, $a_x$, $a_y$, $a_z$ denote the sensitivity in each axial direction and Crx, Cry, Crz denote the offset present in the Srx, Sry, Srx.

Where an acceleration measuring device is stationary or uniform motion, the acceleration applied to the triaxial acceleration sensor 1 is only gravitational acceleration "g". Therefore, the following formulae are satisfied.

$$S_{rx} = a_x G_x + C_{rx} \quad (39)$$

$$S_{ry} = a_y G_y + C_{ry} \quad (40)$$

$$S_{rz} = a_z G_z + C_{rz} \quad (41)$$

Therefore, by referring to the above formula (19), the following formula is obtained.

$$\left(\frac{S_{rx} - C_{rx}}{a_x}\right)^2 + \left(\frac{S_{ry} - C_{ry}}{a_y}\right)^2 + \left(\frac{S_{rz} - C_{rz}}{a_z}\right)^2 = g^2 \quad (42)$$

Figure 12:
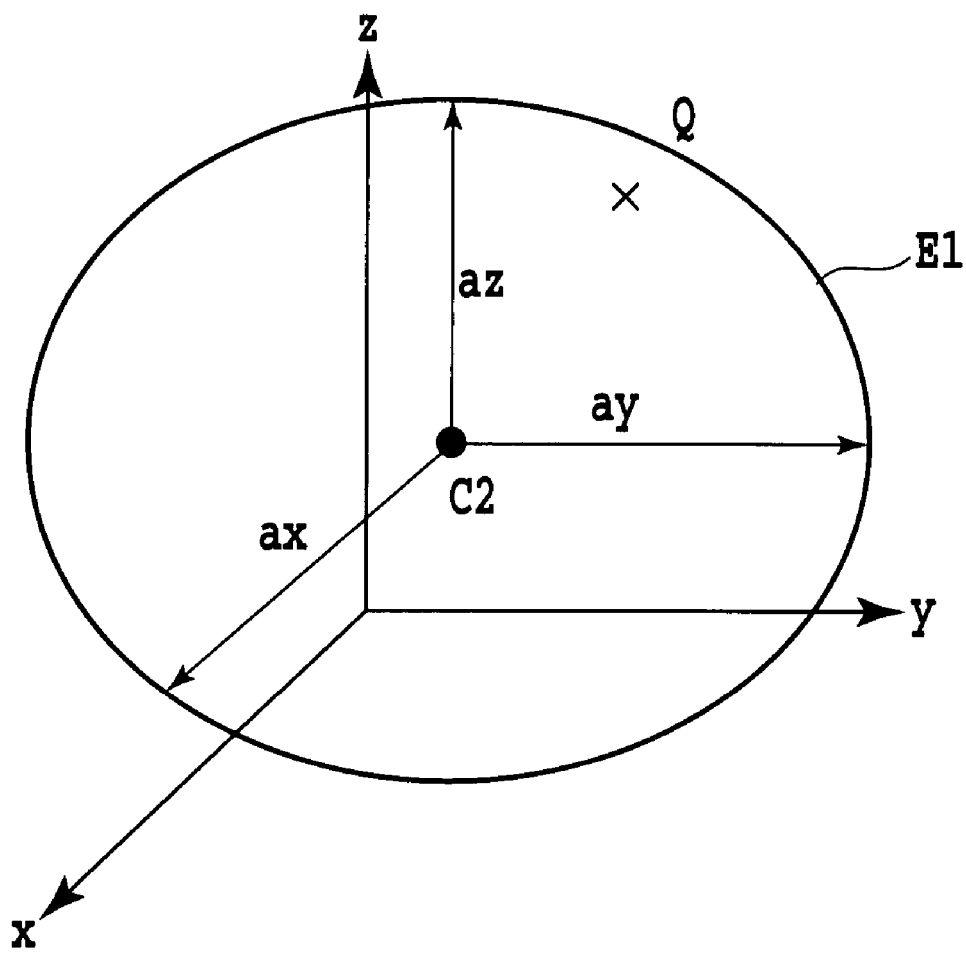
FIG. 12 is a conceptual diagram showing a length of the axis and a central coordinate of an ellipsoid in Embodiment 2 of the present invention.

According to the above formula (42), as illustrated in FIG. 12, points Q (Srx, Sry, Srz) in which each axial component of triaxial output data is given as a coordinate value in a three-dimensional cartesian space (x, y, z) are positioned on an ellipsoid E1 in which $a_x$, $a_y$, $a_z$ are given as a length of each principal axis, Crx, Cry, Crx are given as a coordinate value of the center C2 and the direction of each main axis is parallel to each principal axis of the three-dimensional cartesian space (x, y, Z).

Here, triaxial output data are acquired, which are output from the A/D converter 38 respectively in attitudes of N pieces of the triaxial acceleration sensor 31, and data of each axial component are expressed respectively as follows:

$$S_{1rx}, S_{2rx}, \ldots, S_{Nrx}$$

$$S_{1ry}, S_{2ry}, \ldots, S_{Nry}$$

$$S_{1rz}, S_{2rz}, \ldots, S_{Nrz}$$

Then, the triaxial output data acquired in the three-dimensional cartesian space (x, y, z) are expressed as points of N pieces which are $Q_1(S_{1rx}, S_{1ry}, S_{1rz})$, $Q_2(S_{2rx}, S_{2ry}, S_{2rz})$, ..., $Q_N(S_{Nrx}, S_{Nry}, N_{rz})$.

Figure 13:
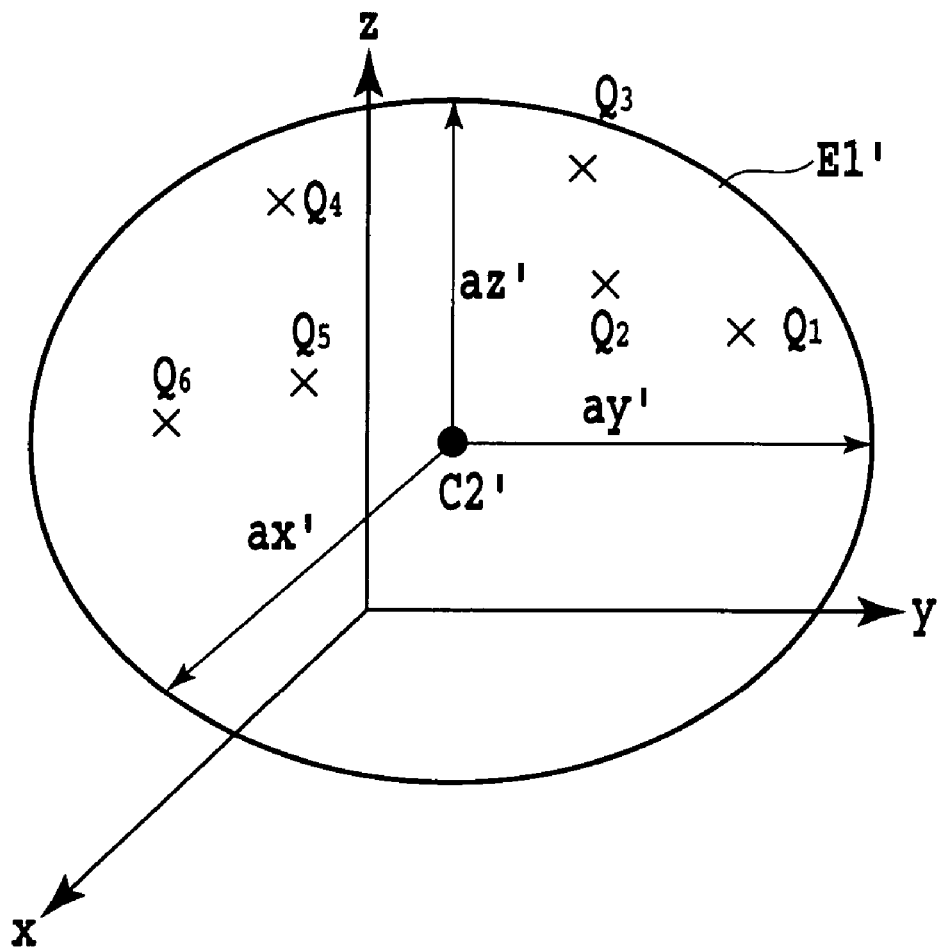
FIG. 13 is a conceptual diagram showing an estimation of the length of the axis and the central coordinate of the ellipsoid in Embodiment 2 of the present invention.

Then, as illustrated in FIG. 13, when an estimation is made for an ellipsoid E1' in which the direction of each main axis is parallel to each principal axis of the three-dimensional cartesian space (x, y, z) and each of $Q_1, Q_2, \ldots, Q_N$ is positioned on the surface, the E1' is expected to correspond to E1, and the length of each principal axis of E1', $a_x'$, $a_y'$, $a_z'$ can be used to estimate $a_x$, $a_y$, $a_z$ and coordinate values Crx', Cry', Crz' of the central C2' can be used to estimate Crx, Cry, Crz. <Specific method for estimating $a_x'$, $a_y'$, $a_z'$ and Crx', Cry', Crz'> The reference point estimating portion 42 estimates a length of each principal axis of an ellipsoid and a central coordinate value by a statistical method in such a manner that each of a predetermined number of triaxial output data can be brought closest to the ellipsoid.

Various methods are available for estimating the ellipse or the ellipsoid E1' from $Q_1, Q_2, \ldots, Q_N$ and an estimation can be made at least by N=6. However, since the sensitivities of a piezoresistance-type triaxial acceleration sensor are available only in a number of about several hundreds μV/G/V, the output voltage is quite subtle and substantial noises are superimposed on the acquired triaxial output data.

In the three-dimensional cartesian space (x, y, z), a distance $\varepsilon_i$ from the points $Q_i(S_{irx}, S_{iry}, S_{irz})$ of i-th triaxial output data to E1' is expressed as follow:

$$\varepsilon_i = \sqrt{(S_{irx} - C_{rx}')^2 + (S_{iry} - C_{ry}')^2 + (S_{irz} - C_{rz}')^2} - \sqrt{\frac{a_x'^2(S_{irx} - C_{rx}')^2 + a_y'^2(S_{iry} - C_{ry}')^2 + a_z'^2(S_{irz} - C_{rz}')^2}{(S_{irx} - C_{rx}')^2 + (S_{iry} - C_{ry}')^2 + (S_{irz} - C_{rz}')^2}} \quad (43)$$

Ideally, all of the $Q_1, Q_2, \ldots, Q_N$ should result in $\varepsilon_i = 0$. However, since substantial noises are superimposed on the acquired triaxial output data, $\varepsilon_i = 0$ is not acquired.

Therefore, a statistical method is employed to estimate $a_x'$, $a_y'$, $a_z'$ and Crx', Cry', Crz' by increasing N to minimize a square sum of $\varepsilon_i$, thereby making it possible to estimate them accurately, even if substantial noises are superimposed. $Z_4$, a square sum of $\varepsilon_i$ can be expressed by the following formula.

$$Z_4 = \sum \varepsilon_i^2 \quad (44)$$

$$= \sum \left\{ \sqrt{(S_{irx} - C_{rx}')^2 + (S_{iry} - C_{ry}')^2 + (S_{irz} - C_{rz}')^2} - \sqrt{\frac{a_x'^2(S_{irx} - C_{rx}')^2 + a_y'^2(S_{iry} - C_{ry}')^2 + a_z'^2(S_{irz} - C_{rz}')^2}{(S_{irx} - C_{rx}')^2 + (S_{iry} - C_{ry}')^2 + (S_{irz} - C_{rz}')^2}} \right\}^2$$

Alternatively, $Z_5$ is defined as a value similar to a square sum of $\varepsilon_i$ by the following formula.

$$Z_5 = \sum \left[ \frac{\{(S_{irx} - C_{rx}')^2 + (S_{iry} - C_{ry}')^2 + (S_{irz} - C_{rz}')^2\} - }{\frac{a_x'^2(S_{irx} - C_{rx}')^2 + a_y'^2(S_{iry} - C_{ry}')^2 + a_z'^2(S_{irz} - C_{rz}')^2}{(S_{irx} - C_{rx}')^2 + (S_{iry} - C_{ry}')^2 + (S_{irz} - C_{rz}')^2}} \right]^2 \quad (45)$$

The above formulae (44) and (45) may be optimized (refer to Non-Patent Document 1, for example) to calculate $a_x'$, $a_y'$, $a_z'$ and Crx', Cry', Crz'. It should be noted that all the following parts of illustrating the previously described Embodiment 1 are also applicable similarly to Embodiment 2.

Next, a description will be given of a method for selecting triaxial output data, at the data selecting portion 40.

<Specific Method (I)>

The data selecting portion 40 calculates a difference with respect to the triaxial output data acquired just before each time when triaxial output data are acquired by the data acquisition portion 35A judges that the triaxial output data are appropriate to select the data when the difference is within a predetermined value continuously at the number of times more than a predetermined number of times.

<Specific Method (II)>

The data selecting portion 40 estimates a spherical surface on the basis of the distribution of a predetermined number of triaxial output data repeatedly acquired by the data acquisition portion 35A in a three-dimensional cartesian space when each axial component is given as a coordinate value judges that the triaxial output data within a predetermined distance from the spherical surface are appropriate to select the data. Further, the data selecting portion 40 estimates a spherical surface, with a radius of the spherical surface given as a predetermined value.

Next, a description will be given of the data accumulating portion 41 and the data change judgment portion 41a. The data change judgment portion 41a is provided for judging whether the triaxial output data selected by the data selecting portion 40 are changed to an extent greater than a predetermined value by comparison with the triaxial output data that have already been accumulated by the data accumulating portion 41. The data accumulating portion 41 does not accumulate the triaxial output data selected by the data selecting portion 40 but discards them, on the basis of the judgment result made by the data change judgment portion 41a.

Figure 14:
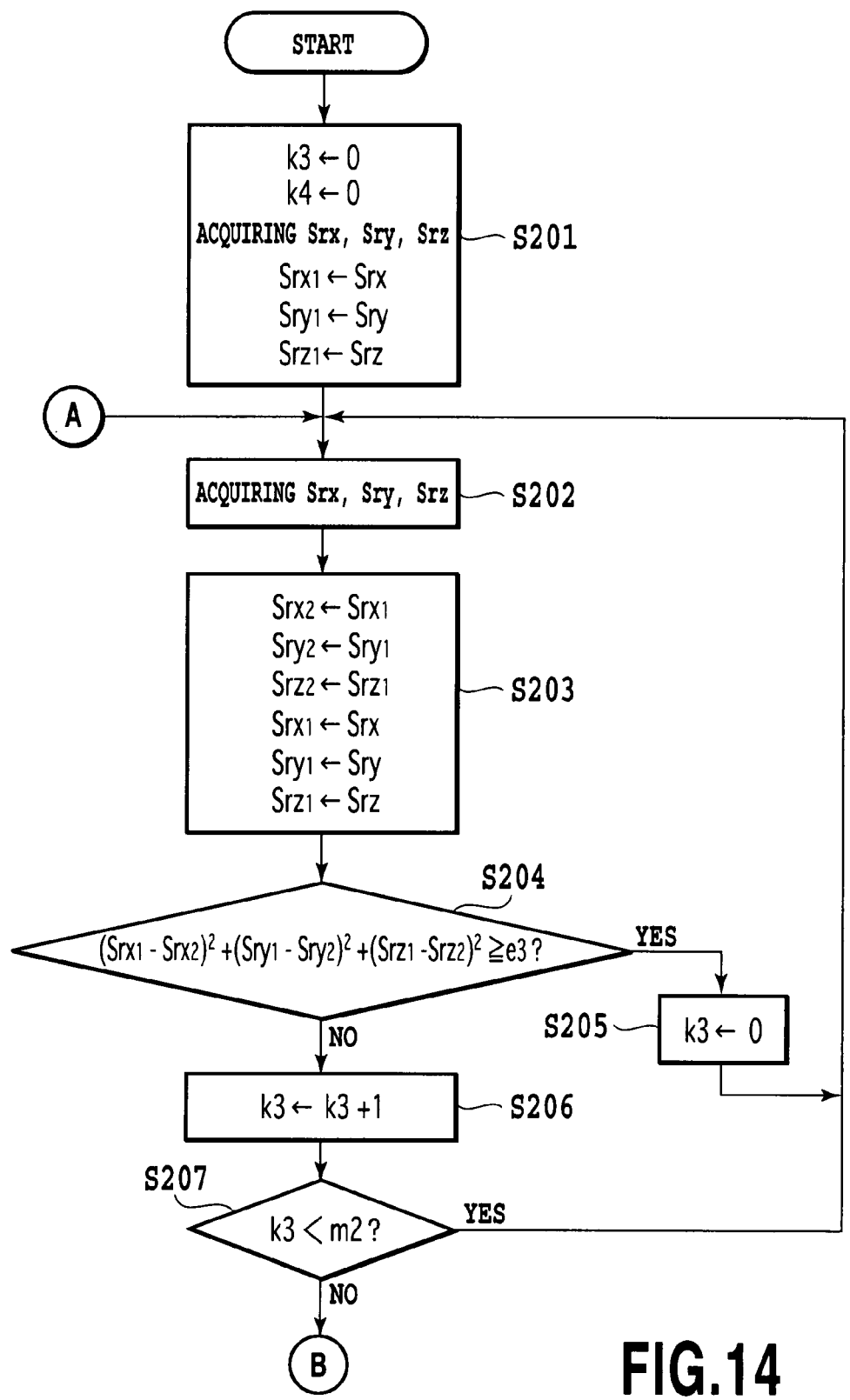
FIG. 14 is a flow chart (I) illustrating procedures for acquiring the data of the length of the axis and the central coordinate of the ellipsoid in Embodiment 2 of the present invention.
Figure 15:
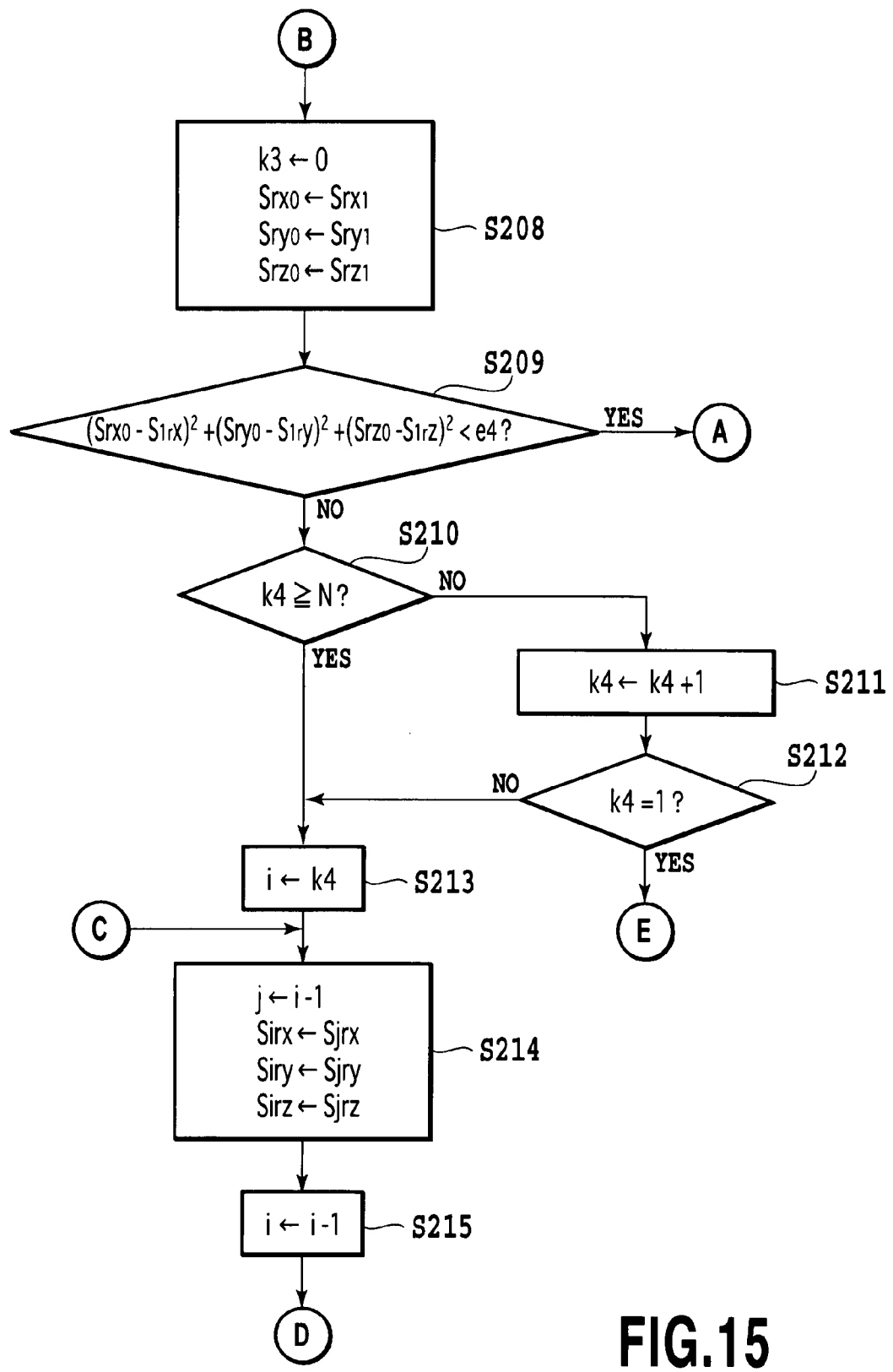
FIG. 15 is a flow chart (II) illustrating procedures for acquiring the data of the length of the axis and the central coordinate of the ellipsoid in Embodiment 2 of the present invention.
Figure 16:
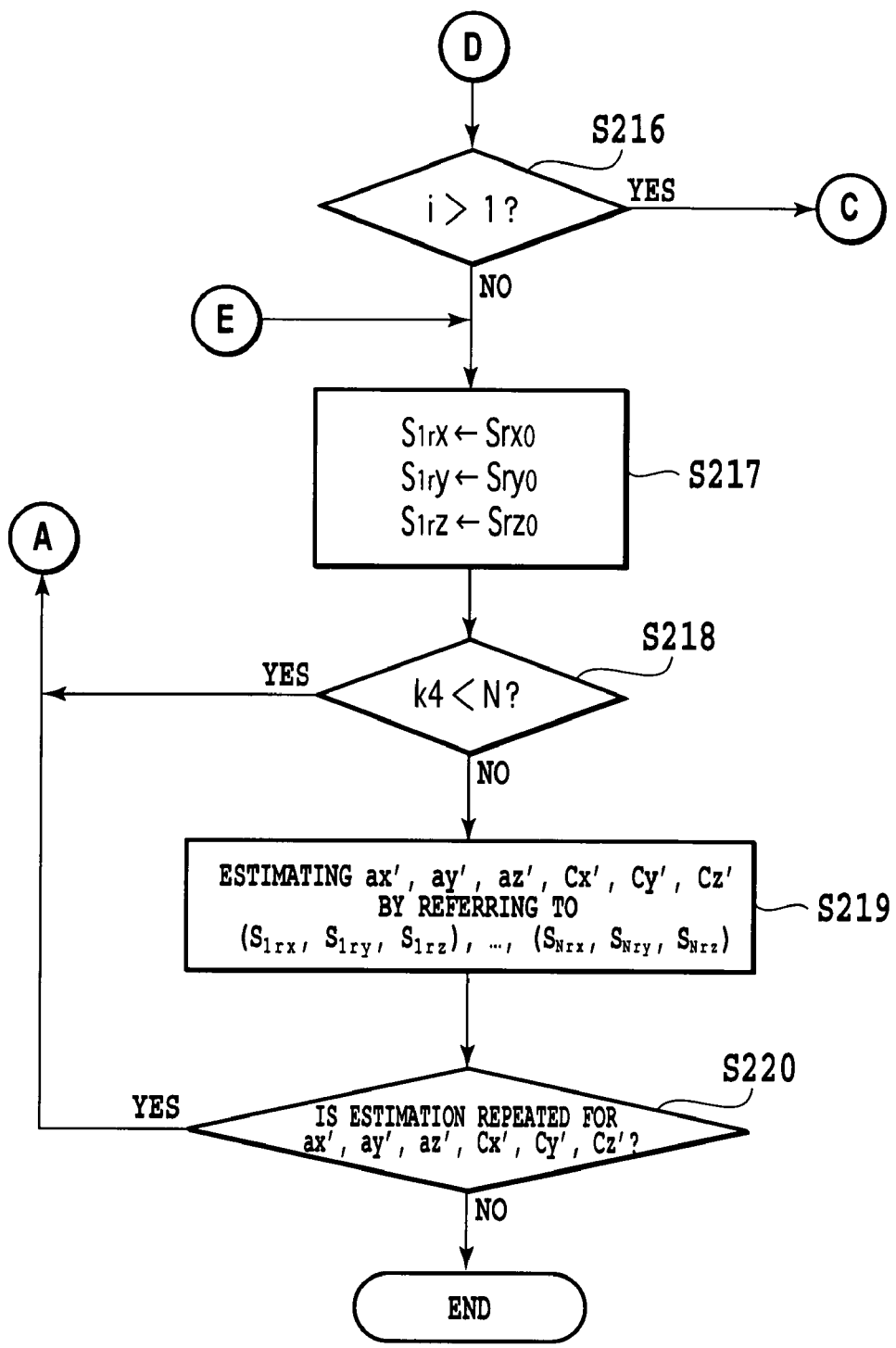
FIG. 16 is a flow chart (III) illustrating procedures for acquiring the data of the length of the axis and the central coordinate of the ellipsoid in Embodiment 2 of the present invention.

FIG. 14 to FIG. 16 are flow charts illustrating procedures for acquiring the data on the length of the main axis of the ellipsoid and central coordinate in Embodiment 2 of the present invention. In this instance, when at the data change judgment portion 41a, the triaxial output data selected at the data selecting portion 40 are compared with the triaxial output data finally accumulated at the accumulating portion 41 to find that a difference between these data is less than a predetermined value, the former is to be discarded.

First, the following operation (S201) is carried out as an initial setting. A counter k3 of the data storage portion 39 (corresponding to the counter 25 shown in FIG. 5) is cleared. Then, a number, k4, of triaxial output data accumulated at the data accumulating portion 41 is cleared. Then, triaxial output data Srx, Sry, Srz are acquired from the A/D converter 38 to store them at the first stage of $S_{rx1}, S_{ry1}, S_{rz1}$ at the data storage portion 39.

Next, Srx, Sry, Srz are acquired from the A/D converter 38 (S202). The triaxial output data stored at $S_{rx1}, S_{ry1}, S_{rz1}$ of the data storage portion 39 are sent to the second stage of $S_{rx2}, S_{ry2}, S_{rz2}$ at the data storage portion 39 to store Srx, Sry, Srz at the $S_{rx1}, S_{ry1}, S_{rz1}$(S203).

Next, where a difference between the triaxial output data respectively stored at the first and the second stage inside the data storage portion 39 exceeds a predetermined value of e3, k3 is cleared to return to the step S202 (S204, S205). Then, the k3 is increased by one value (S206), and where a value of k3 is less than a predetermined value, m2, the operation is returned to S202 (S207). Then, the k3 is cleared, and $S_{rx1}, S_{ry1}, S_{rz1}$ are given as outputs $S_{rxo}, S_{ryo}, S_{rzo}$ at the data selecting portion 40 (corresponding to sending to the output portion 26 in FIG. 5) (S208).

Next, where a difference between the $S_{rxo}, S_{ryo}, S_{rzo}$ and triaxial output data $S_{1rx}, S_{1ry}, S_{1rz}$ stored at the first stage of the data accumulating portion 41 is less than a predetermined value, e4, the operation is returned to S202 (S209). Where a value of k4 exceeds a predetermined value, N, the operation proceeds to S213 (S210). Where the k4 is increased by one value (S211) and a value of k4 is one, the operation proceeds to S217 (S212).

Next, an index "i", is set to be a value of k4 (S213). An index "j", is set to be "i−1", and triaxial output data stored at j-th stage $S_{jrx}, S_{jry}, S_{jrz}$ of the data accumulating portion 41 are sent to i-staged $S_{irx}, S_{iry}, S_{irx}$(S214). When the index "i", is decreased by one value (S215) and a value of "i" exceeds one, the operation is returned to S214 (S216).

Next, $S_{rxo}, S_{ryo}, S_{rzo}$ are stored at $S_{1rx}, S_{1ry}, S_{1rz}$ (S217). Where a value of k4 is less than N, the operation is returned to S202 (S218). Then, $a_x', a_y', a_z'$ and Crx', Cry', Crz' are estimated by referring to $(S_{1rx}, S_{1ry}, S_{1rz}), \ldots, (S_{Nrx}, S_{Nry}, S_{Nrx})$ (S219). Where the $a_x', a_y', a_z'$ and the Cx', Cy', Cz' are repeatedly estimated, the operation is returned to S202 (S220).

EMBODIMENT 3

FIG. 17 is a block diagram illustrating Embodiment 3 of an acceleration measuring device of the present invention. In this embodiment, a reference point is estimated by referring to a coordinate value of the reference point determined in a three-dimensional cartesian space with reference to a value of each axial component of gravitational acceleration which is expected for detection by a triaxial acceleration sensor.

In the drawing, the reference numeral 45 denotes a triaxial acceleration sensor, 46 denotes an x-axis direction component detecting circuit of triaxial acceleration sensor, 47 denotes a y-axis direction component detecting circuit of triaxial acceleration sensor, 48 denotes a z-axis direction component detecting circuit of triaxial acceleration sensor, 49A denotes a data acquisition portion, 49 denotes a multiplexer portion, 50 denotes an acceleration sensor driving power supply portion, 51 denotes an amplifier, 52 denotes an A/D converter, 53 denotes a temperature detecting portion, 54 denotes a sensetivity correction information storage portion, 55 denotes a sensitivity correction/calculation portion, 56 denotes a reference point estimating portion, 57 denotes an offset information storage portion, and 58 denotes an offset correction/calculation portion. It is noted that a description will be omitted for parts which overlap with those given in Embodiment 1.

The acceleration measuring device of the present Embodiment 3 is provided with an acceleration sensor 45 for detecting the acceleration in a triaxial direction, a data acquisition portion 49A for acquiring triaxial output data of the acceleration sensor 45, a reference point estimating portion 56 in which the triaxial output data are acquired from the data acquisition portion 49A, while the acceleration sensor 45 keeps a predetermined attitude, and a coordinate value of the reference point determined in a three-dimensional cartesian space is estimated from a value of each axial component of the gravitational acceleration which is expected for detection by the acceleration sensor 45 in a state that a position in the three-dimensional cartesian space and the predetermined attitude are kept when each axial component of the triaxial output data is given as a coordinate value, and an offset correction/calculation portion 58 for correcting the offset of the triaxial output data of the acceleration sensor 45 on the basis of the coordinate value of the reference point estimated by the reference point estimating portion 56. Further, the data acquisition portion 49A is constituted with the multiplexer portion 49, the acceleration sensor driving power supply portion 50, the amplifier 51 and the A/D converter 52.

The triaxial acceleration sensor 45, the x-axis direction detecting circuit 46, the y-axis direction detecting circuit 47, the z-axis direction detecting circuit 48, the multiplexer portion 49, the acceleration sensor driving power supply portion 50, the amplifier 51, the A/D converter 52, the temperature detecting portion 53, the sensetivity correction information storage portion 54, the sensitivity correction/calculation portion 55, the offset information storage portion 57, and the offset correction/calculation portion 58 are the same as those given in the previously described Embodiment 1.

The reference point estimating portion 56 estimates a coordinate of the reference point on the basis of triaxial output data output from the sensetivity correction information storage portion 55, thereby outputting the reference point coordinate data.

Figure 18B:
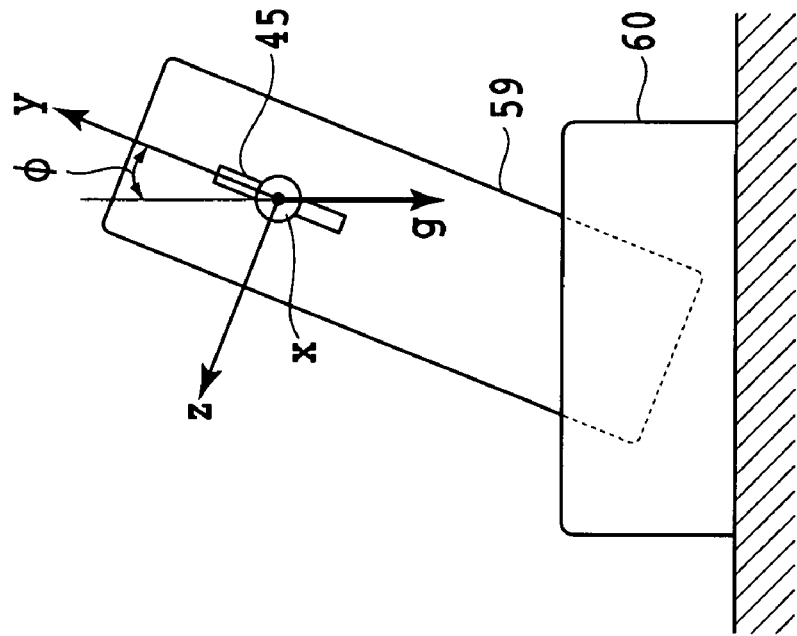
FIG. 18B is a conceptual diagram (II) illustrating Embodiment 3 of the present invention.
Figure 18A:
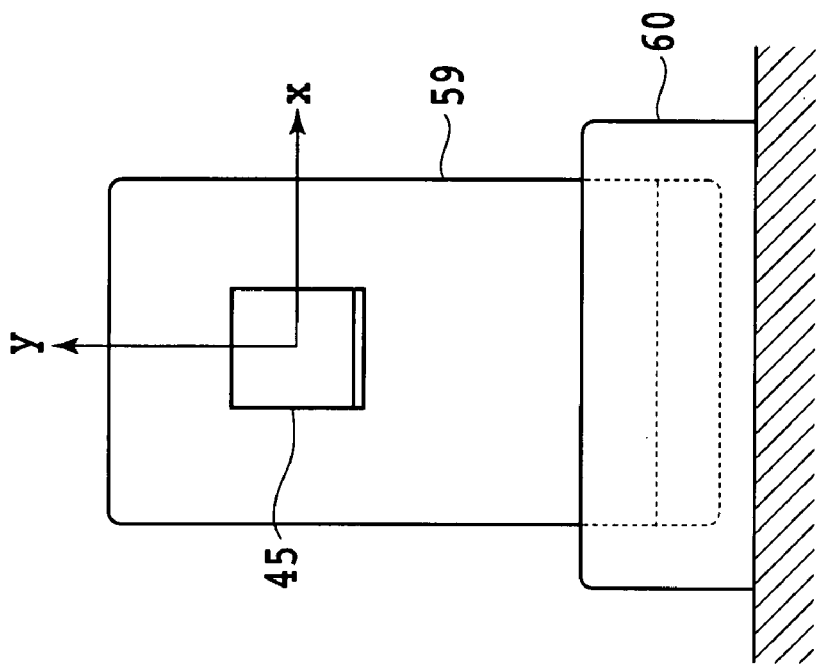
FIG. 18A is a conceptual diagram (I) illustrating Embodiment 3 of the present invention.

Next, a description will be given of a method for estimating a coordinate of the reference point at the reference point estimating portion 56. Where the triaxial acceleration sensor 45 is stationary in a known attitude, each directional component of acceleration which is applied to the triaxial acceleration sensor 45 is uniquely decided. For example, as illustrated in FIG. 18A and FIG. 18B, if an x-axis detecting direction of the triaxial acceleration sensor 45 is vertical to a direction of the gravitational acceleration "g", and a y-axis detecting direction thereof is tilted at "φ" degrees to a direction opposite the gravitational acceleration "g", while a battery charger 60 is kept horizontal and an acceleration measuring device 59 is set to the battery charger 60 in a predetermined attitude, x, y, z axis direction components, Gx, Gy, Gz of the gravitational acceleration "g", are expressed as follows.

$$G_x = 0 \quad (46)$$

$$G_y = -g \cos \phi \quad (47)$$

$$G_z = -g \sin \phi \quad (48)$$

Figure 19:
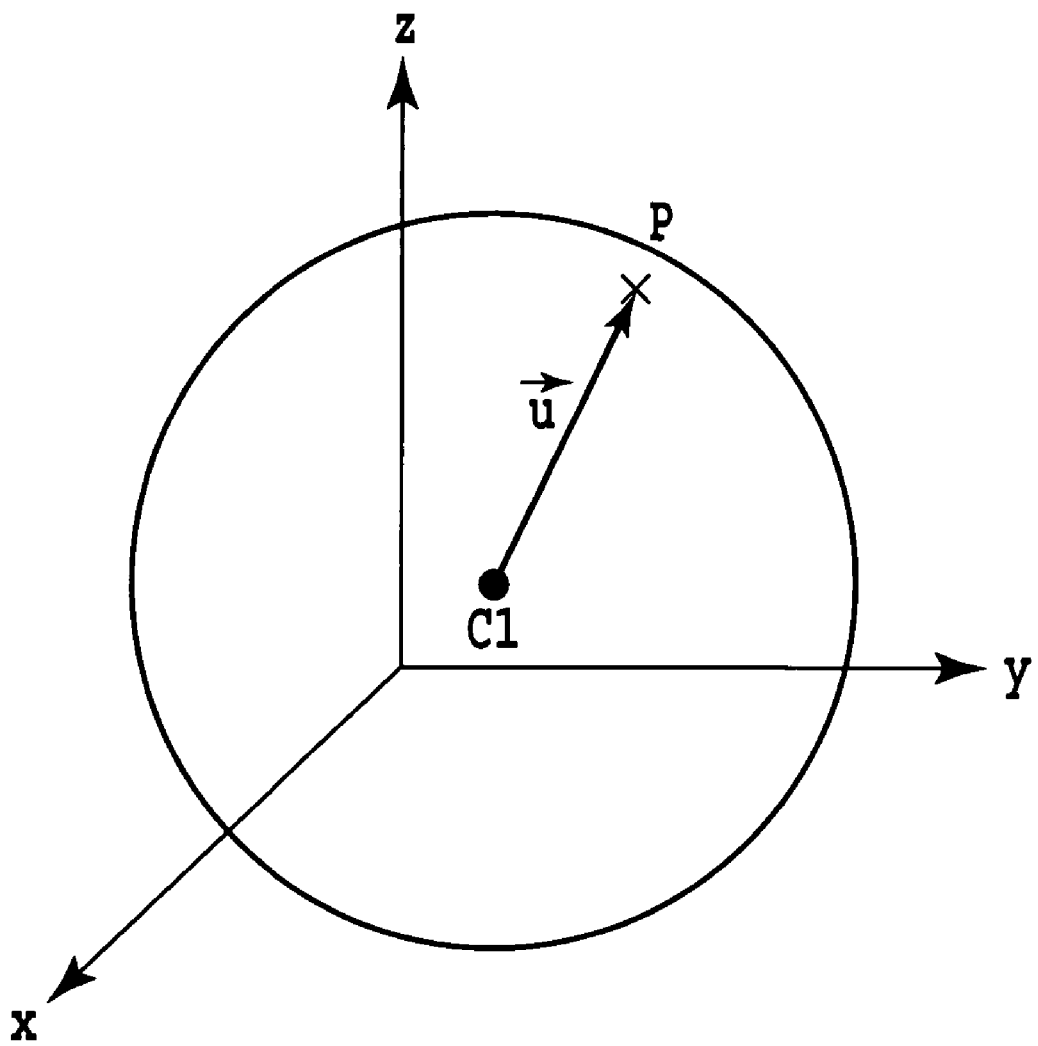
FIG. 19 is a conceptual diagram showing an estimation of the reference point of Embodiment 3 in the present invention.

Further, as illustrated in FIG. 19, a vector from a reference point C1 (Cx, Cy, Cz) at which an offset value of each axial component of triaxial output data is given as a coordinate value to a point P (Sx, Sy, Sz) at which each axial component of triaxial output data is given as a coordinate value in the three-dimensional cartesian space (x, y, z), that is, $\vec{u}$ is considered.

Then, from the above formulae (16), (17), (18), $\vec{u}$ is expressed as follows.

$$\vec{u} = (u_x, u_y, u_z) \quad (49)$$
$$= (aG_x, aG_y, aG_z)$$

Gx, Gy, Gz are known from the above formulae (46), (47), (48) and, therefore, if the sensitivity, a, corrected by the sensitivity correction/calculation portion 55 can be calculated, $\vec{u}$ is also decided.

Therefore, the coordinate values, Cx, Cy, Cz of the reference point C1 can be calculated as shown below.

$$C_x = S_x - u_x \quad (50)$$
$$= S_x - aG_x$$

$$C_y = S_y - u_y \quad (51)$$
$$= S_y - aG_y$$

$$C_z = S_z - u_z \quad (52)$$
$$= S_z - aG_z$$

Specifically, if the acceleration measuring device is stationary at a known attitude, offset data of the triaxial acceleration sensor can be easily acquired only by acquiring the triaxial output data at the attitude.

EMBODIMENT 4

The present Embodiment 4 is eliminated with the following means from Embodiment 1. That is, the selection of triaxial output data at the data selecting portion 13 and the data change judgment portion 18 at the data accumulating portion 14 are eliminated. The acceleration measuring device is applicable, for example, to the following case, and also able to eliminate the necessity of the above-described means. For this reason, Embodiment 4 is provided.

This embodiment is applicable to a case where, like a tilt sensor, gravitational acceleration is mainly detected, an acceleration measuring device hardly moves during measurement, and kinetic acceleration received by a triaxial acceleration sensor is extremely small as compared with the gravitational acceleration, a case where means for detecting kinetic acceleration is provided separately and no triaxial acceleration data are acquired when the kinetic acceleration is detected, a case where in acquiring triaxial acceleration data for having reference point coordinate data, an operator is to give instructions for acquiring the triaxial acceleration data, with the acceleration measuring device kept stationary, each time individual triaxial acceleration data are acquired.

FIG. 20 is a block diagram illustrating Embodiment 4 of an acceleration measuring device of the present invention. In this embodiment, a reference point is estimated by a statistical method in which a coordinate value of the reference point determined in a three-dimensional cartesian space is estimated so as to minimize variation of distances from a predetermined number of individual output data to the reference point. The reference point is also estimated by a statistical method in which a coordinate value of the reference point determined in the three-dimensional cartesian space is estimated so that a distance from a predetermined number of individual triaxial output data to the reference point is brought closest to a predetermined representative value.

In the drawing, the reference numeral 61 denotes a triaxial acceleration sensor, 62 denotes an x-axis direction component detecting circuit of triaxial acceleration sensor, 63 denotes a y-axis direction component detecting circuit of triaxial acceleration sensor, 64 denotes a z-axis direction component detecting circuit of triaxial acceleration sensor, 65A denotes a data acquisition portion, 65 denotes a multiplexer portion, 66 denotes an acceleration sensor driving power supply portion, 67 denotes an amplifier, 68 denotes an A/D converter, 69 denotes a temperature detecting portion, 70 denotes a sensetivity correction information storage portion, 71 denotes a sensitivity correction/calculation portion, 72 denotes a data accumulating portion, 73 denotes a reference point estimating portion, 74 denotes an offset information storage portion, and 75 denotes an offset correction/calculation portion.

The acceleration measuring device of the present Embodiment 4 is provided with an acceleration sensor 61 for detecting the acceleration in a triaxial direction, a data acquisition portion 65A for acquiring the triaxial output data of the acceleration sensor 61, a reference point estimating portion 73 in which a coordinate value of a reference point determined in a three-dimensional cartesian space is estimated from the distribution of a predetermined number of triaxial output data repeatedly acquired by the data acquisition portion 65A in the three-dimensional cartesian space when each axial component is given as a coordinate value by a statistical method so that variation of distances from a predetermined number of individual triaxial output data to the reference point can be minimized, and an offset correction/calculation portion 75 for correcting the offset of triaxial output data of an acceleration sensor on the basis of the coordinate value of the reference point estimated by the reference point estimating portion 73. Further, the data acquisition portion 65A is constituted with the multiplexer portion 65, the acceleration sensor driving power supply portion 66, the amplifier 67 and the A/D converter 68.

The triaxial acceleration sensor 61, the x-axis direction detecting circuit 62, the y-axis direction detecting circuit 63, the z-axis direction detecting circuit 64, the multiplexer portion 65, the acceleration sensor driving power supply portion 66, the amplifier 67, the A/D converter 68, the temperature detecting portion 69, the sensetivity correction information storage portion 70, the sensitivity correction/calculation portion 71, the offset information storage portion 74, and the offset correction/calculation portion 75 are the same as those given in the previously described Embodiment 1.

The data accumulating portion 72 is a data buffer for accumulating a predetermined number of triaxial output data sequentially output from the sensetivity correction information storage portion 71. The reference point estimating portion 73 estimates a coordinate of the reference point on the basis of a predetermined number of triaxial output data accumulated at the data accumulating portion 72, thereby outputting the reference point coordinate data.

The method for estimating a coordinate of the reference point at the reference point estimating portion 73 is similar to that described previously in Embodiment 1.

Further, <the specific method (I) for estimating C1'(Cx', Cy', Cz')> is also similar to that described previously in Embodiment 1. Specifically, the reference point estimating portion 73 estimates a coordinate value of the reference point in the three-dimensional cartesian space by a statistical method so that variation of distances from a predetermined number of individual triaxial output data to the reference point can be minimized.

Still further, <the specific method for estimating C1'(Cx', Cy', Cz') (II)> is also similar to that described previously in Embodiment 1. Specifically, the reference point estimating portion 73 estimates a coordinate value of the reference point determined in the three-dimensional cartesian space by a statistical method so that variation of distances from a predetermined number of individual triaxial output data to the reference point with respect to a predetermined representative values can be minimized.

Figure 21:
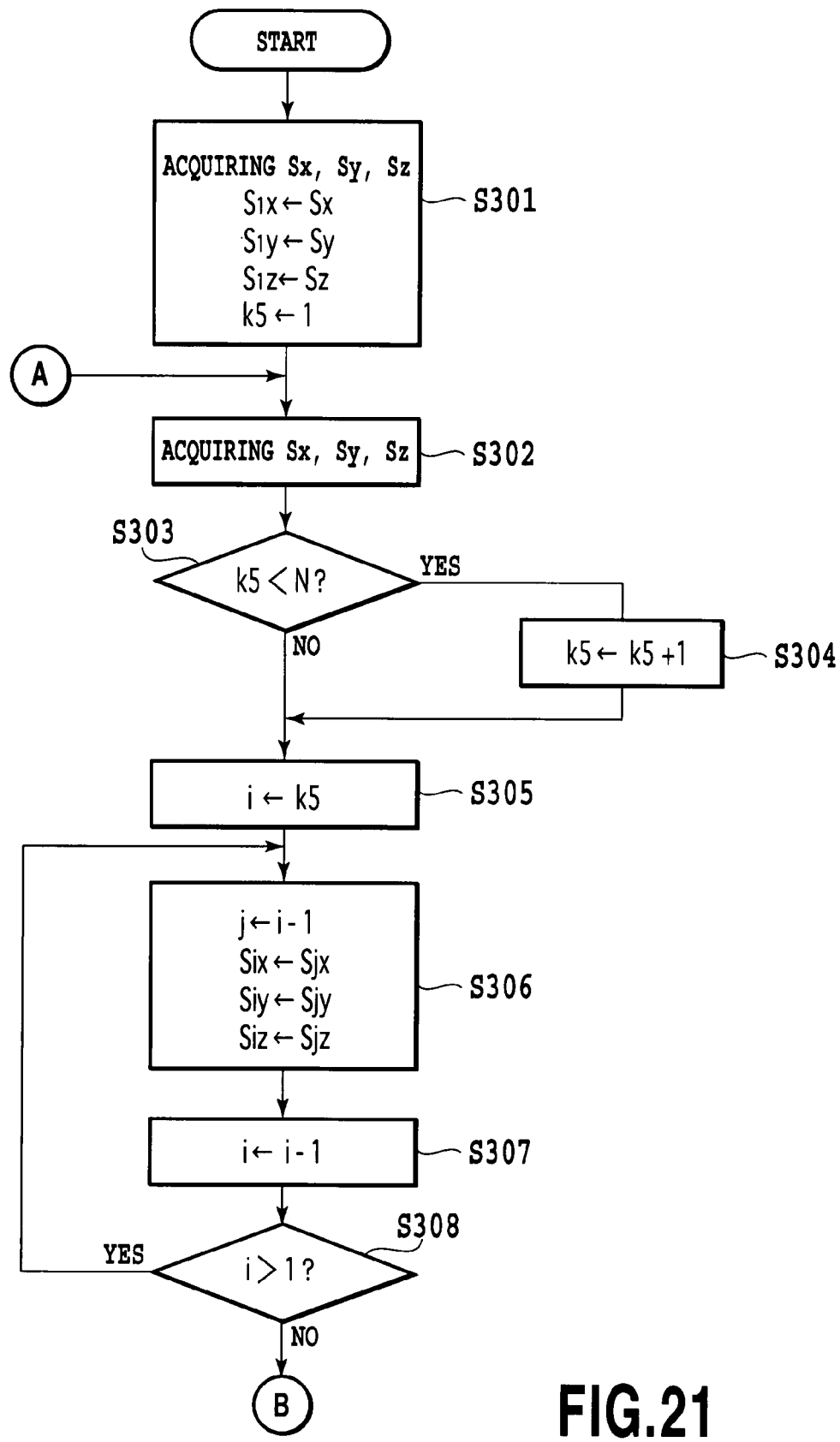
FIG. 21 is a flow chart (I) illustrating procedures for acquiring reference point coordinate data in Embodiment 4 of the present invention.
Figure 22:
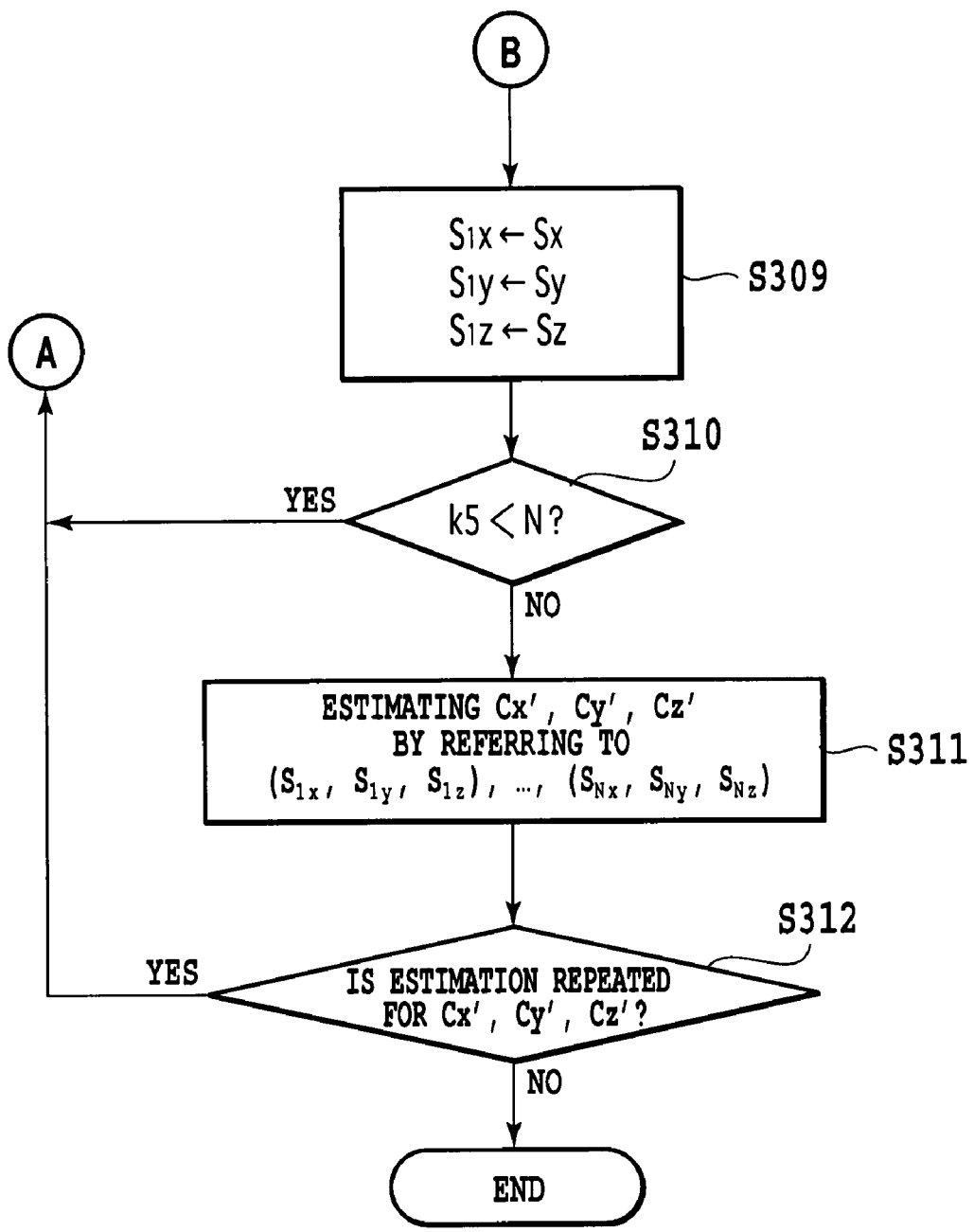
FIG. 22 is a flow chart (II) illustrating procedures for acquiring the reference point coordinate data in Embodiment 4 of the present invention.

FIG. 21 and FIG. 22 are flow charts illustrating procedures for acquiring reference point coordinate data in Embodiment 4 of the present invention.

First, the following operation (S301) is carried out as an initial setting. Then, triaxial output data Sx, Sy, Sz are acquired from the sensitivity correction/calculation portion 71 to store them at the first stage of $S_{1x}$, $S_{1y}$, $S_{1z}$ at the data accumulating portion 72. Then, the number k5, of triaxial output data accumulated at the data accumulating portion 72 is set to be one.

Then, Sx, Sy, Sz are acquired from the sensitivity correction/calculation portion 71 (S302). Where a value of k5 is less than a predetermined value N, k5 is increased by one value (S303, S304). Then, an index "i", is set to be a value of k5 (S305). An index "j", is set to be "i−1", and triaxial output data stored at j-th stage $S_{jx}$, $S_{jy}$, $S_{jz}$ of the data accumulating portion 72 are sent to i-staged $S_{ix}$, $S_{iy}$, $S_{ix}$(S306). When the index "i", is decreased by one value (S307) and the value of "i" exceeds one, the operation is returned to S306 (S308).

Next, Sx, Sy, Sz are stored at $S_{1x}$, $S_{1y}$, $S_{1z}$(S309). Where a value of k5 is less than N, the operation is returned to S302 (S310). Cx', Cy', Cz' are estimated by referring to ($S_{1x}$, $S_{1y}$, $S_{1z}$), . . . , ($S_{Nx}$, $S_{Ny}$, $S_{Nz}$) (S311). Where the Cx', Cy', Cz' are repeatedly estimated, the operation is returned to S302 (S312).

EMBODIMENT 5

The present Embodiment 5 is eliminated with the following means from the above-described Embodiment 2. That is, the selection of triaxial output data at the data selecting portion 40 and the data change judgment portion 41a at the data accumulating portion 41 are eliminated.

As explained in Embodiment 4, the above-described means can be eliminated in some applications of the acceleration measuring device. For this reason, Embodiment 5 is provided.

FIG. 23 is a block diagram illustrating Embodiment 5 of an acceleration measuring device of the present invention. In this embodiment, a reference point is estimated by a statistical method in which a length of each principal axis of an ellipsoid and a central coordinate value determined in a three-dimensional cartesian space are estimated so that a predetermined number of triaxial output data are individually brought closest to the ellipsoid.

In the drawing, the reference numeral 76 denotes a triaxial acceleration sensor, 77 denotes an x-axis direction component detecting circuit of triaxial acceleration sensor, 78 denotes a y-axis direction component detecting circuit of triaxial acceleration sensor, 79 denotes a z-axis direction component detecting circuit of triaxial acceleration sensor, 80A denotes a data acquisition portion, 80 denotes a multiplexer portion, 81 denotes an acceleration sensor driving power supply portion, 82 denotes an amplifier, 83 denotes an A/D converter, 84 denotes a data accumulating portion, 85 denotes a reference point estimating portion, 86 denotes a sensitivity/offset information storage portion, and 87 denotes a sensitivity/offset correction/calculation portion.

The acceleration measuring device of the present Embodiment 5 is provided with an acceleration sensor 76 for detecting the acceleration in a triaxial direction, a data acquisition portion 80A for acquiring the triaxial output data of the acceleration sensor 76, a reference point estimating portion 85 in which a length of each principal axis of an ellipsoid and a central coordinate value determined in a three-dimensional cartesian space are estimated from the distribution of a predetermined number of triaxial output data repeatedly acquired by the data acquisition portion 80A in the three-dimensional cartesian space when each axial component is given as a coordinate value by a statistical method so that a predetermined number of triaxial output data are individually brought closest to the ellipsoid, and a sensitivity/offset correction/calculation portion 87 for correcting the sensitivity and the offset of triaxial output data of an acceleration sensor on the basis of the length of each principal axis and the central coordinate value of the ellipsoid estimated by the reference point estimating portion 85. Further, the data acquisition portion 80A is constituted with the multiplexer portion 80, the acceleration sensor driving power supply portion 81, the amplifier 82 and the A/D converter 83.

The triaxial acceleration sensor 76, the x-axis direction detecting circuit 77, the y-axis direction detecting circuit 78, z-axis direction detecting circuit 79, the multiplexer portion 80, the acceleration sensor driving power supply portion 81, the amplifier 82, and the A/D converter 83 are the same as those described previously in Embodiment 1.

The data accumulating portion 84 is a data buffer for accumulating a predetermined number of triaxial output data sequentially output from the A/D converter 83. The reference point estimating portion 85 estimates a length of each principal axis of the ellipsoid and a central coordinate value on the basis of a predetermined number of triaxial output data accumulated at the data accumulating portion 84, thereby outputting the data on the length of the main axis of the ellipsoid and central coordinate. The sensitivity/offset information storage portion 86 and the sensitivity/offset correction/calculation portion 87 are the same as those described previously in Embodiment 2.

The method for estimating a length of each principal axis of the ellipsoid and a central coordinate value at the reference point estimating portion 85 is also similar to that described previously in Embodiment 2. Further, <the specific method for estimating $a_x'$, $a_y'$, $a_z'$ and Crx', Cry', Crz'> is also similar to that described previously in Embodiment 2.

Figure 24:
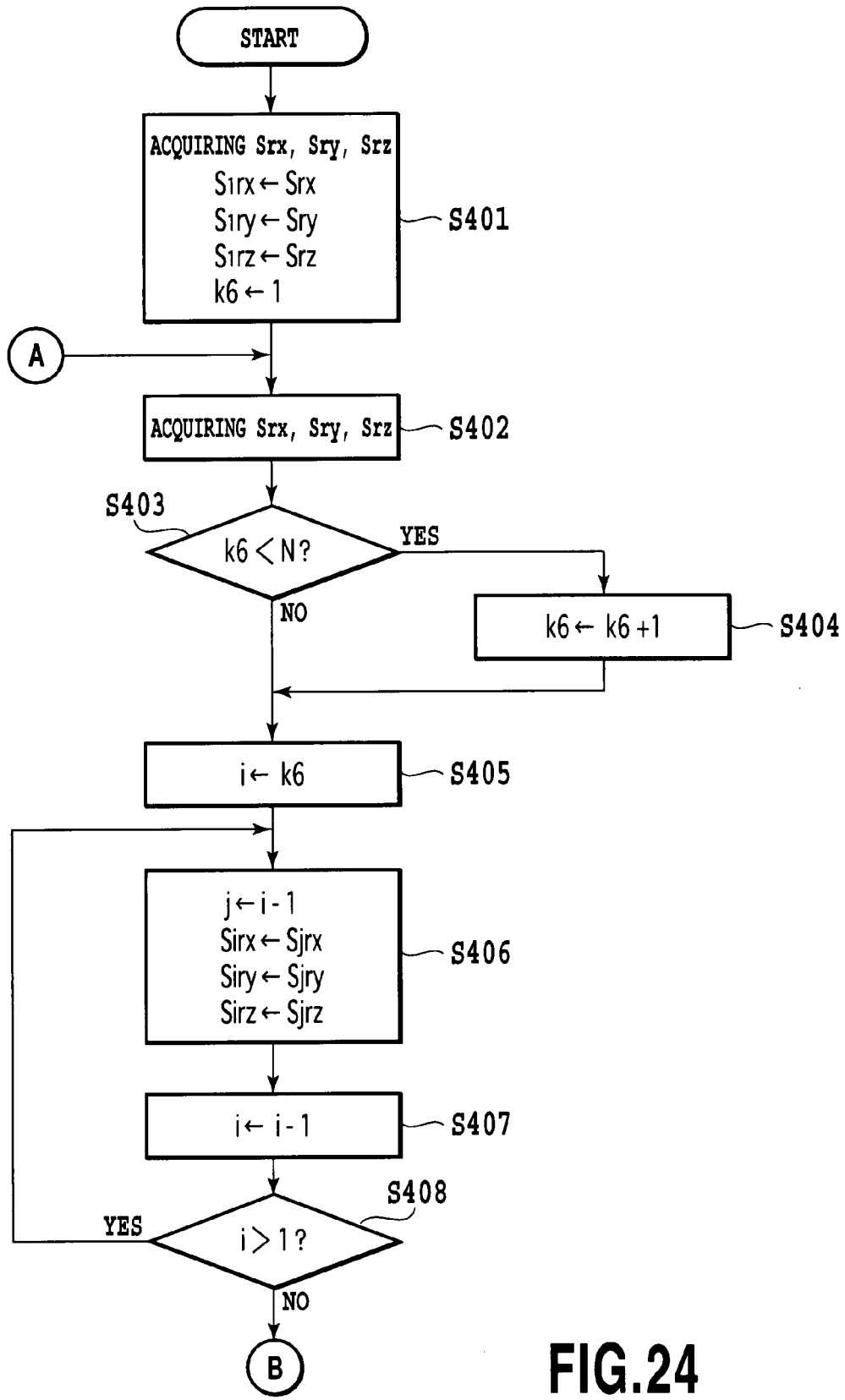
FIG. 24 is a flow chart (I) illustrating procedures for acquiring the reference point coordinate data in Embodiment 5 of the present invention.
Figure 25:
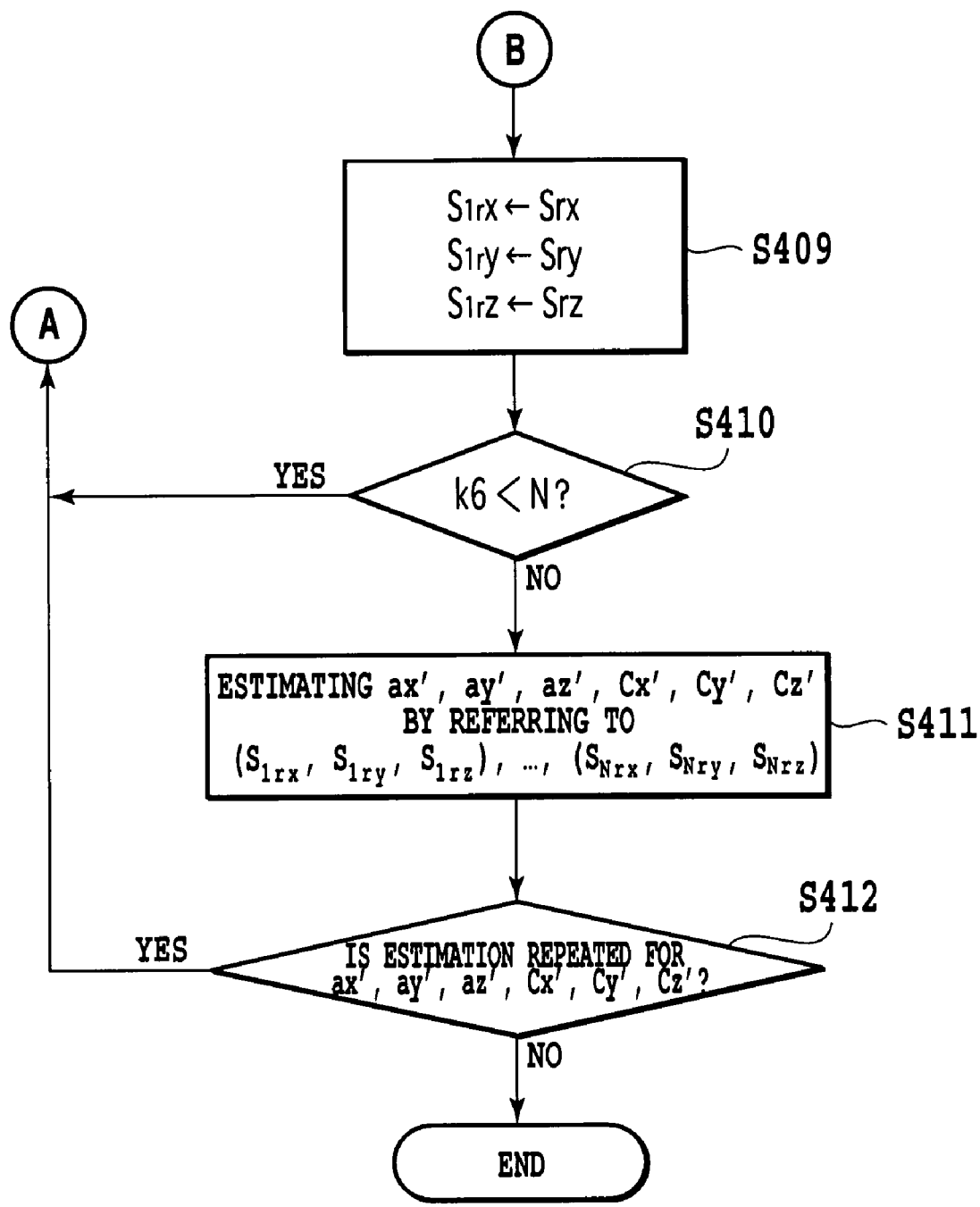
FIG. 25 is a flow chart (II) illustrating procedures for acquiring the reference point coordinate data in Embodiment 5 of the present invention.

FIG. 24 and FIG. 25 are flow charts illustrating procedures for acquiring reference point coordinate data in Embodiment 5 of the present invention.

First, the following operation (S401) is carried out as an initial setting. Then, triaxial output data Srx, Sry, Srz are acquired from the A/D converter 83 to store them at the first stage of $S_{1rx}$, $S_{1ry}$, $S_{1rz}$ at the data accumulating portion 84. Then, the number k6, of triaxial output data accumulated at the data accumulating portion 84 is set to be one.

Next, Srx, Sry, Srz are acquired from the A/D converter 83 (S402). Where a value of k6 is less than a predetermined value N, k6 is increased by one value (S403, S404). Then, an index "i", is set to be a value of k6 (S405). An index "j", is set to be "i−1", and triaxial output data stored at j-th stage $S_{jrx}$, $S_{jry}$, $S_{jrz}$ of the data accumulating portion 84 are sent to i-staged $S_{irx}$, $S_{iry}$, $S_{irx}$(S406). When the index "i", is decreased by one value (S407) and the value of "i" exceeds one, the operation is returned to S406 (S408).

Next, the Srx, Sry, Srz are stored at the $S_{1rx}$, $S_{1ry}$, $S_{irz}$ (S409). Where a value of k6 is less than N, the operation is returned to S402 (S410). Then, $a_x'$, $a_y'$, $a_z'$ and Crx', Cry', Crz' are estimated by referring to $(S_{1rx}, S_{1ry}, S_{1rz}), \ldots, (S_{Nrx}, S_{Nry}, S_{Nrz})$ (S411). Where the $a_x'$, $a_y'$, $a_z'$ and Cx', Cy', Cz' are repeatedly estimated, the operation is returned to S402 (S412).

Next, a description will be given of response to temperature characteristics. As described so far, in a piezoresistance-type acceleration sensor, the sensitivity and the offset have marked temperature characteristics. Therefore, where an acceleration measuring device is placed in a place greatly varying in an environmental temperature, temperatures on acquiring triaxial acceleration data used in estimation of reference point coordinate data stored at an offset information storage portion or temperatures on acquiring triaxial acceleration data used in estimation of data on the length of the main axis of the ellipsoid and central coordinate stored at a sensitivity/offset information storage portion may differ greatly from temperatures on acquiring triaxial acceleration data to be corrected at the offset correction/calculation portion or the sensitivity/offset correction/calculation portion, thereby expanding an error of correction for the offset or the sensitivity/offset.

Further, temperatures on acquiring a predetermined number of individual triaxial acceleration data used in estimation of the reference point coordinate data or those on acquiring a predetermined number of individual triaxial acceleration data used in estimation of the data on the length of the main axis of an ellipsoid and central coordinate may vary to a greater extent, thereby expanding an error of the reference point coordinate data or the data on the length of the main axis of an ellipsoid and central coordinate.

Hereinafter, a description will be given of various solution means for response to the temperature characteristics which are applicable to the previously described Embodiment 1 through Embodiment 5.

<Solution Means 1>

The present solution means 1 is applicable to the above Embodiments 1, 2, 4 and 5.

Hereinafter, a description will be given of the application to Embodiment 1.

Figure 26:
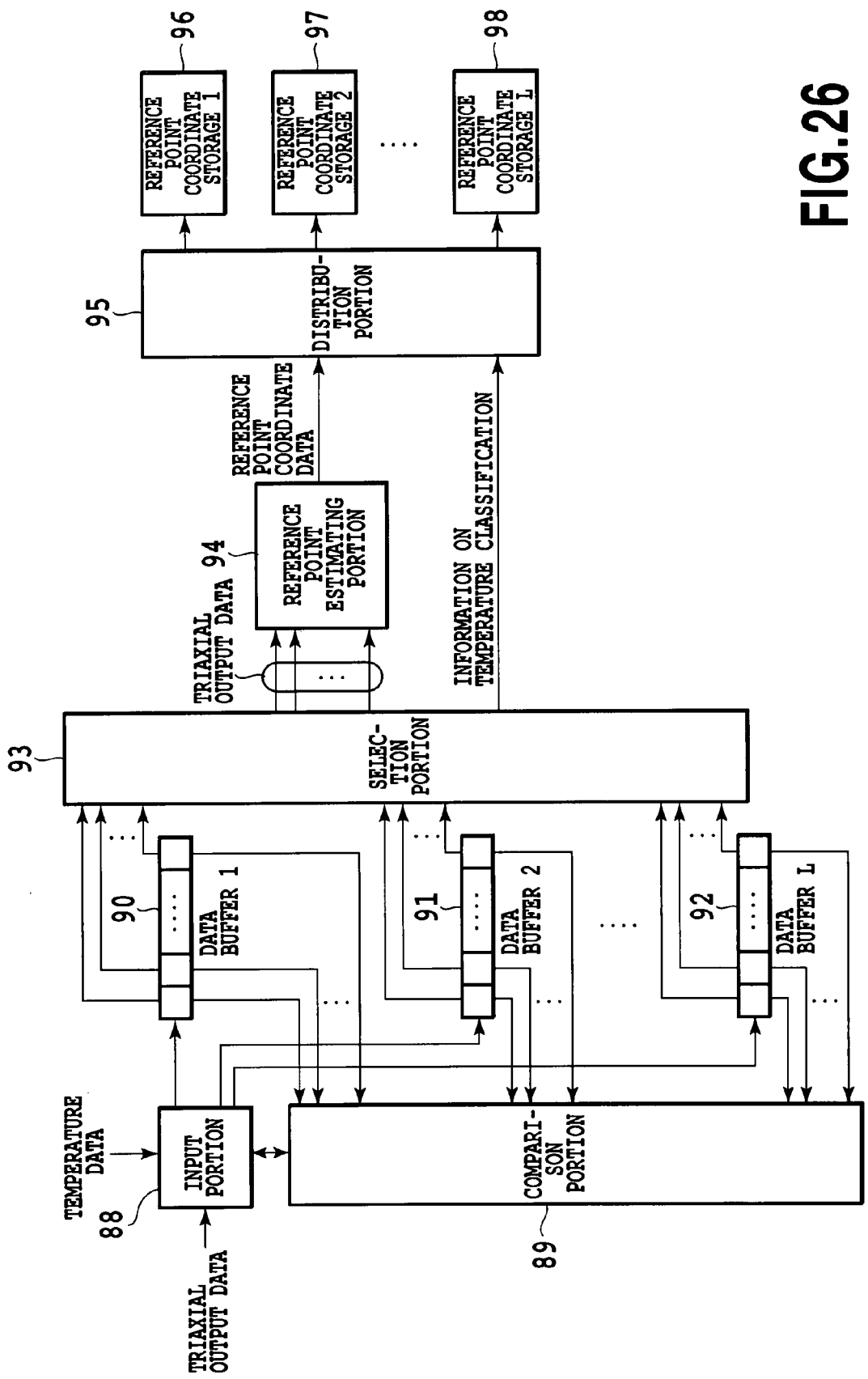
FIG. 26 is a block diagram illustrating a first solution means for countermeasure to temperature characteristics.

FIG. 26 is a block diagram showing solution means 1 for response to the temperature characteristics. In the drawing, the reference numeral 88 denotes an input portion, 89 denotes a comparison portion, 90 denotes a first data buffer, 91 denotes a second data buffer, 92 denotes a data buffer L, 93 denotes selection portion, 94 denotes a reference point estimating portion, 95 denotes distribution portion, 96 denotes a first reference point coordinate storage, 97 denotes a second reference point coordinate storage, and 98 denotes a reference point coordinate storage L. In other words, FIG. 26 shows one example of a detailed constitution corresponding to the data accumulating portion 14, the reference point estimating portion 15 and the offset information storage portion 16 when the present solution means is applied.

A temperature range at which the acceleration measuring device can be used is divided in advance into L-numbered classifications, each of which is called a temperature classification 1, a temperature classification 2, ... and a temperature classification L. Triaxial output data selected at a data selecting portion 13 are once stored temporarily at an input portion 88. The input portion 88 decides to which temperature classification the temporarily stored triaxial output data belong on the basis of temperature data acquired by a temperature detecting portion 9.

The first data buffer 90, the second data buffer 91, ... , the data buffer L 92 store triaxial output data which respectively belong to the temperature classification 1, the temperature classification 2, ... , and the temperature classification L.

The comparison portion 89 selects the same as the temperature classification to which triaxial output data temporarily stored at the input portion 88 belong from the first data buffer 90, the second data buffer 1, ... , the data buffer L 92. Thereafter, as described previously in Embodiment 1, the comparison portion 89 stores triaxial output data temporarily stored at the input portion 88 in a data buffer or discards them.

When triaxial output data temporarily stored at the input portion 88 are accumulated at a data buffer selected by the comparison portion 89, the selection portion 93 outputs the triaxial output data accumulated at the selected data buffer and information on temperature classification toward the reference point estimating portion 94, if the number of data accumulated at the selected data buffer has reached a predetermined number.

The reference point estimating portion 94 estimates a coordinate value of the reference point on the basis of triaxial output data output from the selection portion 93. The distribution portion 95 stores reference point coordinate data output from the reference point estimating portion 94 in any one of the first reference point coordinate storage 96, the second reference point coordinate storage 97, . . . , or the reference point coordinate storage L98 corresponding thereto on the basis of the information on temperature classification output from the selection portion 93.

Further, in accumulating triaxial output data temporarily stored at the input portion 88 in a data buffer selected by the comparison portion 89, the triaxial output data may be corrected, depending on a place of the decided temperature classification at which the temperature data acquired from the temperature detecting portion 9 are located. This is effective in a case where the sensitivity and the offset are substantially understood for the temperature dependency and the sensitivity and offset undergo a relatively great change in temperature within the temperature classification.

Thereafter, the offset correction/calculation portion 17 decides to which temperature classification triaxial output data output from the sensitivity correction/calculation portion 11 belong on the basis of temperature data acquired from the temperature detecting portion 9, and makes an offset correction by using reference point coordinate data stored in any one of the first reference point coordinate storage 96, the second reference point coordinate storage 97, . . . , or the reference point coordinate storage L98 corresponding thereto.

<Solution Means 2>

Figure 27:
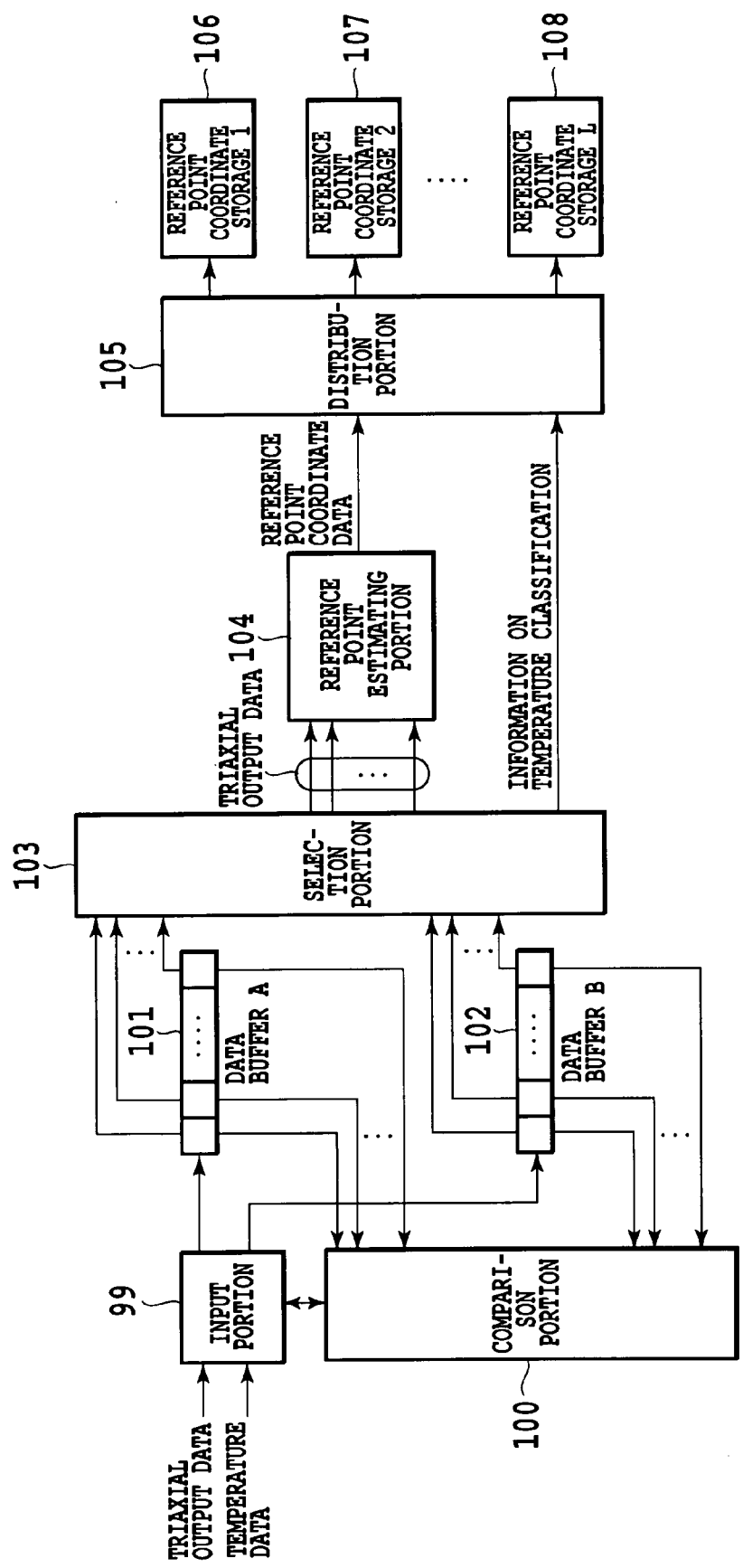
FIG. 27 is a block diagram illustrating a second solution means for countermeasure to temperature characteristics.

The present solution means 2 is applicable to the above Embodiments 1, 2, 4 and 5. Hereinafter, a description will be given of the application to Embodiment 1. FIG. 27 is a block diagram showing the solution means 2 for response to temperature characteristics. This drawing shows one example of a detailed constitution corresponding to the data accumulating portions 14 and 40, the reference point estimating portions 15 and 42, the offset information storage portion 16, and the sensitivity/offset information storage portion 43, when the present solution means is applied. In the drawing, the reference numeral 99 denotes an input portion, 100 denotes a comparison portion, 101 denotes a data buffer A, 102 denotes a data buffer B, 103 denotes a selection portion, 104 denotes a reference point estimating portion, 105 denotes a distribution portion, 106 denotes a first reference point coordinate storage, 107 denotes a second reference point coordinate storage, and 108 denotes a reference point coordinate storage L.

A temperature range at which the acceleration measuring device can be used is divided in advance into L-numbered classifications, each of which is called a temperature classification 1, a temperature classification 2, . . . , and a temperature classification L.

Triaxial output data selected at the data selecting portion 13 are once stored temporarily at an input portion 99. The input portion 99 decides to which temperature classification the temporarily stored triaxial output data belong on the basis of temperature data acquired from the temperature detecting portion 9.

The data buffer A101 accumulates triaxial output data, and the data buffer B102 accumulates temperature data acquired from the temperature detecting portion 9 in the same order, when triaxial output data accumulated in a data buffer A101 are temporarily stored at the input portion 99. As a result, individual triaxial output data accumulated in the data buffer A101 can be identified for the temperature classification by referring to temperature data accumulated in the data buffer B102.

The comparison portion 100 compares triaxial output data temporarily stored at the input portion 99 with those having the same temperature classification which are selected from triaxial output data accumulated in the data buffer A101, thereby accumulating them in the data buffer A101 or discarding them, as described previously in Embodiment 1.

Where triaxial output data temporarily stored at the input portion 99 are accumulated in the data buffer A101 or where, of triaxial output data that have already been accumulated in the data buffer A101, those which are the same as the triaxial output data to be accumulated this time in temperature classification are available in a predetermined number, temperature data in response to the oldest data in the data buffer B102 among the corresponding triaxial output data are discarded.

Where triaxial output data temporarily stored at the input portion 99 are accumulated in the data buffer A101, the previously-acquired temperature data are also accumulated in the data buffer B102.

The selection portion 103 outputs the corresponding triaxial output data and information on temperature classification toward the reference point estimating portion 104, in a case where, of triaxial output data accumulated in the data buffer A101, those which are the same as the triaxial output data that have been accumulated this time in temperature classification are available in a predetermined number on accumulation of triaxial output data temporarily stored at the input portion 99 in the data buffer A101.

The reference point estimating portion 104 estimates a coordinate value of a reference point on the basis of the triaxial output data output from the selection portion 103. The distribution portion 105 stores reference point coordinate data output from the reference point estimating portion 104 in any one of the first reference point coordinate storage 106, the second reference point coordinate storage 107, . . . , or the reference point coordinate storage L108 corresponding thereto on the basis of the information on temperature classification output from the selection portion 103.

Thereafter, the offset correction/calculation portion 17 decides to which temperature classification the triaxial output data output from the sensitivity correction/calculation portion 11 belong, on the basis of temperature data acquired from the temperature detecting portion 9, and makes an offset correction by using reference point coordinate data stored at any one of the first reference point coordinate storage 106, the second reference point coordinate storage 107, . . . , or the reference point coordinate storage L108 corresponding thereto.

<Solution Means 3>

The present solution means 3 is applicable to the above Embodiment 3.

Figure 28:
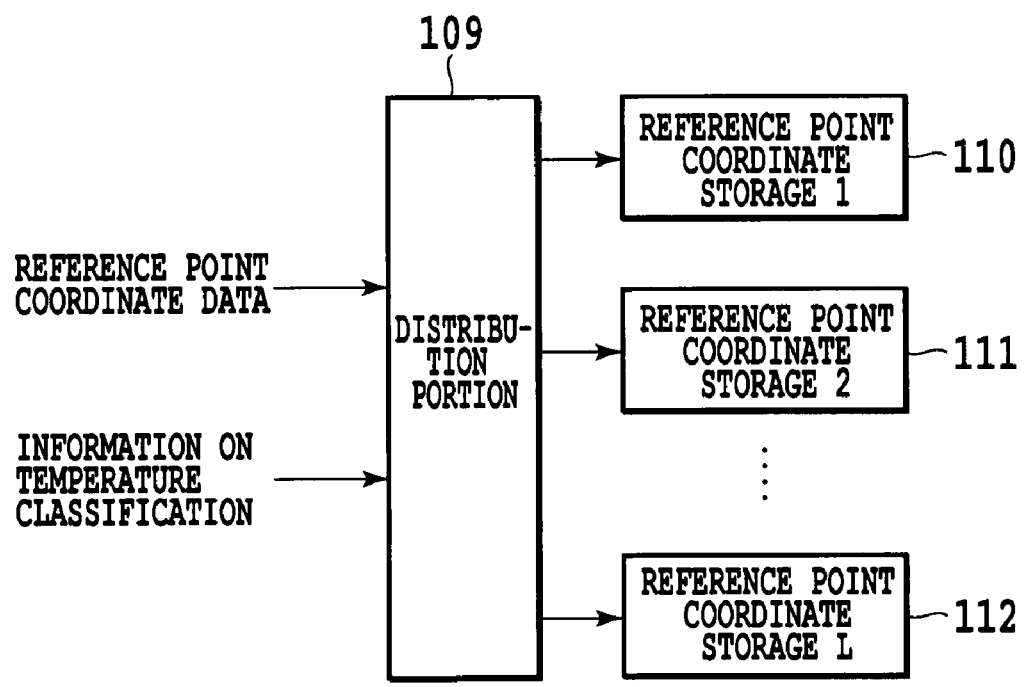
FIG. 28 is a block diagram illustrating a third solution means for countermeasure to temperature characteristics.

FIG. 28 is a block diagram showing the solution means 3 for response to temperature characteristics. This drawing shows one example of a detailed constitution corresponding to the offset information storage portion 57, when the present solution means is applied. In the drawing, the reference numeral 109 denotes a distribution portion, 110 denotes a first reference point coordinate storage, 111 denotes a second reference point coordinate storage, and 112 denotes a reference point coordinate storage L.

A temperature range at which the acceleration measuring device can be used is divided in advance into L-numbered classifications, each of which is called a temperature classification 1, a temperature classification 2, . . . , and a temperature classification L. The distribution portion 109 stores reference point coordinate data output from the reference point estimating portion 56 in any one of the first reference point coordinate storage 110, the second reference point coordinate storage 111, . . . , or the reference point coordinate storage L112 corresponding thereto on the basis of the temperature data acquired from the temperature detecting portion 53.

Thereafter, the offset correction/calculation portion 58 decides to which temperature classification the triaxial output data output from the sensitivity correction/calculation portion 55 belong on the basis of the temperature data acquired from the temperature detecting portion 53, and makes an offset correction by using reference point coordinate data stored in any one of the first reference point coordinate storage 110, the second reference point coordinate storage 111, . . . , or the reference point coordinate storage L112 corresponding thereto.

Next, a description will be given of individual solution means for response to defective data.

<Solution Means 1>

The present solution means 1 is applicable to the above Embodiments 1, 2, 4 and 5. Hereinafter, a description will be given of the application to Embodiment 1. In order to obtain favorable reference point estimation results, it is preferable that points, $P_1(S_{1x}, S_{1y}, S_{1z})$, $P_2(S_{2x}, S_{2y}, S_{2z})$, . . . , $P_N(S_{Nx}, S_{Ny}, S_{Nz})$ of N pieces of triaxial output data in a three-dimensional cartesian space (x, y, z) are distributed at various places as evenly as possible. Since the position of each point is decided depending on a attitude of the triaxial acceleration sensor 1, it is preferable that the acceleration measuring device is directed at as many directions as possible in acquiring N pieces of triaxial output data.

However, some users tend to have a limited change in direction of the acceleration measuring device, and in this instance, the points $P_1(S_{1x}, S_{1y}, S_{1z})$, $P_2(S_{2x}, S_{2y}, S_{2z})$, $P_N(S_{Nx}, S_{Ny}, S_{Nz})$ are distributed unevenly to result in a failure in acquiring favorable reference point estimation results.

In this instance, it is possible that an axial component which has been least changed in all axial components of triaxial output data is excluded and biaxial output data made up of remaining biaxial components can be estimated for a reference point coordinate, thereby making an offset correction of the biaxial components.

Specifically, the above operation is carried out by the following procedures.

First, N pieces of the thus acquired triaxial output data are calculated for variation by each axial component. Such an assumption is made here that, as a result of the calculation, variation of z-axial component v(z) is smaller than that of x-axial component v(x) or that of y-axial component v(y).

Next, where the v(z) exceeds a predetermined value, an estimation is made as normal for a reference point coordinate. Then, where the v(z) is equal to or less than a predetermined value, z-axial component data, $S_{1z}, S_{2z}, \ldots, S_{Nz}$ are eliminated from N pieces of triaxial output data and the remaining x-axial component data, $S_{1x}, S_{2x}, \ldots, S_{Nx}$ and y-axial component data, $S_{1y}, S_{2y}, \ldots, S_{Ny}$ are used to constitute the biaxial output data.

Next, in a two-dimensional cartesian space (x, y), the above-described biaxial output data are expressed as N pieces of points which are $P_1'(S_{1x},S_{1y}), P_2'(S_{2x},S_{2y}), \ldots, P_N'(S_{Nx},S_{Ny})$.

Next, in the two-dimensional cartesian space (x, y), an estimation is made for a point C1''(Cx'', Cy''), the distance of which is constant from anyone of $P_1', \ldots, P_N'$. Then, coordinate values Cx'', Cy'' of the point C1'' are used to make an offset correction of x-axial component and x-axial component in the triaxial output data.

<Solution Means 2>

The present solution means 2 is applicable to the above-described Embodiments 1 to 5. Hereinafter, a description will be given of the application to Embodiment 1. As described above, a coordinate value of the reference point estimated from the distribution of points of N-pieces of the thus acquired triaxial output data in a three-dimensional cartesian space (x, y, z) corresponds to the offset of triaxial output data.

In a piezoresistance-type acceleration sensor, since the offset has marked temperature characteristics, the offset will change over time where there is a great change in temperature in the environment in which an acceleration measuring device is placed. However, an abrupt change in offset for a short time is less likely to take place in view of characteristics of the piezoresistance-type acceleration sensor.

Therefore, where in the course of making a sequential estimation of reference point coordinates, the estimated reference point coordinate changes greatly for a short time, it is more likely that triaxial output data are contaminated by relatively large noises or a attitude of an acceleration measuring device that is acquiring the triaxial output data is changed to a limited extent, thereby making it difficult to estimate reference point coordinates.

Further, the use of such reference point coordinates will result in an erroneous offset correction. Thus, in making an estimation of reference point coordinates, calculation is made for variation of a predetermined number of latest reference point coordinate values. Where the variation is greater than a predetermined value, it is regarded that reference point coordinates are not favorably estimated and an estimated reference point coordinate value is discarded, thereby preventing an erroneous offset correction.

<Solution Means 3>

The present solution means 3 is applicable to the above-described Embodiments 1 to 5. Hereinafter, a description will be given of the application to Embodiment 1. According to the above formula (20), a distance from a point P (Sx, Sy, Sz) in which each axial component of triaxial output data is given as a coordinate value in a three-dimensional cartesian space (x, y, z) to a reference point C1 (Cx, Cy, Cz) is a product of a corrected sensitivity "a", with the gravitational acceleration "g".

In a piezoresistance-type acceleration sensor, since the sensitivity has marked temperature characteristics, the sensitivity will change over time where there is a great change in temperature in the environment in which an acceleration measuring device is placed. However, an abrupt change in sensitivity for a short time is less likely to take place in view of characteristics of the piezoresistance-type acceleration sensor. Further, in Embodiment 1, the sensitivity correction/calculation portion 11 makes a sensitivity correction and the corrected sensitivity "a", is substantially constant.

The gravitational acceleration "g", may be regarded as a constant value in a normally applied area. Therefore, a and g, are a value which can be expected in advance and, and a distance from a reference point estimated in a three-dimensional cartesian space (x, y, z) to a point indicating each triaxial output data should also be converged on the value expected in advance.

Therefore, in estimating reference point coordinates, calculation is made for a mean distance from an estimated reference point to a point indicating each triaxial output data or others. Where the value is out of a predetermined range, it is regarded that either of the correction of sensitivity or the estimation of reference point coordinates is not favorably made at the sensitivity correction/calculation portion 11 or neither of them is favorably made and the thus estimated reference point coordinate value is discarded, thereby making it possible to prevent an erroneous offset correction.

Next, a description will be given of the application to a biaxial acceleration sensor.

The above-described Embodiment 1 to Embodiment 5 is applicable to an acceleration measuring device provided with an acceleration sensor for detecting the acceleration in a biaxial direction in place of an acceleration sensor for detecting the acceleration in a triaxial direction.

In this instance, the reference point estimating means of Embodiments 1 and 4 refers to the distribution of a predetermined number of biaxial output data accumulated by the output data accumulating means in a two-dimensional orthogonal space when each axial component is given as a coordinate value, thereby estimating a coordinate of the reference point determined in the two-dimensional orthogonal space.

Further, the reference point estimating means of Embodiments 2 and 5 refers to the distribution of a predetermined number of biaxial output data accumulated by the output data accumulating means in a two-dimensional orthogonal space when each axial component is given as a coordinate value, thereby estimating a length of each principal axis of the ellipse and a central coordinate value determined on the two-dimensional orthogonal space.

Still further, in the application to Embodiments 1, 2, 4, 5, while biaxial output data are acquired for estimating a coordinate of the reference point or a length of each principal axis of the ellipse and a central coordinate value, an acceleration measuring device is controlled for the attitude in such a manner that an angle is formed to be constant between the axial direction vertical to either of the biaxial directions detecting the acceleration and the gravitational acceleration direction.

EMBODIMENT 6

In a triaxial acceleration sensor, where an acceleration sensor is subjected only to the gravitational acceleration, in other words, where it is stationary, the distribution of output data of the acceleration sensor (hereinafter, referred to as measurement data) are distributed so as to form a spherical surface or an ellipsoid in a three-dimensional cartesian system. Therefore, the offset can be estimated by calculating the central value of the spherical surface or the ellipsoid.

In performing calculation applied to a spherical surface or an ellipsoid in an acceleration sensor, there is a method in which, for example, measurement data are accumulated in a finite-length buffer to estimate the center of the sphere by referring to the thus accumulated measurement. In order to estimate the center of the sphere at a high accuracy in this instance, it is necessary that the measurement data are distributed on the spherical surface or the ellipsoid at a high degree of reliability. In other words, the measurement data must be data acquired when the sensor is completely stationary.

It is necessary to judge whether an acceleration sensor is stationary in order to acquire the measurement data while the sensor is stationary. A judgment of a stationary state can easily be made by confirming that measurement data are not changed during a time set by a certain threshold value.

Where a threshold value at the set time is small, a value may be incorporated at a moment when the sensor accidentally has a uniform acceleration motion. Where a threshold value is made longer which is acquired when the sensor is stationary, it is less likely such a value is incorporated, however, it takes a longer time to acquire measurement data while the sensor is stationary, thereby resulting in a lower efficiency of acquiring the data. It is, thus, advisable to add stationary time information on how many seconds the sensor is kept stationary to the measurement data at the stationary time.

The stationary time information can be used as an index indicating how much accumulated measurement data are reliable as data at the stationary time. The fact that an acceleration sensor is stationary for a short time indicates a lower probability that the sensor is stationary at the time when the data are acquired. In contrast, the fact that the sensor is stationary for a longer time indicates a higher probability that the sensor is stationary. This stationary time information may be used, for example, in the following examples.

Where a finite-length buffer is used to make a calculation, data which are located at a close distance inside a three-dimensional space can be removed to eliminate data redundancy inside the buffer, thereby attaining an effective use of the buffer. The standard for judging which data are more reliable becomes a problem when data located at a close distance are compared to each other. Here, added stationary time information can be compared to easily judge which data are more secure without a statistical calculation or others.

In the above example, the stationary time information is added to the measurement data. However, where measurement is made at regular intervals, the on how many times the measurement is made during a time frame from when the sensor is judged to be stationary to when it is then judged not to be stationary may be added.

In other words, in Embodiment 6, the data selecting portions 13 and 40 calculate a difference in output data which are used as a standard each time output data are acquired by the data acquisition portions 5A and 35A, selecting any one of output data selected from output data as a standard, those acquired just before an excess over a predetermined value or those acquired during a time when output data as a standard are acquired to a time just before the difference exceeds a predetermined value or the mean value thereof, when the difference exceeds a predetermined value. The data accumulating portions 14 and 41 add a time frame from when the output data as a standard are acquired to when they exceed a predetermined value to the output data selected by the data selecting portions 13 and 40.

<Specific Means>

Figure 29:
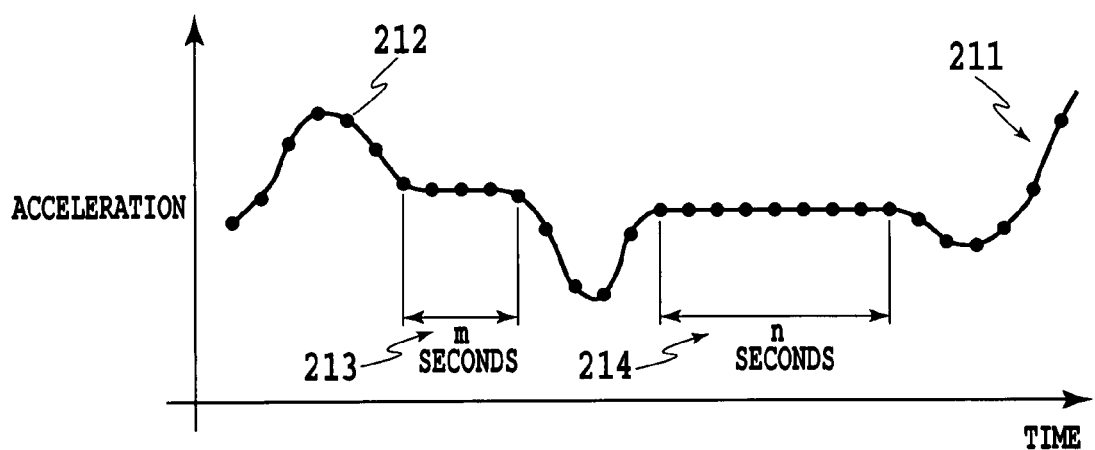
FIG. 29 is a conceptual diagram (I) illustrating triaxial output data in Embodiment 6 of the present invention.

FIG. 29 is a conceptual diagram (I) showing triaxial output data in Embodiment 6 of the present invention. It is expressed in a mono-dimensional manner here for a simple explanation.

The curve 211 indicates an over-time change in acceleration which an acceleration sensor receives, and the black point 212 indicates a timing of acquiring output data by a triaxial acceleration sensor. The interval 213 and the interval 214 indicate that the output value of acceleration sensor is constant only for "m" seconds and only for "n" seconds respectively. Further, in this instance, "m" is smaller than "n". It can be regarded that the acceleration sensor is stationary at these intervals because the output is constant. Therefore, both of these data can be used as measurement data at the stationary time.

However, where, of these measurement data, either of them must be eliminated, the measurement time is compared to judge that measurement data at an interval 214 which is longer in stationary time may have reliability, thereby making it possible to adopt the measurement data at the interval 214.

A threshold value for judging whether an output value is constant can be arbitrarily determined.

Figure 30:
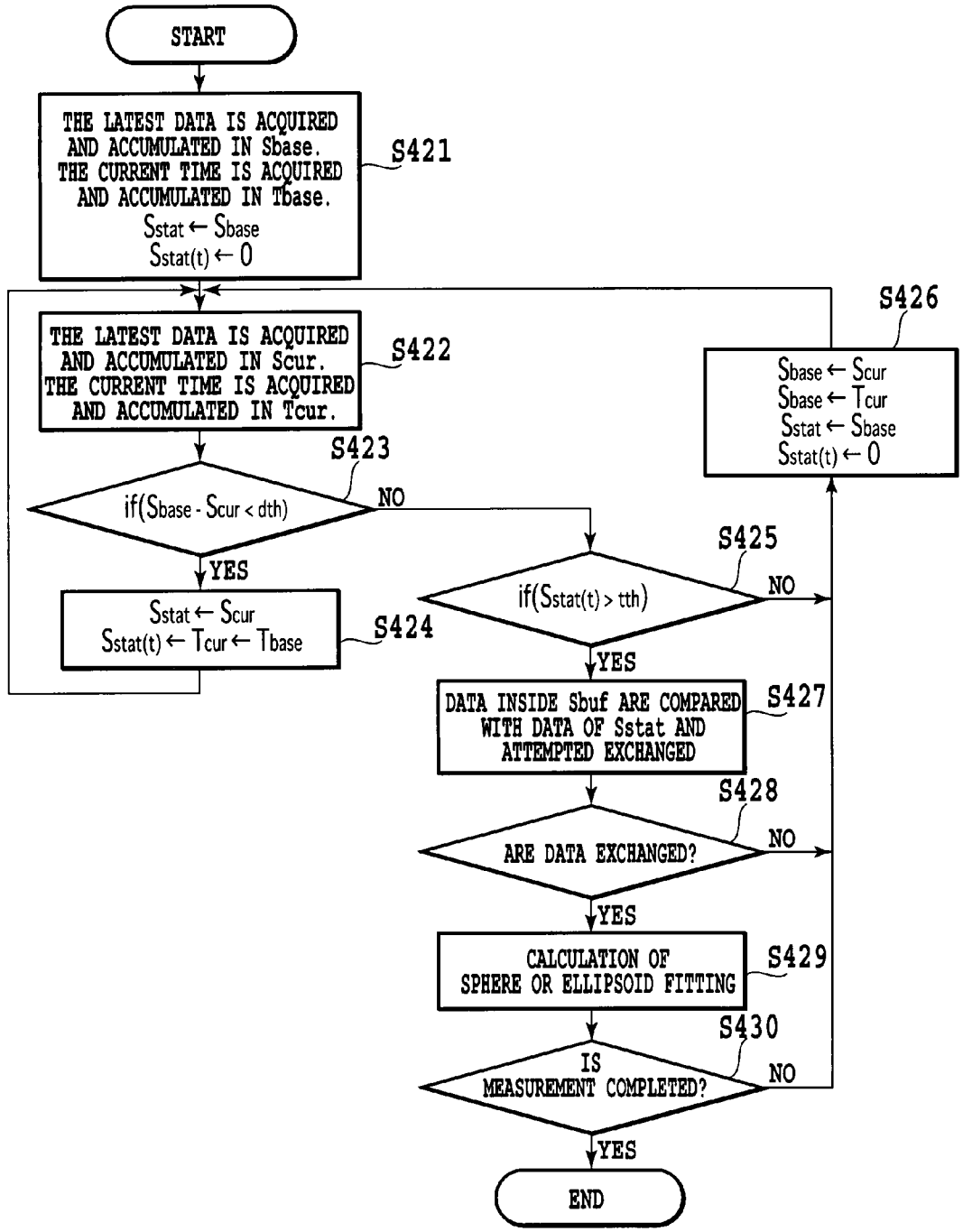
FIG. 30 is a flow chart illustrating procedures for selecting data in Embodiment 6 of the present invention.

FIG. 30 is a flow chart illustrating procedures for selecting data in Embodiment 6 of the present invention, or a flow chart of acquiring offset information.

In FIG. 30, Scur, Sbase and Sstat denote triaxial acceleration measurement data, and they are a structure having X, Y, Z, t as a component. In this instance, Scur denotes the latest measurement data, Sbase denotes a reference point for making a stationary judgment, and Sstart denotes measurement data which are judged to be stationary. Scur(x), Scur(y), Scur(z) and Scur(t) respectively denote the components of X, Y, Z of the measurement data Scur. Further, Scur(t) denotes a time frame that has passed from the time when the reference point, Sbase, is measured to the time when the Scur is measured (duration time information). Sbuf until Scur is measured denotes an arrangement of triaxial acceleration measurement data, and Sbuf[i] denotes an i-th element inside the arrangement.

In FIG. 30, triaxial acceleration measurement data are acquired as an initial setting and accumulated in Sbase, and the current time is at the same time acquired and accumulated in Tbase. Only at the time of the initial setting, is a value of Sbase substituted for Sstat, and 0 is substituted for Sstat(t) (S421). Next, the triaxial acceleration measurement data and the current time are again acquired and accumulated into Scur and Tcur respectively (S422).

Next, calculation is made for a distance of Sbase and that of Scur in a three-dimensional space. To simplify this calculation, a minus operator is used to make a description (S43). Where the calculated distance is smaller than a predetermined value (dth), the latest measurement value Scur is substituted for Sstart, and a difference between time Tbase and time Tcur, that is, a time frame from time when Sbase is measured to time when Scur is measured, is accumulated at Sstat(t). On the other hand, where the calculated distance exceeds a predetermined value, an acceleration sensor is regarded to move and a value of Sstat (t) is checked (S425).

Figure 31:
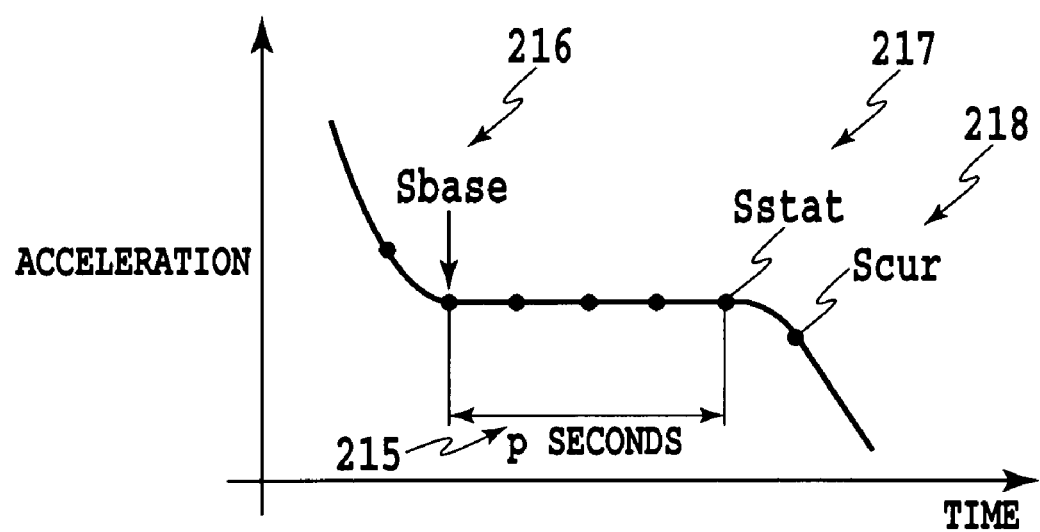
FIG. 31 is a conceptual diagram illustrating triaxial output data in Embodiment 6 of the present invention.

FIG. 31 is a drawing showing a concept of measurement data accumulated at each variable at a time point when the treatment of S425 shown in FIG. 30 is carried out. It is expressed in a mono-dimensional manner here for a simple explanation.

The interval 215 indicates that an acceleration sensor is stationary for P seconds. When Scur 218 is given as the latest measurement data, Sbase 216 denotes measurement data at the start of an interval. Sstat is to retain the measurement data which are those acquired just before Scur is measured. Further, Sstat(t) retains the time P seconds during which a sensor is stationary.

Where a value of Sstat(t) is equal to or less than a predetermined value (tth), Sbase and Sstat are overwritten by Scur, Tbase is overwritten by Tcur, and Sstat(t) is overwritten by 0(S426).

Where a value of Sstat(t) is greater than a predetermined value, measurement data inside the data buffer Sbuf are attempted to be substituted for Sstat (S427). Finally, a judgment is made for whether the data buffer has been renewed (S428), a spherical central coordinate which can minimize variation of the distances from individual measurement data inside the data buffer is determined to estimate the offset (S429). A judgment is made for whether the data are completely measured (S430). If the measurement is not completed, the above described treatment is repeated.

Figure 32:
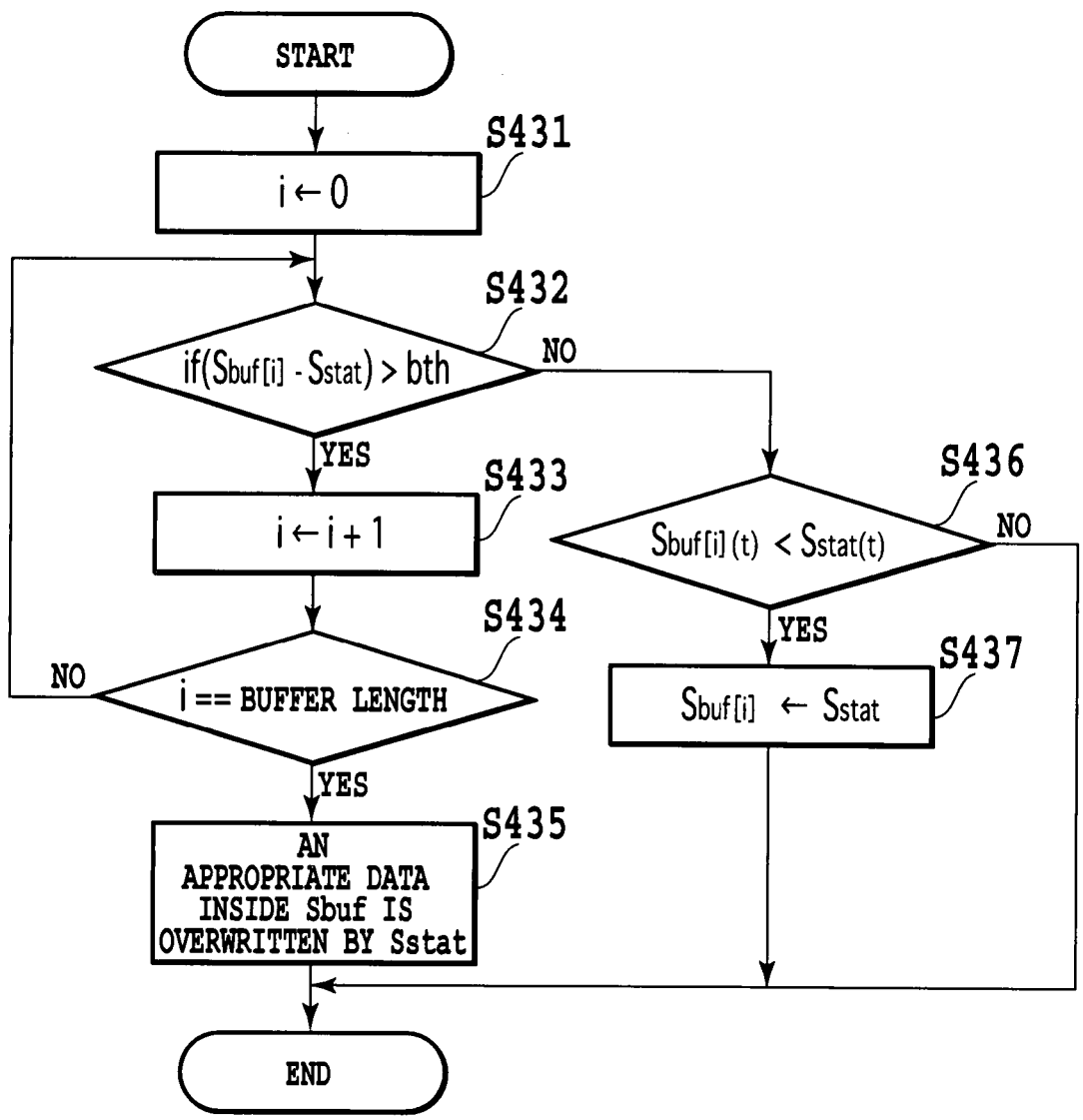
FIG. 32 is a flow chart illustrating procedures for exchanging measurement data inside a data buffer in Embodiment 6 of the present invention.

FIG. 32 is a flow chart illustrating procedures for exchanging measurement data inside the data buffer in Embodiment 6 of the present invention, or a flowchart illustrating in detail the treatment of S427 in FIG. 30.

First, calculation is made for a distance from measurement data Sbuf[i] inside the data buffer Sbuf to Sstat in a three-dimensional space (S431). Where a spatial distance from the measurement data Sstat to all the measurement data inside the data buffer Sbuf is greater than a predetermined value (S432), one piece of appropriate data inside the data buffer Sbuf is substituted by the Sstat (S433 to S435).

On the other hand, where a special distance from the data Sbut[i] to the Sstat is equal to or less than a predetermined value (S432), the duration time information on these measurement data Sbuf[i](t) is compared with the Sstat(t) (S436). Where the Sstat(t) is equal to or greater than the Sbuf[i](t), the Sbuf[i] is substituted by the Sstat (S437). Where the Sbuf[i](t) is smaller than the Sstat(t), the data buffer Sbuf is not renewed but the treatment of S427 shown in FIG. 30 is completed.

As an example of selecting measurement data to be deleted from the buffer, the duration time information may be used. Of measurement data inside the data buffer, measurement data having the shortest time may be deleted. Or, the following data may also be deleted, that is, measurement data which are closest in spatial distance to the Sstat, the oldest acquired measurement data, or measurement data which are most distant from an estimated spherical surface or an ellipsoid.

EMBODIMENT 7

In performing calculation applied to a spherical surface or an ellipsoid, where output data (measurement data) of the acceleration sensor are exactly on the spherical surface or the ellipsoid in a three-dimensional space, it is possible to determine a central point at a high accuracy even if individual measurement points are distributed in a narrow range on the spherical surface.

Since the measurement data are influenced by noises or quantization errors, it is rare that the measurement data are exactly on the spherical surface even when an acceleration sensor is stationary. There is a problem that data are influenced by the errors to result in a failure in making an accurate estimated calculation, if the measurement points are distributed in a narrow range.

However, if the measurement data are distributed in a sufficiently wide range inside a three-dimensional space, it is possible to lower the influence of these errors. That is, any given linear axis is set in a three-dimensional cartesian space, and data are accumulated inventively so that point data closer to a maximum value or a minimum value can be distributed on the axis. Further, in performing calculation applied to an ellipsoid, if there are one or more pieces of measurement data at sites close respectively to both ends of a long axis and a short axis of the ellipse body, it is possible to make an extremely accurate estimated calculation. In outputting from a triaxial acceleration sensor for detecting the acceleration in a mutually orthogonal three-dimensional direction, the output data are distributed on an ellipse body having any one of the components of measurement direction, that is, measurement axes, each as a long axis or a short axis. Therefore, data which have a component as a maximum value or a minimum value on the measurement axis of an acceleration sensor are used to perform calculation applied to the ellipsoid at an improved accuracy.

An object of the present Embodiment 7 is that the measurement axis of an acceleration sensor and an axis having a linear relationship with the axis thereof are provided to preferentially accumulate output data that can be given as a maximum value or a minimum value on the axis, thereby acquiring a group of data that can reduce an estimation error in performing calculation applied to an ellipsoid.

For example, where a long axis and a short axis of the ellipse body to be estimated coincide with the axes of X, Y, Z of a three-dimensional cartesian system, measurement data are judged for whether they are a maximum value and a minimum value of each principal axis and then may be accumulated. In this instance, attention should be given to the number of buffers for accumulating the measurement data.

If measurement data which are maximum and minimum on the axis are only accumulated, a data buffer length of which is two times the number of axes will be sufficient. However, where a data buffer has a length which is exactly two times the number of axes and if the data buffer is once satisfied with maximum and minimum measurement data, measurement data inside the data buffer cannot be exchanged.

In order to judge whether the calculation result is reliable in a method for estimating the offset and the sensitivity by performing calculation applied to a sphere and an ellipse body, a judgment can be made for whether individual calculation results obtained by using different groups of measurement data are a sufficiently close value.

However, if measurement data inside the data buffer are not exchanged, calculation applied to a sphere or an ellipse body will always return the same results, thereby making it difficult to confirm whether the calculation result is reliable.

Thus, redundancy is given to the data buffer so as to accumulate measurement data other than maximum and minimum values on the axis, thereby making it possible to accumulate measurement data judged not to be maximum nor minimum on any axis at the redundancy portion. This redundancy data buffer accumulates FIFO-type measurement data. As a result, the data buffer is renewed as a whole each time measurement data at the stationary time are renewed, thus making it possible to acquire a group of measurement data which are always different. In other words, calculation applied to a sphere or an ellipse body is performed each time the group of data is renewed to evaluate the result, thereby making it possible to judge whether the calculation result is reliable.

<Specific Method>

FIG. 33 is a specific block diagram showing a data change judgment portion in Embodiment 7 of the present invention. This drawing shows a specific method for selecting measurement data, or describing in detail the data storage portion 12 and the data selecting portion 13 in FIG. 1. In the drawing, the reference numeral 220 denotes a data input portion, 221 denotes an axis comparison portion, 222 denotes a maximum/minimum value data buffer, 223 denotes a FIFO-type data buffer, and 224 denotes an output portion.

Measurement data output from the sensitivity correction/calculation portion 11 are temporarily accumulated at the input portion 220. The axis comparison portion 221 comparers the measurement data stored at the input portion 220 with the measurement data stored at the maximum/minimum data buffer 222. And when it judges that the data stored at the input portion 220 is maximum or minimum on any axis, the axis comparison portion 221 exchanges the measurement data with the data inside the maximum/minimum data buffer 222 corresponding thereto.

In this instance, measurement data accumulated inside the maximum/minimum data buffer 222 are newly stored at the input portion 220. When a comparison is completed with all the measurement data inside the maximum/minimum data buffer, data which are not maximum nor minimum on any axis are consequently stored at the input portion 220. The measurement data, which are not maximum nor minimum and stored at the input portion 220, are accommodated at the first stage of the FIFO-type data buffer 223, and the measurement data accumulated at the last stage are discarded.

After completion of the above procedures, the output portion 224 outputs the measurement data accumulated at the maximum/minimum data buffer 222 and the FIFO-type data buffer 223 toward the reference point estimating portion 15.

FIG. 34 is a flow chart illustrating procedures for preferentially accommodating data in which each of the measurement data inside the data buffer is maximum or minimum with respect to any one of X, Y or Z axis of triaxial acceleration sensor in the present Embodiment 7, or a flow chart illustrating in detail the treatment of S427 shown in FIG. 30.

This Embodiment has each piece of the measurement data which is maximum or minimum with respect to the X, Y, Z axis, measurement axes of the triaxial acceleration sensor, inside the data buffer, as well as one redundant data buffer. As a result, the length of the data buffer is set to be 7.

First, calculation is made for a distance from the measurement data Sbuf[i] inside the data buffer Sbuf to the Sstat in a three-dimensional space (S442). Where a spatial distance from the measurement data Sstat to all the measurement data inside the data buffer Sbuf exceeds a predetermined value (S443), a judgment is made for the condition on the basis of counter values (S444).

In this instance, the condition based on the counter values is that where i=0, a maximum is obtained on the X axis, where i=1, a minimum is obtained on the X axis, hereinafter, a maximum is obtained on the Y axis; a minimum is obtained on the Y axis, a maximum is obtained on the Z axis and a minimum is obtained on the Z axis. For example, where i=0, Sbuf[0](x) is compared with Sstat(x) and Sstat(x) is larger, Sbuf[0] is exchanged with a value of Sstat (S445). Therefore, the measurement data maximum on the X axis are always accumulated at Sbuf[0].

After comparison of all the data inside the buffer are completed (S443 to A449), the measurement data maximum on the X axis is accumulated at Sbuf[0], and measurement data minimum on the X axis is accumulated at Sbuf[1]. The measurement data maximum on the Y axis, that minimum on the Y axis, that maximum on the Z axis and that minimum on the Z axis are accumulated at a buffer.

However, the condition and response of the counter shown here is one example, and the response order may be changed in any manner. This is because these steps are repeated each time new measurement data is acquired, even measurement data which meets a certain axis condition is judged by referring to other axis condition when new maximum or minimum data is provided, and one certain measurement data is judged for all the conditions until deleted from the buffer.

In the present Embodiment 7, the buffer length is given as 6 to provide a simple explanation. However, a plurality of pieces of measurement data may be accommodated in a maximum direction or a minimum direction of each principal axis. Where a plurality of pieces of measurement data are accommodated, such an effect is expected to be acquired that is similar in averaging measurement data in the vicinity of the axes. Further, the present embodiment is not necessarily provided with only one redundant data buffer but may be provided with two or more redundant data buffer.

Further, a new axis is defined which is expressed by a linear connection of X, Y, Z axis, or measurement axis of a triaxial acceleration sensor, and measurement data which is maximum or minimum there on may be accumulated. In this instance, it is expected that measurement data inside the buffer is accumulated so as to be widely distributed on a spherical surface or an ellipsoid.

EMBODIMENT 8

Where there is variation of the sensitivity of each measurement axis of the triaxial acceleration sensor in a method for estimating the offset and the sensitivity of the triaxial acceleration sensor by performing a calculation applied to a sphere or an ellipse body, measurement data acquired when an acceleration sensor is stationary forms the ellipse body in a three-dimensional space, thereby the calculation applied to the ellipse body is expected to be more accurate in estimating the offset and the sensitivity than that applied to the sphere.

However, since the calculation applied to the ellipse body is greater in the degree of freedom than that applied to the sphere, an estimated calculation cannot be made at a high accuracy only unless measurement data inside a data buffer is sufficiently distributed and also in a sufficient number of pieces. In particular, where a calculation applied to the ellipse body is performed with respect to the output of an acceleration sensor, there is such a restriction that data can be acquired only when the acceleration sensor is stationary. Therefore, it takes a longer time to acquire a sufficient number of measurement data in forming the ellipse body. Therefore, where an acceleration sensor is mounted on a portable device, it is difficult to estimate the offset early at a high accuracy, unless an operator intentionally repeatedly moves and halts the portable device in a different direction in an attempt to acquire estimate values of the offset and the sensitivity early.

Then, where measurement data inside the buffer is provided in a small number or insufficiently distributed to perform calculation applied to an ellipse body, calculation applied to a sphere is performed. Where a group of measurement data is judged to be sufficient to perform calculation applied to the ellipse body in terms of number and distribution, the calculation is switched to the calculation applied to the ellipse body. As a result, a user is able to obtain approximate values of the offset and sensitivity early, and when sufficient measurement data is acquired in performing a calculation applied to the ellipse body, it is expected to obtain more accurate values of the offset and the sensitivity.

Specifically, in the present Embodiment 8, the reference point estimating portions 15 and 42 will judge in advance whether the spherical surface or the ellipsoid is estimated at the reference point estimating portions 15 and 42 by referring to the number of output data accumulated at the data accumulating portions 14 and 41 or the distribution of the data in a three-dimensional cartesian space or both of them, thereby selecting either of them to make an estimation. Calculation may be performed for both the spherical surface and the ellipsoid to select either of them on the basis of the result.

<Specific Method>

FIG. 35 is a flow chart illustrating a specific method for switching the calculation applied to the sphere with the calculation applied to the ellipse body in Embodiment 8. Further, it is a flow chart illustrating in detail the treatment of S429 shown in FIG. 30.

First, the number of measurement data accumulated inside a data buffer and the distribution thereof are checked (S 450). As a result, when it is judged that sufficient measurement data is provided to perform a calculation applied to an ellipse body and measurement data is distributed sufficiently in a large area, calculation applied to an ellipse body is performed (S451). Otherwise, a calculation applied to the sphere is performed (S452). The offset and the sensitivity estimated by either of these calculations is used to judge reliability (S453).

The reliability may be judged by a method in which, for example, as described in Embodiment 7, a plural number of estimated calculations are performed by referring to a group of different measurement data, thereby confirming that individual calculation results are sufficiently approximate values. Alternatively, a solution may be restricted to a range, with variation of acceleration sensors taken into account.

Where the reliability is confirmed, values of the offset and the sensitivity are renewed (S454).

In the present Embodiment 8, in order to omit unnecessary calculations, a judgment is first made for whether a sphere application or an ellipse body application should be employed, and an estimated calculation is then performed. However, if the calculation capacity is more than enough, both calculations applied to a sphere and that applied to an ellipse body may be performed to select the calculation result that provides the greater reliability.

The reliability of the calculation result may be obtained by various methods, for example, by a method in which recalculation is performed for a distance from an estimated spherical surface or an estimated ellipsoid to the actual distribution of data to use a total sum of the distance or a difference in maximum/minimum value.

Further, the response to temperature characteristics in the above-described Embodiments 6 through 8 may be applicable as with the response to temperature characteristics described previously in Embodiments 1 through 5.

INDUSTRIAL APPLICABILITY

The present invention relates to an acceleration measuring device which is capable of acquiring the offset or both of the offset and the sensitivity necessary for correcting the output of a biaxial or a triaxial acceleration sensor by repeatedly acquiring output data of the biaxial or the triaxial acceleration sensor without consciousness of pointing the attitude of the acceleration measuring device in a specific direction. Further, the present invention is capable of acquiring the offset or both of the offset and the sensitivity necessary for correcting the output of the biaxial or the triaxial acceleration sensor by repeatedly acquiring the output data of the biaxial or the triaxial acceleration sensor, without consciousness of pointing the attitude of the acceleration measuring device in a specific direction when the acceleration measuring device is in use.

The invention claimed is:

1. An acceleration measuring device comprising a triaxial acceleration sensor having orthogonal X, Y and Z measurement axes, comprising:

an output data acquisition means for acquiring output data of said acceleration sensor;

an output data selecting means for calculating a difference in values between said output data over time and for checking the state of continuity of those values to judge whether said acceleration sensor is kept stationary or in uniform motion;

an output data accumulating means for accumulating selected output data;

an output data identifying means for identifying the maximum and minimum axial components of said selected output data alone said X, Y, and Z measurement axes and further alone additional axes which are defined as linear coupling of X, Y, and Z measurement axes;

a reference point estimating means in which said selected output data and said identified maximum and minimum axial components are used to estimate the coordinate values of a reference point; and an offset correcting means for correcting the offset of output data of the acceleration sensor on the basis of the coordinate values of said reference point.

2. The acceleration measuring device according to claim 1, wherein the output data selecting means calculates the differences with respect to consecutively obtained output data and judges whenever the differences are within a predetermined value continuously for a predetermined time.

3. The acceleration measuring device according to claim 2, wherein the output data selecting means measures the duration time of the period that the difference is continuously within a predetermined value.

4. The acceleration measuring device according to claim 3, wherein the output data accumulating means discards either the latest output data selected by the output data selecting means or the one of the output data that have already been accumulated by the output data accumulating means on the basis of the length of the measured duration time.

5. The acceleration measuring device according to claim 1, wherein the output data selecting means estimates a spherical surface or an ellipsoid on the basis of the distribution of said output data acquired by the output data acquisition means in at least a two-dimensional Cartesian space when each axial component is given as a coordinate value thereby selecting the output data within a predetermined distance of the spherical surface or the ellipsoid.

6. The acceleration measuring device according to claim 5, wherein the output data selecting means estimates the spherical surface or the ellipsoid by regarding a radius of the spherical surface or the ellipsoid as a predetermined value.

7. The acceleration measuring device according to claim 1, wherein the output data accumulating means further accumulates one or more pieces of output data which are not maximum nor minimum on any of the measurement axes or the additional axes for use by said reference point estimating means to estimate said coordinate values of a reference point.

8. The acceleration measuring device according to claim 1, wherein the reference point estimating means selects and judges in advance whether a spherical surface or an ellipsoid is to be used for estimation by referring to the number of triaxial output data accumulated by the output data accumulating means.

9. The acceleration measuring device according to claim 1, further comprising a temperature detecting means for detecting temperatures of the acceleration sensor and a temperature-specific correction data storage means for storing coordinate values of the reference point or a length of a principal axis and central coordinate values of the ellipsoid according to each of predetermined temperature classifications, wherein the output data accumulating means accumulates output data selected by the output data selecting means according to each of the predetermined temperature classifications on the basis of temperature values detected by the temperature detecting means, the reference point estimating means estimates coordinate values of the reference point or a length of the principal axis and the central coordinate values of the ellipsoid according to each of the predetermined temperature classifications by referring to output data of the temperature classification concerned accumulated by the output data accumulating means, and the temperature-specific correction data storage means stores coordinate values of the reference point or a length of the principal axis and the central coordinate values of the ellipsoid according to each of the predetermined temperature classifications.

10. The acceleration measuring device according to claim 9, wherein the output data accumulating means corrects the output data selected by the output data selecting means on the basis of a relationship between a temperature value detected by the temperature detecting means and the corresponding predetermined temperature classification, thereafter, storing them according to each of the predetermined temperature classifications.

11. The acceleration measuring device according to claim 1, wherein the reference point estimating means calculates variation with respect to individual coordinate axes with regard to the distribution of a predetermined number of triaxial output data accumulated by the output data accumulating means in the three-dimensional Cartesian space, and when a minimum value of the variation with respect to the individual coordinate axes is equal to or less than a predetermined value, it estimates coordinate values of said reference point or a length of each principal axis and central coordinate values of an ellipse determined on a two-dimensional Cartesian plane by referring to the distribution of remaining biaxial output data to the exclusion of output data of coordinate axes in which the variation is minimum from a predetermined number of triaxial output data accumulated by the output data accumulating means on the two-dimensional Cartesian plane when each axial component is given as a coordinate value, and the offset correcting means corrects the offset or the sensitivity and the offset of biaxial output data of the acceleration sensor on the basis of the coordinate values of the reference point or the length of each principal axis and the central coordinate values of the ellipse.

12. The acceleration measuring device according to claim 1, wherein the reference point estimating means calculates multiple of said reference points and central coordinate values of an ellipsoid over different time intervals, identifies variation of coordinate values of a predetermined number of said reference points or said central coordinate values of the ellipsoid estimated by the reference point estimating means and discards the coordinate values of the reference points or the central coordinate values of the ellipsoid when the variation exceeds a predetermined value.

13. The acceleration measuring device according to claim 1, wherein a distance from the reference point estimated in the three-dimensional Cartesian space to a predetermined number of output data or a length of each principal axis of an ellipsoid is out of a predetermined range, the reference point estimating means discards the coordinate values of the reference point or the length of each principal axis and the central coordinate values of the ellipsoid.

14. The acceleration measuring device according to claim 1, wherein the output data selecting means measures the duration time of the period that said difference in values between said output data over time is continuously within said predetermined value, and wherein the output data accumulating means discards either the latest output data selected by the output data selecting means or the output data that have already been accumulated by the output data accumulating means on the basis of the length of the measured duration time information.

15. The acceleration measuring device according to claim 14, wherein the output data selecting means adds up the number when said difference in values between said output data over time is continuously within said predetermined value to determine said duration time information.

16. The acceleration measuring device according to claim 1, wherein the reference point estimating means determines an ellipsoid in the Cartesian space by referring to the distribution of a predetermined number of output data accumulated by the output data accumulating means in a three-dimensional Cartesian space when each axial component is given as a coordinate value, thereby estimating a length of the principal axis and the central coordinate values of the ellipsoid, and wherein the offset correcting means corrects the offset and sensitivity of output data of the acceleration sensor on the basis of the length of the principal axis and the central coordinate values of the ellipsoid estimated by the reference point estimating means.

17. A method for measuring acceleration, the method being executed by an acceleration measuring device and comprising:

providing in said measuring device a triaxial acceleration sensor having orthogonal X, Y, and Z measurement axes, said measuring device:

acquiring output data of said acceleration sensor;

calculating a difference in values between said output data over time;

checking the state of continuity of those values to judge whether said acceleration sensor is kept stationary or in uniform motion;

accumulating and selecting output data when said difference is less than a predetermined amount;

identifying the maximum and minimum axial components of said selected output data along said X, Y, and Z measurement axes and further alone additional axes that are defined as linear coupling of said X, Y, and Z measurement axes;

estimating the coordinate values of a reference point using the distribution of said selected output data and said identified maximum and minimum axial components; and correcting the offset of output data of the acceleration sensor on the basis of the coordinate values of the reference point.

* * * * *